US009860246B1

United States Patent
Saylor et al.

(10) Patent No.: US 9,860,246 B1
(45) Date of Patent: Jan. 2, 2018

(54) GENERATION AND VALIDATION OF USER CREDENTIALS HAVING MULTIPLE REPRESENTATIONS

(71) Applicant: MicroStrategy Incorporated, Vienna, VA (US)

(72) Inventors: Michael J. Saylor, Vienna, VA (US); Gang Chen, Vienna, VA (US); Hector Vazquez, Ashburn, VA (US); Kirill Butin, Washington, DC (US); Roman Zolin, Washington, DC (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 15/040,777

(22) Filed: Feb. 10, 2016

Related U.S. Application Data

(63) Continuation of application No. 13/914,403, filed on Jun. 10, 2013, now Pat. No. 9,264,415.

(60) Provisional application No. 61/691,526, filed on Aug. 21, 2012, provisional application No. 61/670,456, filed on Jul. 11, 2012.

(51) Int. Cl.
| | |
|---|---|
| *H04L 29/06* | (2006.01) |
| *G06K 7/10* | (2006.01) |
| *G06F 17/30* | (2006.01) |

(52) U.S. Cl.
CPC .... *H04L 63/0853* (2013.01); *G06F 17/30259* (2013.01); *G06F 17/30265* (2013.01); *G06K 7/10544* (2013.01); *H04L 63/0861* (2013.01); *H04L 63/0876* (2013.01)

(58) Field of Classification Search
CPC ............ H04L 63/0853; H04L 63/0861; H04L 63/0876; G06F 17/30265; G06F 17/30259; G06K 7/10544
See application file for complete search history.

(56) References Cited

U.S. PATENT DOCUMENTS

| | | | |
|---|---|---|---|
| 5,668,874 | A | 9/1997 | Kristol |
| 5,918,228 | A | 6/1999 | Rich et al. |
| 6,023,769 | A | 2/2000 | Gonzalez |
| 6,477,645 | B1 | 11/2002 | Drews |
| 6,668,322 | B1 | 12/2003 | Wood et al. |

(Continued)

OTHER PUBLICATIONS

'Rail Industry Meetings' [online]. "Masabi and MBTA to launch first smartphone rail ticketing system in the US," Mar. 2012, [Retrieved on Jun. 14, 2012]. Retrieved from the Internet: <URL: http://www.abe-industry.com/railim/index.php/en/newsflash/788-masabi-and-mbta-to-launch-first-smartphone-rail-ticketing-system-in-the-us html> 2 pages.

(Continued)

*Primary Examiner* — Anthony Brown
*Assistant Examiner* — William Corum, Jr.
(74) *Attorney, Agent, or Firm* — Fish & Richardson P.C.

(57) ABSTRACT

Obtaining and/or validating user credentials at client devices is described. This disclosure describes methods of generating representations of credentials for groups of users or for individuals. Representations for these credentials can be managed by a server or collection of servers, and distributed to appropriate users' client devices. These representations can then be outputted for evaluation by a credential authority, who confirms that the credential possessed by a given user is valid. A credential authority may be a person and/or a device that validates a credential.

20 Claims, 41 Drawing Sheets

(56) References Cited

U.S. PATENT DOCUMENTS

| | | |
|---|---|---|
| 6,715,082 B1 | 3/2004 | Chang et al. |
| 6,754,823 B1 | 6/2004 | Kurzweil et al. |
| 6,993,658 B1 | 1/2006 | Engberg et al. |
| 7,216,109 B1 | 5/2007 | Donner |
| 7,225,464 B2 | 5/2007 | Satyavolu et al. |
| 7,266,693 B1 | 9/2007 | Potter et al. |
| 7,356,837 B2 | 4/2008 | Asghari-Kamrani et al. |
| 7,379,393 B2 | 5/2008 | Morykwas et al. |
| 7,454,349 B2 | 11/2008 | Teunen et al. |
| 7,475,812 B1 | 1/2009 | Novozhenets et al. |
| 7,512,254 B2 | 3/2009 | Vollkommer et al. |
| 7,694,130 B1 | 4/2010 | Martinez |
| 7,814,538 B2 | 10/2010 | Kuehnel et al. |
| 7,882,549 B2 | 2/2011 | Edwards, Jr. et al. |
| 8,087,072 B2 | 12/2011 | Gajjala et al. |
| 8,117,459 B2 | 2/2012 | Cameron et al. |
| 8,181,236 B2 | 5/2012 | Banerjee et al. |
| 8,234,220 B2 | 7/2012 | Weiss |
| 8,234,494 B1 | 7/2012 | Bansal et al. |
| 8,255,971 B1 | 8/2012 | Webb et al. |
| 8,295,855 B2 | 10/2012 | Narayan et al. |
| 8,613,052 B2 | 12/2013 | Weiss |
| 8,739,260 B1 | 5/2014 | Damm-Goossens |
| 8,752,145 B1 | 6/2014 | Dotan et al. |
| 8,775,807 B1 | 7/2014 | Vazquez et al. |
| 9,027,099 B1 | 5/2015 | Saylor et al. |
| 9,154,303 B1 | 10/2015 | Saylor |
| 9,264,415 B1 | 2/2016 | Saylor et al. |
| 9,269,358 B1 | 2/2016 | Saylor et al. |
| 2002/0026593 A1 | 2/2002 | Sakuma et al. |
| 2002/0078243 A1 | 6/2002 | Rich et al. |
| 2002/0141586 A1 | 10/2002 | Margalit et al. |
| 2004/0003260 A1 | 1/2004 | Hawkes et al. |
| 2004/0054898 A1 | 3/2004 | Chao et al. |
| 2004/0153649 A1 | 8/2004 | Rhoads et al. |
| 2004/0234131 A1 | 11/2004 | Kondo |
| 2005/0033837 A1 | 2/2005 | Bohannon |
| 2005/0165667 A1 | 7/2005 | Cox |
| 2005/0166263 A1 | 7/2005 | Nanopoulos et al. |
| 2005/0238208 A1 | 10/2005 | Sim |
| 2007/0050635 A1 | 3/2007 | Popp |
| 2007/0061730 A1* | 3/2007 | O'Mahony ......... H04L 63/0815 715/733 |
| 2007/0277224 A1 | 11/2007 | Osborn et al. |
| 2008/0071537 A1 | 3/2008 | Tamir et al. |
| 2008/0163361 A1 | 7/2008 | Davis |
| 2008/0256594 A1* | 10/2008 | Satish .................. G06F 21/41 726/1 |
| 2009/0097661 A1 | 4/2009 | Orsini |
| 2009/0117883 A1 | 5/2009 | Coffing et al. |
| 2009/0119757 A1 | 5/2009 | Acuna |
| 2009/0292641 A1 | 11/2009 | Weiss |
| 2010/0031051 A1 | 2/2010 | Machani et al. |
| 2010/0082491 A1 | 4/2010 | Rosenblatt et al. |
| 2010/0098256 A1 | 4/2010 | Kirshenbaum |
| 2010/0116880 A1 | 5/2010 | Stollman |
| 2010/0169958 A1 | 7/2010 | Werner et al. |
| 2010/0269156 A1 | 10/2010 | Hohlfeld |
| 2011/0270751 A1 | 11/2011 | Csinger et al. |
| 2011/0321144 A1 | 12/2011 | Saxena et al. |
| 2012/0028609 A1 | 2/2012 | Hruska |
| 2012/0144203 A1 | 6/2012 | Albisu |
| 2012/0191575 A1 | 7/2012 | Vilke |
| 2012/0253809 A1 | 10/2012 | Thomas et al. |
| 2012/0257759 A1 | 10/2012 | Nick et al. |
| 2012/0274444 A1 | 11/2012 | Micali et al. |
| 2012/0291108 A1* | 11/2012 | Talamo ................. H04L 9/3273 726/6 |
| 2013/0037607 A1 | 2/2013 | Bullwinkel |
| 2013/0061301 A1 | 3/2013 | Novak et al. |
| 2013/0074168 A1 | 3/2013 | Hao |
| 2013/0111056 A1 | 5/2013 | Prasad |
| 2013/0111571 A1 | 5/2013 | Jakobsson |
| 2013/0112760 A1 | 5/2013 | Schory et al. |
| 2013/0124292 A1 | 5/2013 | Juthani |
| 2013/0124855 A1* | 5/2013 | Varadarajan ....... G06Q 20/3276 713/155 |
| 2013/0125231 A1* | 5/2013 | Kuenzi .................. G06F 21/35 726/16 |
| 2013/0132091 A1 | 5/2013 | Skerpac |
| 2013/0139233 A1 | 5/2013 | Malty |
| 2013/0173915 A1 | 7/2013 | Haulund |
| 2013/0276075 A1 | 7/2013 | Gong |
| 2013/0198264 A1 | 8/2013 | Hellman et al. |
| 2013/0205360 A1 | 8/2013 | Novak et al. |
| 2013/0222835 A1 | 8/2013 | Iwamoto |
| 2013/0227710 A1 | 8/2013 | Barak et al. |
| 2013/0263211 A1* | 10/2013 | Neuman ................ H04L 63/08 726/1 |
| 2013/0282588 A1 | 10/2013 | Hruska |
| 2013/0325704 A1* | 12/2013 | Gorman .............. G06Q 50/265 705/39 |
| 2014/0001253 A1* | 1/2014 | Smith ................ G06Q 20/3276 235/375 |
| 2014/0040139 A1 | 2/2014 | Brudnicki |
| 2014/0281525 A1 | 9/2014 | Acar et al. |

OTHER PUBLICATIONS

"Transport Operators and Barcode M-Ticketing: Expand station sales capacity without spending more on staff and ticket machines," Masabi, London, UK, 2 pages.

Jain et al. "An Introduction to Biometric Recognition", IEEE Transactions on Circuits and Systems for Video Technology vol. 14, No. 1, Jan. 2004, pp. 4-20.

Lei, "Similarity Between the Mandelbrot Set and Julia Sets," Commun. 1990 Math Phys. 134, 587-617, 1990.

Ray, B. "Apple Passbook card-'n'-ticket app paves way for iOS e-wallet," The Register, Jun. 12, 2012, [Retrieved on Jun. 14, 2012]. Retrieved from the Internet: <URL: http://www.theregister.co.uk/2012/06/12/apple_passbook/. 3 pages.

Rooney, B. "Masabi Launches U.S.'s First Ticketless Rail System," The Wall Street Journal, Apr. 2012, [Retrieved on Jun. 14, 2012]. Retrieved from the Internet: <URL: http://blogs.wsj.com/techeurope/2012/04/23/masabi-launches-u-s-s-first-ticketless-rail-system/. 3 pages.

U.S. Non-Final Office Action for U.S. Appl. No. 13/914,296 dated Oct. 22, 2014, 24 pages.

U.S. Non-Final Office Action for U.S. Appl. No. 13/914,408 dated Nov. 13, 2014, 33 pages.

U.S. Non-Final Office Action for U.S. Appl. No. 13/914,429 dated Sep. 11, 2014, 27 pages.

U.S. Notice of Allowance for U.S. Appl. No. 13/874,721 dated Jun. 4, 2015, 14 pages.

U.S. Notice of Allowance in U.S. Appl. No. 13/914,353 dated Dec. 8, 2014, 32 pages.

Wikipedia, "Certificate authority," Wikipedia [online] Aug. 8, 2012 [retrieved on Aug. 15, 2012]. Retrieved from the Internet: <URL: http://en.wikipedia.org/wiki/Certificate_authority>, 4 pages.

Wikipedia, "Certificate signing request," Wikipedia [online] Aug . 20, 2013 [retrieved on Aug. 24, 2012]. Retrieved from the Internet: <URL: http://en.wikipedia.org/wiki/Certificate_signing_request>, 4 pages.

Wikipedia, "Cryptographic hash function," Wikipedia [online] Aug 8, 2012 [retrieved on Aug. 15, 2012]. Retrieved from the Internet: <URL: http://en.wikipedia.org/wiki/Cryptographic_hash_function>, 5 pages.

Wikipedia, "Digital signature," Wikipedia [online] Aug 14, 2012 [retrieved on Aug. 15, 2012]. Retrieved from the Internet: <URL: http://en.wikipedia.org/wiki/Digital_signature>, 10 pages.

Wikipedia, "Message authentication code," Wikipedia [online] Aug 8, 2012 [retrieved on Aug. 15, 2012]. Retrieved from the Internet: <URL: http://en.wikipedia.org/wiki/Message_authentication_codes>, 4 pages.

Wikipedia, "Public-key cryptography," Wikipedia [online] Aug 15, 2012 [retrieved on Aug. 15, 2012]. Retrieved from the Internet: <URL: http://en.wikipedia.org/wiki/Public-key_cryptography>, 12 pages.

(56) References Cited

OTHER PUBLICATIONS

Wikipedia, "SecureID," Wikipedia [online] Jul. 5, 2012 [retrieved on Aug. 15, 2012]. Retrieved from the Internet: <URL: http://en.wikipedia.org/wiki/SecurID>, 5 pages.
Lei, "Similarity Between the Mandelbrot Set and Julia Sets," Commun. Math. Phys. 134, 587-617, 1990.
Mills, "The Autokey Security Architecture, Protocol and Algorithms," Technical Report 06-1-1, Jan. 2006, 61 pages.
Open Intents—(O1 Countdown, Feb. 5, 2011, 3 pages).
Oprea et al., "Securing a Remote Terminal Application with a Mobile Trusted Device," ACSAC'04, 2004, 10 pages.
U.S. Notice of Allowance in U.S. Appl. No. 13/874,721 dated Jun. 4, 2015, 14 pages.
U.S. Non-Final Office Action for U.S. Appl. No. 15/043,202 dated Apr. 13, 2016, 20 pages.
U.S. Notice of Allowance in U.S. Appl. No. 13/914,373 dated Oct. 16, 2015, 31 pages.
U.S. Non-Final Office Action for U.S. Appl. No. 13/957,020 dated Mar. 11, 2016, 12 pages.
U.S. Non-Final Office Action for U.S. Appl. No. 13/914,296 dated Jun. 17, 2015, 29 pages.
U.S. Non-Final Office Action for U.S. Appl. No. 13/914,408 dated Jun. 17, 2015, 22 pages.
"Transport Operators and Barcode M-Ticketing: Expand station sales capacity without spending more on staff and ticket machines," Masabi, London, UK, publicly available before Jun. 10, 2013, 2 pages.
Essa et al., M.I.T Media Laboratory Perceptual Computing Section Technical Report No. 370 Appears: Proceedings of Computer Animation '96 Conference, Geneva, Switzerland, Jun. 1996, pp. 1-12.
Jain et al. "An Introduction to Biometric Recognition," IEEE Transactions on Circuits and Systems for Video Technology vol. 14, No. 1, Jan. 2004, pp. 4-20.
McBryan, "Textual Associations from Images Applied to Authentication," Masters Thesis 2005/2006, pp. 1-106.
Rail Industry Meetings [online]. "Masabi and MBTA to launch first smartphone mil ticketing system in the US," Mar. 2012, [Retrieved on Jun. 14, 2012]. Retrieved from the Internet: <URL:http://www.abe-industry.com/railim/index.php/en/newsflash/788-masabi-and-mbta-to-launch-first-smartphone-rail-ticketing-system-in-the-us.html> 2 pages.
Ray, "Apple Passbook card-'n'-ticket app paves way for iOS e-wallet," The Register, Jun. 12, 2012, [Retrieved on Jun. 14, 2012]. Retrieved from the Internet: <URL: http://www.theregister.co.uk/2012/06/12/apple_passbook/>. 3 pages.
Rooney "Masabi Launches U.S.'s First Ticketless Rail System," The Wall Street Journal, Apr. 2012, [Retrieved on Jun. 14, 2012]. Retrieved from the Internet: <URL: http://blogs.wsj.com/techeurope/2012/04/23/masabi-launches-u-s-s-first-ticketless-rail-system/>. 3 pages.
Saragih et al., "Realtime avatar animation from a single image." Automatic Face & Gesture Recognition and Workshops (FG 2011), 2011 IEEE International Conference on. IEEE, 2011, pp. 117-124.
Weir et al., "Testing Metrics for Password Creation Policies by Attacking Large Sets of Revealed Passwords," CCS'10, Oct. 4-8, 2010, pp. 162-175.
Wikipedia, "Certificate authority," Wikipedia [online] Aug 8, 2012 [retrieved on Aug. 15, 2012]. Retrieved from the Internet: <URL: http://en.wikipedia.org/wiki/Certificate_authority>, 4 pages.
Wikipedia, "Certificate signing request," Wikipedia [online] Aug. 20, 2013 [retrieved on Aug. 24, 2012]. Retrieved from the Internet: <URL: http://en.wikipedia.org/wiki/Certificate_signing_request>, 4 pages.
Wikipedia, "Cryptographic hash function," Wikipedia [online] Aug. 8, 2012 [retrieved on Aug. 15, 2012]. Retrieved from the Internet: <URL: http://en.wikipedia.org/wiki/Cryptogmphic_hash_function>, 5 pages.
Wikipedia, "Digital signature," Wikipedia [online] Aug. 14, 2012 [retrieved on Aug. 15, 2012]. Retrieved from the Internet: <URL: http://en.wikipedia.org/wiki/Digital_signature>, 10 pages.
Wikipedia, "ID-based encryption," Wikipedia [online] Jul. 27, 2012 [retrieved on Aug. 15, 2012]. Retrieved from the Internet: <URL: http://en.wikipedia.org/wiki/Identity_based_encryption>, 5 pages.
Wikipedia, "Message authentication code," Wikipedia [online] Aug. 8, 2012 [retrieved on Aug. 15, 2012]. Retrieved from the Internet: <URL: http://en.wikipedia.org/wiki/Message_authentication_codes>, 4 pages.
Wikipedia, "Multi-factor authentication," Wikipedia [online] Aug. 6, 2012 [retrieved on Aug. 15, 2012]. Retrieved from the Internet: <URL: http://en.wikipedia.org/wiki/Multi-factor_authentication>, 3 pages.
Wikipedia, "Public key certificate," Wikipedia [online] Aug. 12, 2012 [retrieved on Aug. 15, 2012]. Retrieved from the Internet: <URL: http://en.wikipedia.org/wiki/Digital_certificates>, 7 pages.
Wikipedia, "Public-key cryptography," Wikipedia [online] Aug. 15, 2012 [retrieved on Aug. 15, 2012]. Retrieved from the Internet: <URL: http://en.wikipedia.org/wiki/Public-key_cryptography>, 12 pages.
Wikipedia, "Public-key infrastructure," Wikipedia [online] Aug. 8, 2012 [retrieved on Aug. 15, 2012]. Retrieved from the Internet: <URL: http://en.wikipedia.org/wiki/Public_Key_Infrastructure>, 6 pages.
Wikipedia, "SecureID," Wikipedia [online] Jul. 5, 2012 [retrieved on Aug. 15, 2012]. Retrieved from the Internet: <http://en.wikipedia.org/wiki/SecurID>, 5 pages.
Wikipedia, "Two-factor authentication," Wikipedia [online] Aug. 13, 2012 [retrieved on May 15, 2012]. Retrieved from the Internet: <URL: http://en.wikipedia.org/wiki/Two-factor_authentication>, 15 pages.
U.S. Final Office Action for U.S. Appl. No. 13/914,296 dated Feb. 5, 2015, 15 pages.
U.S. Final Office Action for U.S. Appl. No. 13/914,403 dated Feb. 26, 2015, 13 pages.
U.S. Final Office Action for U.S. Appl. No. 13/914,408 dated Mar. 9, 2015, 23 pages.
U.S. Final Office Action for U.S. Appl. No. 13/914,429 dated Jan. 14, 2015, 15 pages.
U.S. Non-Final Office Action for U.S. Appl. No. 13/874,721, dated Nov. 4, 2014, 13 pages.
U.S. Non-Final Office Action for U.S. Appl. No. 13/914,296 dated Oct. 22, 2014, 18 pages.
U.S. Non-Final Office Action for U.S. Appl. No. 13/914,373 dated Apr. 6, 2015, 18 pages.
U.S. Non-Final Office Action for U.S. Appl. No. 13/914,403 dated Nov. 7, 2014, 12 pages.
U.S. Non-Final Office Action for U.S. Appl. No. 13/914,408 dated Nov. 13, 2014, 22 pages.
U.S. Non-Final Office Action for U.S. Appl. No. 13/914,429 dated Sep. 11, 2014, 16 pages.
U.S. Notice of Allowance in U.S. Appl. No. 13/914,353 dated Dec. 8, 2014, 19 pages.
U.S. Notice of Allowance in U.S. Appl. No. 13/914,353 dated Mar. 27, 2015, 9 pages.
U.S. Non-Final Office Action for U.S. Appl. No. 13/914,403 dated Jun. 2, 2015, 16 pages.
U.S. Notice of Allowance in U.S. Appl. No. 13/914,403 dated Oct. 8, 2015, 12 pages.
U.S. Final Office Action for U.S. Appl. No. 15/043,202, dated Jul. 26, 2016, 24 pages.
Fazackerley, Mark, "The Usher Identity Platform: A description of MicroStrategy's mobile identity solution," Usher by Microstrategy, Apr. 2014, 15 pages, URL<https://www.slideshare.net/markfazackerley3/usher-functionality>.
Cahill et al., "MicroStrategy Introduces Enterprise Security Platform Usher, Debuts Usher Software Development Kit," MicroStrategy, Apr. 2015, 4 pages, URL<http://ir.microstrategy.com/releasedetail.cfm?releaseid=904735>.
"Introduction to Usher," Usher by MicroStrategy, May 2014, 10 pages, URL<https://mobileapps.microstrategy.com/usher/MSTREmployeeFAQ/MSTREmployeeFAQ.html >.

(56) References Cited

OTHER PUBLICATIONS

"MicroStrategy Usher: the revolutionary new security solution," MicroStrategy, 2015, 20 pages, URL<https://www.microstrategy.com/Strategy/media/downloads/Resource%20Center/security/Whitepaper-UsherSecurityArch.pdf.

Lee, Justin, "Inside MicroStrategy's biometric mobile identity platform Usher," Biometrics Research Group, Inc., Apr. 2, 2015, 5 pages, URL<http://www.biometricupdate.com/201504/inside-microstrategys-biometric-mobile-platform-usher>.

* cited by examiner

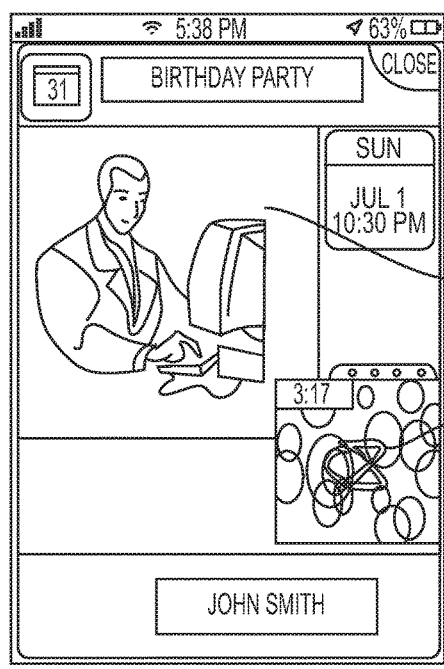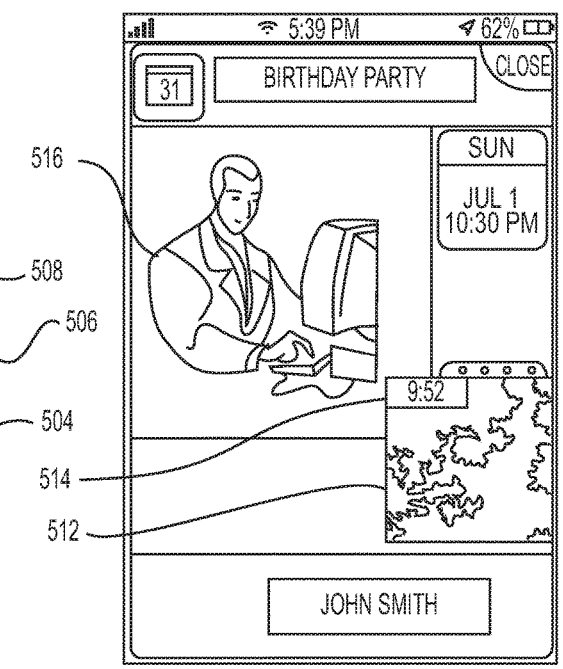
*FIG. 5A* *FIG. 5B*

GENERATION AND VALIDATION OF USER CREDENTIALS HAVING MULTIPLE REPRESENTATIONS

CROSS-REFERENCE TO RELATED APPLICATIONS

This application is a continuation of and claims priority from U.S. application Ser. No. 13/914,403, filed Jun. 10, 2013, now allowed, which claims the benefit of U.S. Provisional Application Ser. No. 61/670,456, filed on Jul. 11, 2012, and U.S. Provisional Application Ser. No. 61/691,526, filed on Aug. 21, 2012, all of which are incorporated herein by reference in their entirety.

TECHNICAL FIELD

This specification generally relates to user credentials.

BACKGROUND

In certain instances, a person may be associated with a credential that, for example, permits the person to access events and/or locations.

SUMMARY

In general, one aspect of the subject matter described in this specification may include techniques for obtaining and/or validating user credentials at client devices.

Other features may include corresponding systems, apparatus, and computer programs, configured to perform the actions of the methods, encoded on computer storage devices.

The details of one or more implementations are set forth in the accompanying drawings and the description, below. Other potential features and advantages of the disclosure will be apparent from the description and drawings, and from the claims.

DESCRIPTION OF DRAWINGS

FIGS. 5a-g are screenshots of sample client devices and sample credential authority devices for certain implementations that involve provisioning a client device with a parametrically-generated graphical representation for a credential and presenting the representation for validation of the credential.

DETAILED DESCRIPTION

General Overview

In some instances, it can be beneficial to generate representations of credentials for groups of users or for individuals. The credentials can be, for example, forms of personal identification (e.g., drivers' licenses, identity cards, passports, etc.), badges to gain entrance to a location, credentials to identify membership in a group (e.g., a graduate of a school or a professional certification), tickets for entry to an event, redeemable vouchers, keys that unlock locks (e.g., for entry to a location), credentials for gaining access to information technology (IT) resources (e.g., credentials for logging into a computing device, network, or other computing resource, credentials for accessing an electronic file, directory, or other storage component, etc.), credentials for accessing an electronic account (e.g., credentials for accessing a bank account from a personal computing device and/or an automated teller machine (ATM)), etc. Representations for these credentials can be managed by a server or collection of servers, and distributed to appropriate users' client devices. These representations can then be outputted for evaluation by a credential authority, who confirms that the credential possessed by a given user is valid. A credential authority may be a person and/or a device that validates a credential.

Systems that generate, distribute, and validate representations for credentials are described below. First, a general description of example implementations will be described. Then, more detailed implementations are described, including parametrically-generated graphical representations for credentials, animated graphical representations for credentials, phrases corresponding to credentials, numeric representations for credentials, optical machine-readable representations for credentials, and combinations of one or more of these representations.

Figure 1:
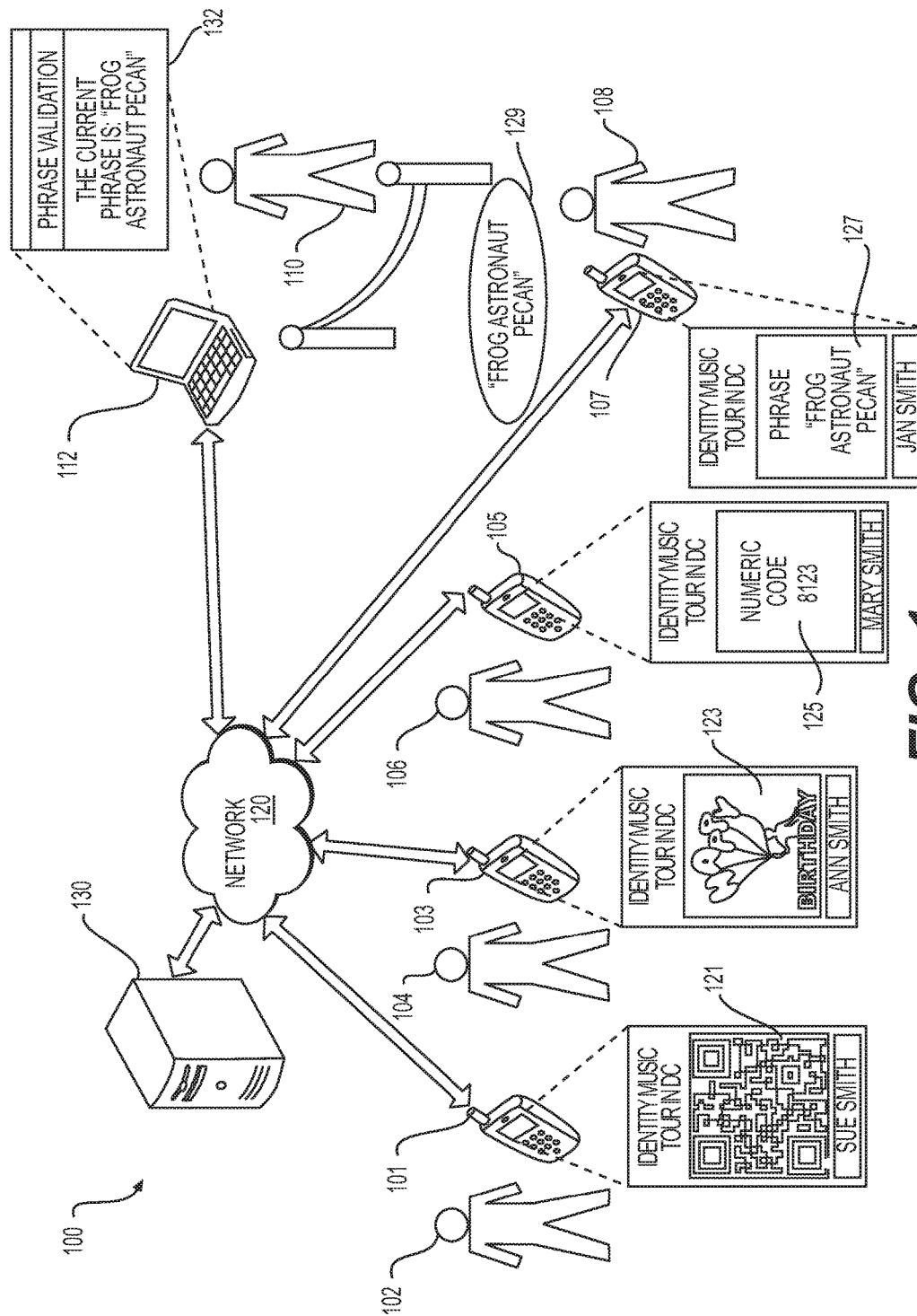
FIG. 1 is a diagram of an example system that manages representations for credentials associated with users and groups of users, and permits a credential authority to validate the credentials for each user by inspecting the representations.

FIG. 1 illustrates an example system 100 that manages representations for credentials associated with users and groups of users, and permits a credential authority to validate the credentials for each user by inspecting the representations. As an overview, a server 130 communicates via a network 120 with client devices 101, 103, 105, and 107 operated by users 102, 104, 106, and 108. The server 130 also communicates via network 120 with a processing system 112 operated by a credential authority 110. The credential authority 110 operates the processing system 112 to validate representations of a credential presented by the users 102, 104, 106, and 108 on their client devices 101, 103, 105, and 107 by comparing the user-presented representations with valid representations for the credential obtained from the server 130.

A credential may be evidence of authority, status, rights, or entitlement to privileges that can be, for example, a badge to gain entrance to a location, an identifier for membership in a group (e.g., a graduate of a school or a professional certification), a ticket for entry to an event, a redeemable voucher, a key that unlocks a lock (e.g., for entry to a location), etc. Credentials can be represented in various forms as described in detail below. For example, credentials can be represented by parametrically-generated graphical representations, animated graphical representations, phrases, numeric representations, and/or optical machine-readable representations. Combinations of one or more of these representations can also be used. In certain aspects, credentials also may be hierarchical. For example, a first credential may generally identify an individual as an employee of Company X, while a second credential identifies the individual more specifically as an executive of Company X, and a third credential identifies the individual as the Chief Executive Officer of Company X.

In operation, the server 130 manages and stores one or more credentials, associates users and groups of users with appropriate credentials, and provides representations of the credentials to users' client devices and/or processing systems (e.g., operated by credential authorities) for validation.

The server 130 can be any suitable computer or collection of computers executing software capable of managing, distributing, and validating representations of credentials for users and groups of users via a network 120 as described herein.

Credentials, user accounts, group accounts, and administrative accounts can be stored in a database (e.g., MySQL, PostgreSQL, MS SQL Server, MongoDB), or other suitable data structure that can be accessed by the server 130. In some implementations, the server 130 may access the stored credentials and/or user accounts via web services such as representational state transfer (REST) style services.

As an initial step, the server 130 creates a credential based on input provided by a credential grantor (e.g., a party host or event organizer when the credential is a credential to gain access to a party or event). The credentials may include a variety of information such as a description of an event or location, a credential identifier (e.g., a number or character string that uniquely identifies a credential), and/or one or more designated credential authorities. The server 130 may present a suitable interface to the credential grantor for creation of credentials. For example, the server 130 may present a web interface through which grantors can interact via a Web browser. In other aspects, the server 130 may be directly accessible via a graphical-user interface or an application running on a mobile device. Any suitable interface can be used that enables the creation and storage of credentials, and user accounts. In addition to creation of credentials by credential grantors, credentials could be created at the request of registered users through a web-based or other interface, or through any other suitable mechanism such as sending email or short message service (SMS) to grantors. In some implementations, registered users may be able to create credentials by use of an application running on a client device.

The server 130 also may present an interface so that users and/or credential grantors can create user accounts for individual users and groups of users. For example, the server 130 may present a web interface through which credential grantors can interact via a Web browser. Alternatively, the server 130 may be directly accessible via a graphical-user interface or an application on a mobile device. User accounts may be stored in a table or collection of tables in a database, or in any other suitable data structure accessible by the server 130. The user accounts may include a variety of information such as user name, user identifier (e.g., a number or character string that uniquely identifies a user), and the address(es) of one or more client devices owned by or otherwise associated with the user. Likewise, group accounts may be stored in a table, collection of tables, or other suitable data structure. Certain individual users may be identified as belonging to a group by linking an entry for the user to an entry for the group, for example by use of a linking table. The group accounts may include a variety of information such as a group name, group identifier (e.g., a number or character string that uniquely identifies a group), and a description of the group. In addition to creation of user accounts and groups by grantors, user accounts and groups could be created at the request of potential users through a web-based or other interface, or through any other suitable means such as sending email or SMS to grantors. In some implementations, the potential users may be able to create user accounts by use of an application running on a client device.

As an example, Mr. John Smith may request a new user account from the server 130 using an application executing on his client device. The server 130 can then create database entries representing a user account for Mr. Smith. A credential grantor could then create a row in another table for a group identified as employees of Company X. The grantor could then link the database entry for Mr. Smith to the group account for Company X through use of a linking table.

Once credentials and users, or groups of users, have been created, credential grantors and/or users can associate the credentials with users, or groups of users. For example, the server 130 may present a web interface through which grantors can interact via a Web browser to link a given credential to a given user or group of users. In other aspects, the server 130 may be directly accessible via a graphical-user interface or an application on a mobile device. Credentials may be associated with users, or groups of users, for example, by linking a database entry for a credential to a database entry for a user, or group of users, by use of a linking table. In addition to association of credentials to users and groups of users by grantors, registered users also may request that certain users, or groups of users, be associated with certain credentials through a web-based or other interface, or through any other suitable means such as sending email or SMS to grantors. In some implementations, the potential users may be able to create user accounts by use of an application running on a client device. Furthermore, the server 130 also may notify the users that they have been associated with the credential, for example by pushing notifications to the respective users' client devices. Such notifications may include the credential identifier for the credential, a representation of the credential itself, and/or the user identifier.

In addition or as an alternative to receiving a push notification from the server 130, the client devices may obtain the credential identifier, the representation of the credential, and/or the user identifier in various other ways. For example, the client devices may request the credential identifier, the representation of the identifier, and/or the user identifier from the server 130. In some implementations, an application executing on the client device may have the user identifier pre-installed, or may receive a user identifier when a user first runs the application and creates a user account associated with the application, or may receive a user identifier when a user logs into the application from the client device.

In some implementations, the creation and management of user accounts, group accounts, and credentials could be partially or completely automated. For example, a web-based application could act as a ticket agent for an event, with tickets for the event corresponding to credentials. An interested user could access the web-based application via a web-browser or mobile application, pay a ticket fee online, and, when the user's payment is verified, the web-based application could automatically create an account for the user and associate the account with the credential for the event.

Once credentials have been associated with appropriate user and/or group accounts, representations for the credentials can then be distributed to client devices for the appropriate users via the network 120. For example, the network 120 may be a local area network ("LAN") and a wide area network ("WAN"), e.g., the Internet. In some versions, the server 130 may communicate with the client devices via SMS or multimedia messaging service (MMS). The server 130 may access user accounts in a database to locate the appropriate users' client devices. Distribution of representations for credentials is discussed in more detail below.

Client devices 101, 103, 105, and 107 can then receive the representations for credentials and store them in any suitable memory for later retrieval. Software applications executing on the client devices 101, 103, 105, and 107 can then retrieve the representations so they can be presented to a credential authority for validation. The client devices 101, 103, 105, and 107 may be any type of computing device, including but not limited to a mobile phone, smart phone, PDA, music player, e-book reader, tablet computer, laptop or desktop computer, or other stationary or portable device, that includes one or more processors and non-transitory computer readable storage media. The software application can be written in any suitable programming language such as, for example, Objective-C, C++, Java, etc.

For example, FIG. 1 illustrates an example in which the credential corresponds to a ticket for a velvet rope event. Users 102, 104, 106, and 108 all have been invited to attend the event and, consequently, have all received representations of the credential. The credential authority 110 is a doorman responsible for permitting only authorized individuals to enter the event. As described in greater detail below, the credential for the event may be represented in a variety of different formats, and the credential authority 110 may be able to validate representations of the credential in any of these different formats. For example, the client device 101 of user 102 is executing an application that displays a quick response (QR) code 121 representing the credential. The client device 103 of user 104 is executing an application that displays an animated graphical representation 123 for the credential. The client device 105 of user 106 is executing an application that displays a numeric representation 125 for the credential. And, the client device 107 of user 108 is executing an application that displays a phrase 127 representing the credential, i.e., the phrase "frog astronaut pecan." User 108, at the front of the entry line, has presented a phrase for validation, in this case by uttering the phrase "frog astronaut pecan" 129 to the credential authority 110. The credential authority 110 operates a processing system 112 that retrieves a current phrase representing the credential 132 from the server 130 via network 120, which is output to a display operatively coupled to the processing system 112. The credential authority 110 can then confirm that the phrase uttered by the user 108 matches the current phrase representing the credential. Once the representation presented by the user 108 is validated, the credential manager 110 can permit the user 108 to enter the event.

While shown in FIG. 1 as a person, the credential authority 110 can be any agent capable of validating representations of credentials presented by users. As an example, the credential authority 110 could be a software application executing on the processing system 112 that performs speech recognition on the phrase 129 uttered by user 108, retrieves a current phrase representing the credential from the server 130, and then determines whether the utterance and the phrase from the server 130 match. The software application could then control an automated gate to permit user 108 to enter. The processing system 112 can also be any suitable computer or set of computers capable of communicating with the server 130 via network 120, such as a mobile phone, smart phone, PDA, tablet computer, laptop or desktop computer, or other stationary or portable device, that includes one or more processors and non-transitory computer readable media.

Parametrically-Generated Graphical Representations for Credentials

Figure 2:
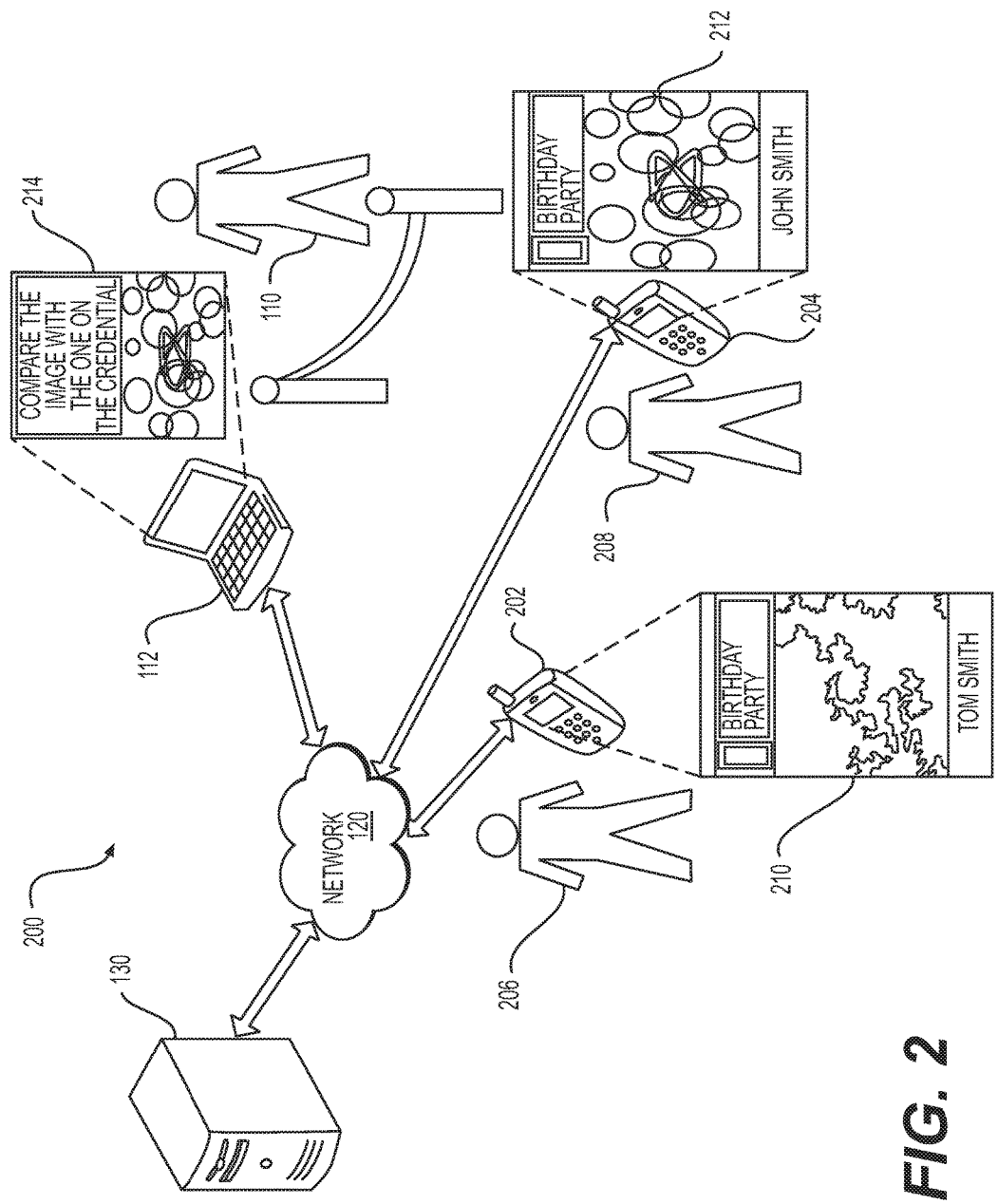
FIG. 2 is a diagram of an example system that manages parametrically-generated graphical representations for credentials associated with users and groups of users, and permits a credential authority to validate the credentials for each user by visual inspection of the representations.

FIG. 2 illustrates an example system 200 that manages parametrically-generated graphical representations for credentials associated with users and groups of users, and permits a credential authority to validate the credentials for each user by visual inspection of the representations. A parametrically-generated graphical representation is a visual display that is generated using one or more parameters as inputs to one or more mathematical equations, such as a three-dimensional rendering of an object or an image of a fractal. In certain implementations, the parameters can be generated from seed values such as a credential identifier and a time.

As an initial matter, the server 130 creates credentials (e.g., identified by credential identifiers) and user accounts (e.g., identified by user identifiers) based on input from credential grantors and/or users, and then associates credential identifiers with user identifiers as described above. For example, a party host may create a credential and then associate user identifiers for all of the invitees (e.g., users 206, 208) with the credential identifier to enable the invitees to gain admittance to the party. As another example, users' client devices 202, 204 may send a request to the server 130 to be associated with a given credential. This may occur, for instance, if party invitees RSVP for a party by interacting with the server 130, or if tickets for an event are available to the general public. The server 130 also may notify the users 206, 208 that they have been associated with the credential, for example by pushing notifications to the respective users' client devices 202, 204. Such notifications may include the credential identifier for the credential and/or the user identifier.

As illustrated, a server 130 communicates via a network 120 with client devices 202, 204 operated by users 206, 208, e.g., to distribute a credential for users 206, 208 to client devices 202, 204. The server 130 also communicates via network 120 with a processing system 112 operated by a credential authority 110, e.g., to enable processing system 112 and/or credential authority 110 to validate the credential. The credential can be represented in a variety of different formats. For example, the client device 202 of user 206 is executing an application that displays an image of a fractal 210 representing the credential. In some aspects, a color scheme for the image of the fractal 210 may be employed, and the color scheme may be animated as described in more detail below. The client device 204 of user 208 is executing an application that outputs a three-dimensional rendering of an object 212 representing the credential to a display of the client device 204. In some aspects, the three-dimensional rendering of the object 212 may be animated (e.g., rotating in one or more dimensions). In FIG. 2, the credential authority 110 operates the processing system 112 to validate the representation 212 by visually inspecting the representation, and then comparing it with a valid representation (i.e., a three-dimensional rendering of an object 214) for the credential obtained from the server 130. In the example, the three-dimensional rendering of an object 214 obtained from the server visually matches the three-dimensional rendering of the object 212 displayed on the client device 204, and therefore the user's representation of the credential 212 is validated. In particular, in FIG. 2, the three-dimensional rendering of the object 212 and the three-dimensional rendering of the object 214 are synchronized with each other (e.g., both have the same orientation and rotation), which may be useful in facilitating validation of the credential. The credential authority 110 also may be able to input a command to the processing system via a man-machine interface that switches between valid representations for credentials obtained from the server 130. For example, the credential authority 110 may be able to toggle the processing system 112 between displaying the image of the fractal and the three-dimensional rendering of the object for validation of either.

In some implementations, the parametrically-generated graphical representation for the credential can be a three-dimensional rendering of an object. The object can be, for example, a simple polyhedron, such as a cube, tetrahedron, or icosahedron, or a more complicated object such as a helix, trefoil knot, Lissajous knot, torus, torus knot, or hyperbolic knot. Various aspects of the three-dimensional rendering can be specified using a variety of parameters. In some instances, parameters may specify the shape of the object. For example, a Lissajous knot is defined by the following parametric equations:

$$x = \cos(n_x t + \phi_x),$$

$$y = \cos(n_y t + \phi_y),$$

$$z = \cos(n_z t + \phi_z),$$

where $n_x$, $n_y$, and $n_z$ are integers and phase shifts $\phi_x$, $\phi_y$, and $\phi_z$ may be real numbers. The parameters chosen may represent the variables $n_x$, $n_y$, and $n_z$ and/or $\phi_x$, $\phi_y$, and $\phi_z$, so that different inputs will cause different shapes to be rendered.

Parameters also may specify, for example, the color of the object, the texture applied to the object, the reflection image of an image applied to the object, the background over which the object is displayed, and/or a light source position for the object. For example, seed values (e.g., time and/or credential identifiers) could be input into an equation that generates an output that may be used as an index into a collection of different colors, textures, reflection images, and/or backgrounds from which the color, texture, reflection image, and/or background may be selected. Furthermore, seed values (e.g., time and/or credential identifiers) could be input into an equation that generates an output that may be used as an index into a collection of objects (e.g., a simple polyhedron, such as a cube, tetrahedron, or icosahedron, or a more complicated object such as a helix, trefoil knot, Lissajous knot, torus, torus knot, or hyperbolic knot) from which the object to be rendered is selected. In addition, the three-dimensional rendering of the object also may be animated, which can advantageously make replication of the image more difficult. For example, parameters may specify a camera location, a camera path, an object rotation direction, an object translation, and/or an object rotation speed. Any suitable combination of one or more of these parameters may be fixed or variable. The three-dimensional object can be rendered based on these parameters using a suitable application programming interface such as OpenGL or Direct3D.

The client device 202, 204 can use the parameters to generate a set of equations defining the three-dimensional object. Typically, a light source will be rendered to illuminate the object. Also, the object may be animated, e.g., rotated about one or more axes at a certain rate. As mentioned above, each of the characteristics controlling the object, lighting, and animation may be constant or variable. In some implementations, the client device 202, 204 renders the object within an exterior three-dimensional object, such as a cube or polyhedron. The exterior object may have textures on its faces that form reflection images on the interior object.

The parametrically-generated graphical representation for the credential also may be an image of a fractal. The image of the fractal can be, for example, a Julia set or a Mandelbrot set. For an image of a fractal, the parameters can define the boundaries of a region of the fractal. For example, the parameters may define the x and y coordinates of a window within which the image of a fractal is rendered. The parameters can also define the fractal set to be used (e.g., the Julia set or Mandelbrot set), a background color or image, and a colorization scheme for the image of a fractal. Any suitable combination of one or more of these parameters may be fixed or variable. The image of a fractal can be rendered based on these parameters using a suitable application programming interface such as OpenGL or Direct3D.

In some implementations, the image of a fractal's colorization scheme and/or background image can be animated. For example, a certain color palette for rendering the image of the fractal may be selected and then the color palette could be rotated to provide an animated colorization. In particular, some image files, e.g., GIF and PNG, may be palette-based, which means that the colors used in an image in the file have their red-green-blue (RGB) values defined in a palette table that holds a certain number of entries (e.g., 256 entries). The data for the image can then refer to the colors by their indexes (e.g., 0-255) in the palette table. The color definitions in the palette may be drawn from a color space of millions of shades (e.g., $2^{24}$ shades, 8 bits for each primary color). Rotation of the color palette could therefore involve periodically changing the color definitions in the palette table, for example by incrementing or decrementing the color definitions by a predetermined amount at a predetermined time interval (e.g., 100 ms), while keeping the same palette index values in the image file. This may cause the image color scheme and/or the background color scheme to vary over time, e.g., provide an animation. Any other suitable technique for animating the colorization scheme or background image may be used. In some implementations, the parameters may define characteristics of the animation for the colorization scheme and/or background image.

Parameters are typically integers or floating point values that can be generated based on seed values that include a credential identifier and a time. The number of parameters generated may be implementation specific, and could range from a single parameter up to dozens of parameters. The selection of the number parameters may involve a tradeoff between processing efficiency and security. Higher numbers of parameters may take longer to process, but may provide less chance of collisions (i.e., two different sets of credential identifiers and times resulting in the same set of parameters).

The credential identifier can be obtained from a server 130 via the network 120 as described in more detail below. The time can be a current timestamp (e.g., seconds or milliseconds from epoch) obtained from a timing device such as a hardware or software clock located at the client device. In some implementations, the timing device can be synchronized with the server 130, and/or with one or more additional servers that provide a master clock reference as described below. Additional seed values may be used, such as a user identifier, a group identifier, and/or randomly generated numbers. When a user identifier is used as a seed value, the graphical representation for the credential may be specific to a particular user. Likewise, when a group identifier is used, the graphical representation for the credential may be specific to a particular group. When a randomly generated number is used, it may be stored by the server 130 and associated with the credential identifier and a user or group identifier for additional security.

The mapping of the seed values to the parameters can use any suitable technique. For example, the credential identifier could be used to seed a pseudo-random number generator function, and then the resulting value could be added to a value representing the time. In such cases, the pseudo-random number generator function may be configured so that different computers can generate the same value when they are called at substantially the same time and receive the same credential identifier as a seed value. The seed values can be concatenated, manipulated using mathematical functions, hashed using a hash function such as MD5, SHA-1 or SHA-2, subsam pled to select a predetermined subset or subsets, or any combination of these techniques to generate a suitable number of parameters.

As an example of generating a three-dimensional rendering of an object, a client device 202, 204 may generate a pseudo-random number based on the credential identifier and the timestamp, which it then uses to derive a set of parameters. The client device 202, 204 then uses the parameters to specify a set of surface equations that define a trefoil knot, torus, or other parametrically-generated shape.

As an example of generating an image of a fractal, a client device 202, 204 may generate a pseudo-random number based on the credential identifier and the timestamp, which it then uses to derive a set of parameters. The client device 202, 204 then maps the parameters to generate two sets of (x,y) coordinates that define a region of a predetermined image of a fractal (e.g., a Mandelbrot set). This set of (x,y) coordinates may implicitly define a scale (e.g., zoom factor) based on the distance between the (x,y) coordinates. In other words, each of the (x,y) coordinates may identify a corner of a view window, e.g., the first (x,y) coordinate identifies the lower-left corner of the view window and the second (x,y) coordinate identifies the upper-right corner of the view window. The scale may then be defined so that the portion of the image of the fractal in the view window may be mapped to the desired display size (e.g., the size of the display on the client device 202, 204, or any suitable portion thereof). Alternatively, the client device 202, 204 could map the parameters to generate an origin (x,y) point and a separate scale (e.g., a zoom factor). It should be noted that certain regions of the image of a fractal will include little or no detail. For example, whereas the boundary regions of the Mandelbrot and Julia set have high amounts of detail, the interior and exterior portions exhibit very little. This lack of detail could make visual recognition of the image of a fractal difficult. When choosing the (x,y) coordinates for the selected region, it may therefore be desirable to avoid choosing interior or exterior portions of the fractals. This could be accomplished by filtering the potential choices to focus only on the boundaries of the fractal sets. Additionally or alternatively, after a region of an image of a fractal has been selected for use within a graphical representation for a credential, image processing techniques may be performed on the selected region of the image of the fractal to confirm that the selected region exhibits sufficient detail to enable use of the selected region within a graphical representation for the credential. In the event that the image processing techniques reveal that the selected region fails to exhibit sufficient detail to enable use of the selected region within a graphical representation for the credential, the techniques described above for selecting a region of an image of a fractal may be repeated until a region exhibiting sufficient detail is selected. For example, the image processing techniques may involve determining, within the selected region, a ratio of a number of pixels having a background color to a number of pixels having foreground colors. A new region could be selected if the ratio is greater than a predetermined threshold (e.g., 95% or more of the pixels in the selected region are background color pixels).

In some implementations, the parametrically generated graphical representation may be periodically changed. For example, when the client device 202, 204 begins to display a parametrically generated graphical representation, it also may initialize a timer that counts down during a predetermined time interval (e.g., between about 1 minute and about 10 minutes). The client device 202, 204 can then monitor the timer while displaying the current graphical representation. When the timer expires, the client device 202, 204 can obtain a new time from the timing device, regenerate the set of parameters, and generate a new graphical representation. The client device 202, 204 also may output the timer to the display of the client device 202, 204 to indicate the amount of time remaining until the current graphical representation will be changed.

Parametrically generated graphical representations for multiple credentials may be displayed concurrently. This may be implemented, for example, when credentials represent a hierarchy of access. As an example, if Mr. John Smith is an employee of Company X, and also authorized to access the $12^{th}$ floor of Company X's headquarters, he may have two credentials, i.e., a first credential identifying Mr. Smith as an employee who is authorized to enter the headquarters, and a second authorizing Mr. Smith to access the $12^{th}$ floor. In such implementations, graphical representations for the first credential and the second credential may both be displayed at the same time so that a credential authority can permit Mr. Smith access to the $12^{th}$ floor.

Advantageously, generating complicated graphical representations for the credential makes replication difficult (i.e., individuals cannot readily forge the representation by taking photographs), but visual inspection for validation straightforward. For example, when user 208 presents the three-dimensional rendering of an object 212 that matches the three-dimensional rendering of an object 214 on the display of the processing system 112, the credential authority 110 can readily validate the user's representation by visual inspection.

The credential authority 110 performs validation using the processing system 112. Specifically, the processing system 112 obtains a credential identifier and a time from a timing device, and generates a parametrically generated graphical representation for the credential in the same manner described above for the client devices 202, 204. When the timing device at the processing system 112 is synchronized with the timing devices at client devices 202, 204 as described below, the parameters generated at the processing system 112 should be identical (or nearly identical) to those of the client devices 202, 204 when the credential identifiers are the same. The graphical representation generated by processing system 112 should therefore match the graphical representations on the client devices 202, 204.

In some versions, the client device 202, 204 also may obtain an image of the user 206, 208 for additional security. The client device 202, 204 may display this image before, after, and/or during display of the graphical representation for the credential. The image of the user also may be presented to the credential authority 110 for authentication of the user 206, 208. The user image may be obtained from, for example, a memory of the client device 202, 204, or a server such as a social networking web-server. Obtaining a user image from a social networking web-server may be advantageous in some implementations because a user is unlikely to store an image of someone else in their social networking profile because this might confuse the user's "friends" in the context of the social network. The user image also may be obtained from a database of photographs maintained by the credential grantor (e.g., an employee directory in the case where the credential represents an employee badge). In some instances, the user image may be provided by the credential grantor as part of granting the credential in the first instance (e.g., the credential grantor provides the credential application access to a database of images for the potential credential holders).

Figure 3:
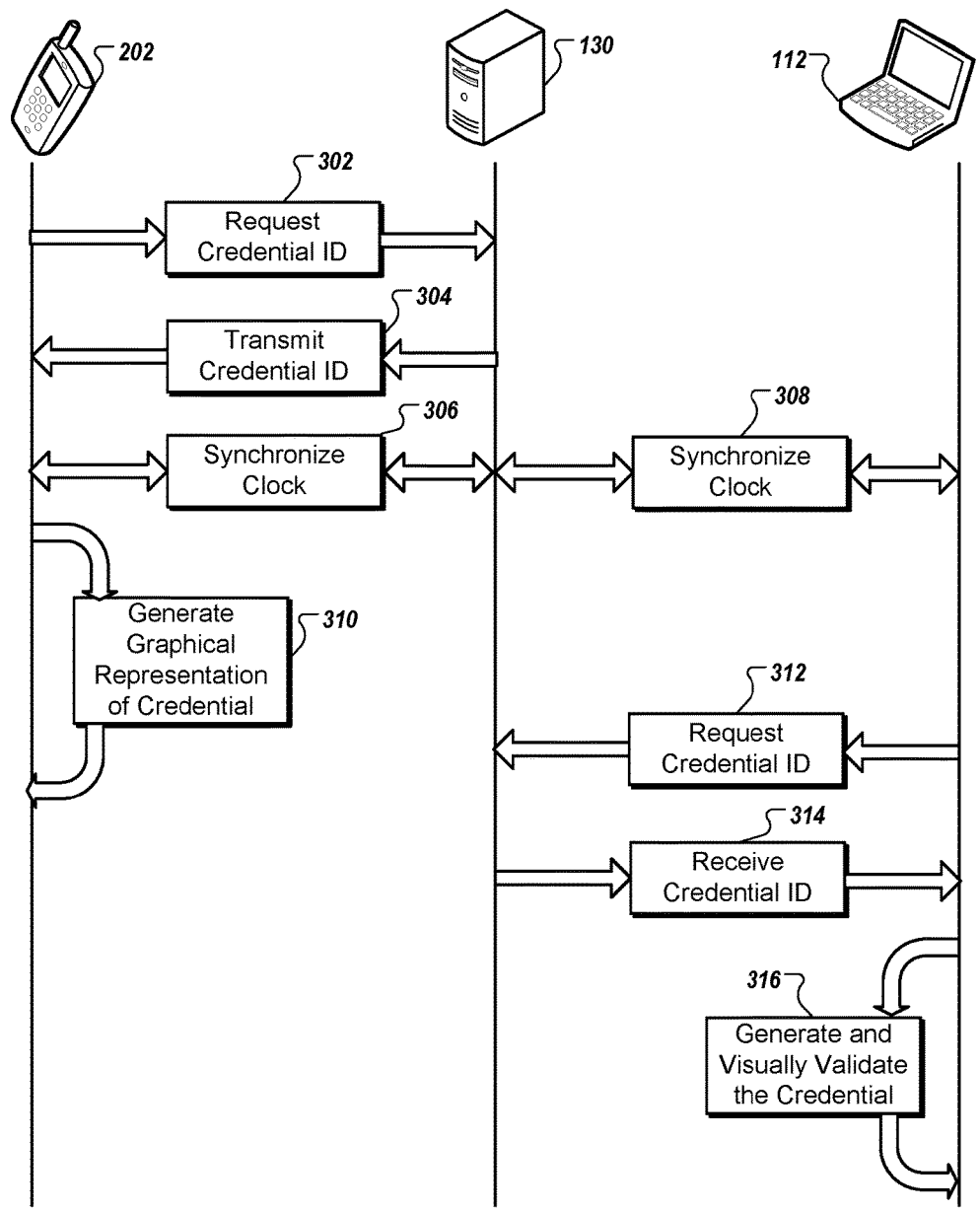
FIG. 3 is a messaging diagram that illustrates sample messages between a client device, server, and processing system in a system that manages parametrically-generated graphical representations for credentials associated with users and groups of users, and permits a credential authority to validate the credentials for each user by visual inspection of the representations.

FIG. 3 illustrates sample messages between a client device, server, and processing system in a system that manages parametrically-generated graphical representations for credentials associated with users and groups of users, and permits a credential authority to validate the credentials for each user by visual inspection of the representations. The messages described below may be transmitted via any suitable protocol such as, for example, hypertext transfer protocol (HTTP) or SMS. Additionally, these example messages should not be considered limiting, as any suitable mechanism for performing the functions described could be used, and the messages could be sent or received in any suitable sequence.

In FIG. 3, initially, a client device 202 transmits a request message for a credential identifier 302 to a server 130. This request may be, for example, a request for credential identifiers associated with a user logged into the client device 202. The request also may be, for example, initiated in response to the operator of the client device 202 accepting an offer of a credential from a credential grantor (e.g., accepting an invitation to a party or event in the context of a party or event management software application). In response, the server 130 transmits a response message 304 to the client device 202 that includes a credential identifier. In some implementations, however, the server 130 may push the message including the credential identifier 304 to the client device 202 without first receiving a request message 302.

Next, the client device 202 and processing system 112 associated with the credential authority 110 synchronize timing devices (e.g., local clocks) with a master clock of the server 130 by transmitting synchronization messages 306 and 308 (e.g. network time protocol (NTP) messages). While synchronization is shown as occurring only once, and simultaneously among the client device 202, server 130, and processing system 112, it should be appreciated that synchronization may occur at regular time intervals and need not be performed simultaneously for the client device 202 and the processing system 112. Also, it should be appreciated that while only one server 130 is illustrated, multiple time servers could be used synchronize the timing devices of client device 202 and processing system 112. Synchronization among the client device 202, the server 130, and the processing system 112, can be performed using any suitable technique. For example, NTP, global positioning system (GPS), or IEEE 1588 precision time protocol (PTP) may be used.

In step 310, the client device 202 generates a graphical representation for the credential as described above using parameters based on the credential identifier and the synchronized time. At some time, the user of the client device 202 will present the graphical representation for the credential to the credential authority 110 for validation. When this occurs, or any time before, the processing system 112 sends a message 312 requesting the credential identifier to the server 130. In response, the server 130 transmits a response message 314 to the processing system 112 that includes a credential identifier. In some implementations, however, the server 130 may push the message including the credential identifier 314 to the processing system 112 without first receiving a request message 312.

Finally, in step 316, the processing system generates a graphical representation for the credential. Since the timing device of the client device 202 and processing system 112 have been synchronized, and the credential identifier is the same, the parameters used to generate the graphical representation will be substantially similar (e.g., sufficiently similar so that the rendered objects will be visually indistinguishable to the credential authority 110). The graphical representation for the credential rendered at the client device 202 and the processing system 112 will therefore visually match.

Figure 4:
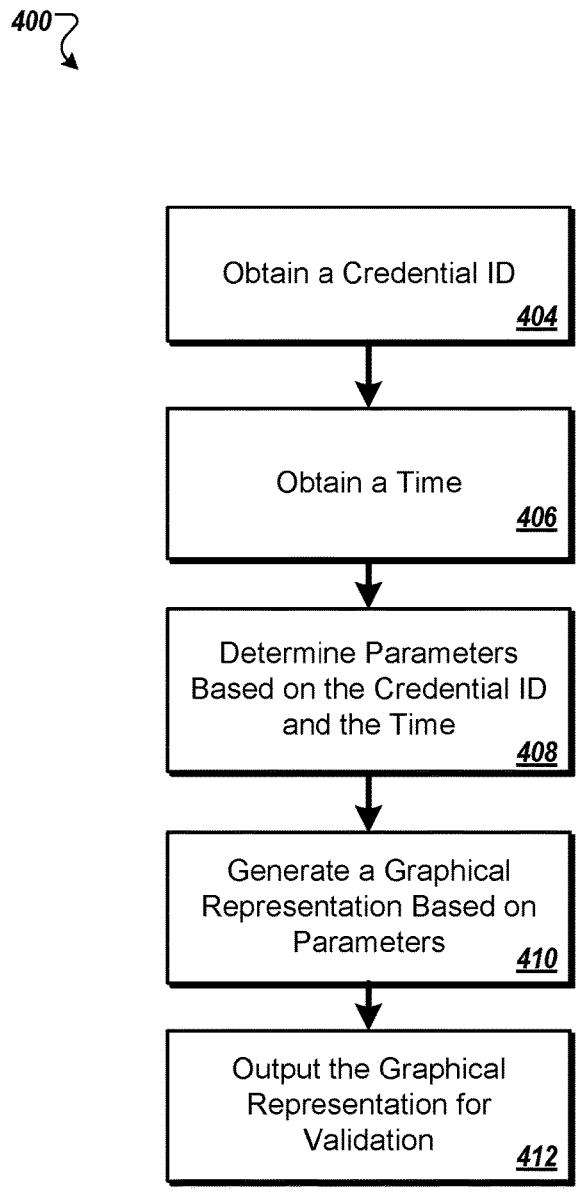
FIG. 4 is a flowchart of an example process for provisioning a client device with a parametrically-generated graphical representation for a credential and presenting the graphical representation for validation of the credential.

FIG. 4 shows an example process 400 for provisioning a client device with a parametrically-generated graphical representation for a credential and presenting the graphical representation for validation of the credential. As shown, in step 404, a client device obtains a credential identifier associated with a user. Next, in step 406, the client device obtains a time derived from (e.g., measured by) a timing device of the client device. In some implementations, this time may be the client device clock time+/−an offset calculated based on having synchronized the client device's clock with one or more server(s). Based on the credential identifier and the time, in step 408, the client device determines one or more parameters. Then, in step 410, based on the one or more parameters, the client device generates a graphical representation for a credential associated with the user. Finally, in step 412, for presentation to a credential authority 110, the client device outputs, to a display of the client device, the graphical representation in a manner that enables the credential authority to validate the credential by visual inspection of the graphical representation for the credential. In some implementations, the client device may apply the credential identifier and the time to one or more equations to generate one or more outputs, and then use the one or more outputs as the one or more parameters.

In some implementations, the client device generates a three-dimensional rendering of an object, and outputs the three-dimensional rendering of the object to the display of the client device in a manner that enables a credential authority to validate the credential by visual inspection of the three-dimensional rendering of the object. In such implementations, the client device may generate the three-dimensional rendering of the object based on parameters including, for example, one or more of a reflection image applied to the object, a shape of the object, a background behind the object, a light source position, and a texture applied to the object. In some implementations, the parameters also may be used to select a particular type of object.

Furthermore, the client device also may animate the three-dimensional rendering of the object. The client device can generate parameters for the animated object that include one or more of an object rotation speed, an object rotation direction, an object translation, and a camera path. Then the client device can generate the animated three-dimensional rendering of the object based on the object rotation speed, the object rotation direction, the object translation, and the camera path, and output the animated three-dimensional rendering of the object to the display of the client device in a manner that enables the credential authority to validate the credential by visual inspection of the animated three-dimensional rendering of the object.

In some implementations, the client device generates an image of a fractal, and outputs the image of a fractal to the display of the client device in a manner that enables a credential authority to validate the credential by visual inspection of the image of a fractal. In such implementations, the client device may determine parameters, based on the credential identifier and the time, that include one or more of a fractal set, a region of the image of a fractal, a colorization scheme, and a background. The client device can then generate the image of a fractal based on the fractal set, the region of the image of a fractal, the colorization scheme, and the background. As an example, the fractal set may be a Mandelbrot set or a Julia set.

Furthermore, the client device also may animate a colorization of the image of a fractal. In particular, the client device may output an animated colorization of the image of a fractal to the display of the client device in a manner that enables the credential authority to validate the credential by visual inspection of the animated colorization of the image of a fractal. For example, a certain color palette for rendering the image of the fractal may be selected and then the color palette could be rotated to provide an animated colorization.

In some versions, the client device may initialize a timer at the client device and monitor the timer during display of the graphical representation for the credential. Upon expiration of the timer, the client device obtains an updated time derived from the timing device. Then, the client device can update the parameters based on the credential identifier and the updated time and, based on the updated parameters, generate an updated graphical representation for the credential associated with the user. For example, the updated graphical representation may be a different object type, may have a different shape, may have different reflection images applied, may have different textures applied, and/or may have a different background behind the object. The client device can then output the updated graphical representation to the display of the client device in a manner that enables the credential authority to validate the credential by visual inspection of the updated graphical representation for the credential. The client device also may output, to the display of the client device, a graphical representation of the timer during display of the graphical representation for the credential.

The client device also may obtain an image of the user and output, to the display of the client device, the image of the user during display of the graphical representation for the credential such that the credential authority can authenticate the user. The client device can obtain the image by retrieving, from a memory of the client device, the image of the user or by querying a server via a network connection and receiving, from the server over the network connection, the image of the user.

Validation of the graphical representation displayed by the client device involves synchronizing the timing device at the client device with a master clock of at least one server. Next, a timing device at a processing system is synchronized with the same master clock of the server or servers. The processing system is associated with (e.g., operated by) a credential authority. The processing system then obtains the credential identifier associated with the user and obtains a time derived from the second timing device. The processing system then determines one or more parameters based on the credential identifier and the time, and, based on the one or more parameters, generates a graphical representation for the credential associated with the user. The processing system then outputs the graphical representation to a display operatively coupled to the processing system, such that the graphical representation for the credential associated with the user on the display operatively coupled to the processing system matches the graphical representation for the credential associated with the user on the display of the client device. Because the timing devices for the client device and the processing system have been synchronized, and the credential identifier is the same, the representation on the client device and the representation displayed by the processing system should match.

In some cases, multiple users may be associated with any given credential identifier. In such implementations, a different user's client device synchronizes its timing device with the master clock of the server or servers. The client device then obtains the credential identifier that has been associated with the different user and a time measured by its timing device. The client device of the different user then determines one or more parameters based on the credential identifier associated with the different user and the time. Based on the one or more parameters, the client device generates a graphical representation for the credential associated with the different user, and outputs the graphical representation to a display of the client device, such that the graphical representation for the credential associated with the different user on the display of their client device matches the graphical representation for the credential associated with the credential authority on the display operatively coupled to the processing system.

In some versions, the client device may obtain the credential identifier by establishing a secure connection with a server (e.g., via HTTP Secure), sending, to the server, an identifier associated with the user, and then receiving, from the server, the credential identifier.

A given user may be associated with multiple credential identifiers. For example, a user's client device may obtain a set of multiple credential identifiers associated with the user, and then determine one or more parameters based on the set of credential identifier and the time. Then the client device can, based on the one or more parameters, generate a graphical representation for each of the credential identifiers associated with the user. The client device may output one or more of these graphical representations associated with the user to the display of the client device in a manner that enables a credential authority to validate the outputted credentials by visual inspection of the graphical representations for the credentials. The client device may output to the display two or more of the graphical representations concurrently in a manner that enables a credential authority to validate multiple credentials at substantially the same time. This can allow visual inspection of the graphical representations for the multiple credentials in a manner that enables a credential authority to validate the multiple credentials by visual inspection of the graphical representations for the credentials. For instance, as discussed in the example above, Mr. John Smith may have two credentials, i.e., a first credential identifying Mr. Smith as an employee who is authorized to enter company headquarters, and a second authorizing Mr. Smith to access the $12^{th}$ floor of the company headquarters building.

Figures 5C, 5D:
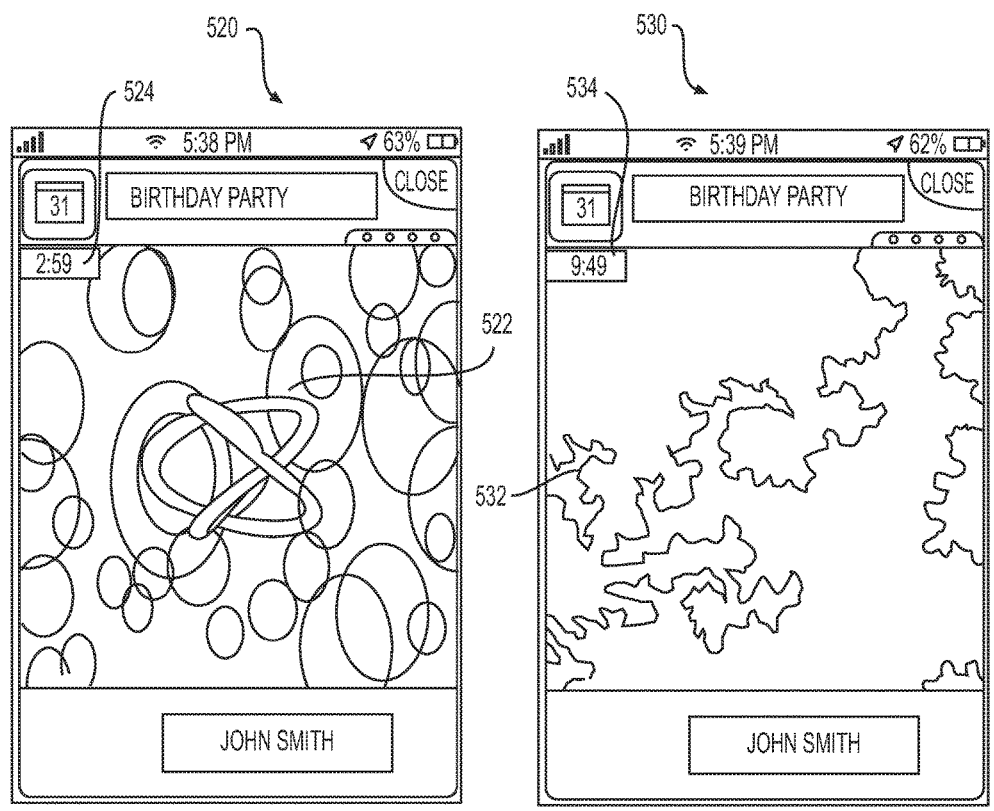

FIGS. 5a-g show screenshots of sample client devices and sample credential authority devices for certain implementations that involve provisioning a client device with a parametrically-generated graphical representation for a credential and presenting the representation for validation of the credential. In particular, FIG. 5a shows a display of a client device 502 that includes a three-dimensional rendering of an object 504 representing a credential selected and rendered according to the techniques described above. In the example shown, the object is a torus knot that can be animated, for example, by rotation of the knot and/or the camera. The torus knot is shown as rendered within a cube having textured faces, which are rendered as reflection images on the torus knot. The three-dimensional rendering also includes a background image showing a variety of colored ovals. The display 502 also includes a timer 506 indicating the time remaining until the three-dimensional rendering will be updated (i.e., 3 minutes and 17 seconds) to a different graphical representation for the credential. The display 502 further includes an image of a user 508 to whom the credential has been granted. As described above, the image of the user 508 may be obtained from the client device and/or a server.

FIG. 5b shows a display of a client device 510 that includes an image of a fractal 512 representing a credential. The image is a region of the Mandelbrot set that may be selected and rendered according to the techniques described above, and the colorization of the image can be animated. The display 510 also includes a timer 514 indicating the time remaining until the three-dimensional rendering will be updated (i.e., 9 minutes and 52 seconds). The display 510 further includes an image of a user 516. As described above, the image of the user 508 may be obtained from the client device and/or a server. In some implementations, the three-dimensional representation for the object 504 and the image of the fractal 512 may represent the same credential, e.g., a user could choose to present one or the other for validation purposes.

FIG. 5c shows a display of a client device 520 that includes a large torus knot 522 similar to that shown in FIG. 5a, but at a different orientation than the torus knot shown in FIG. 5a. Specifically, the differences between the torus knot 522 and the torus knot 504 from FIG. 5a are due to the animation of the object and the passage of time. Additionally, the torus knot 522 may be displayed in a larger version because in some implementations the user can cause the credential to be displayed larger to replace the image of the user. As explained above, the object may be animated, i.e., rotated or translated. The display 520 also includes a timer 524 indicating the time remaining until the three-dimensional rendering will be updated (i.e., 2 minutes and 59 seconds).

FIG. 5d shows a display of a client device 530 that includes a larger version of the image of the fractal 532 from FIG. 5b. Specifically, the differences between the image of the fractal 532 and the image of the fractal 512 from FIG. 5b are due to the animation of the color scheme and the passage of time. Additionally, the image of the fractal 532 may be displayed in a larger version because in some implementations the user can cause the credential to be displayed larger to replace the image of the user. The display 530 also includes a timer 534 indicating the time remaining until the three-dimensional rendering will be updated (i.e., 9 minutes and 49 seconds).

Figures 5E, 5F:
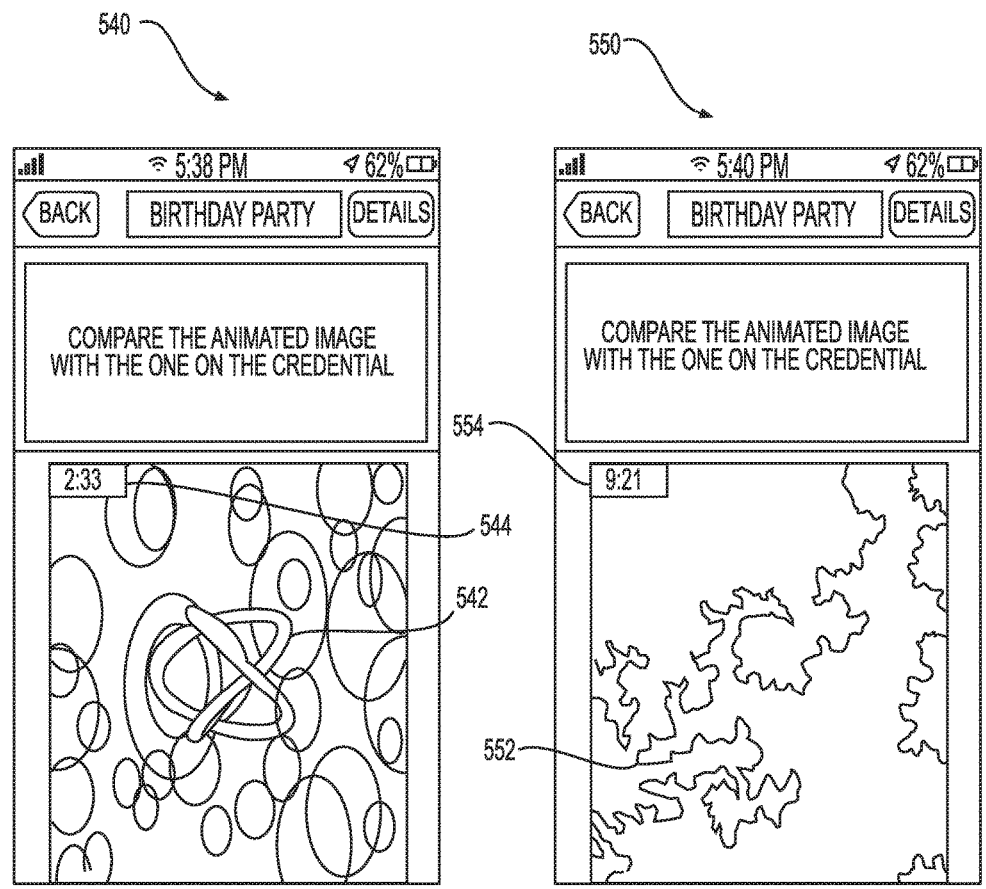

FIG. 5e shows a display 540 operatively coupled to a processing system, where the processing system is associated with a credential authority. In particular, a torus knot 542 is shown that matches the torus knot 504, 522 from FIGS. 5a and 5c respectively. Moreover, the processing system generates the torus knot 542 to enable the validation of the torus knot 504, 522 representation of the credential from FIGS. 5a and 5c. The display 540 also includes a timer 544 indicating the time remaining until the three-dimensional rendering will be updated (i.e., 2 minutes and 33 seconds). The credential authority can validate the client device by visually matching the torus knot 542 with the torus knots 504, 522 from FIGS. 5a and 5c respectively at the same time, or substantially the same time (e.g., 2 minutes and 33 seconds).

FIG. 5f shows a display 550 operatively coupled to a processing system, where the processing system is associated with a credential authority. In particular, an image of a fractal 552 is shown that matches the images of a fractal 512, 532 from FIGS. 5b and 5d respectively. Moreover, the processing system generates the image of the fractal 552 specifically to enable the validation of the images of the fractal 512, 532 representing the credential from FIGS. 5b and 5d. The display 550 also includes a timer 554 indicating the time remaining until the image of a fractal will be updated (i.e., 9 minutes and 21 seconds). The credential authority can validate the client device by visually matching the torus knot 552 with the torus knots 512, 532 from FIGS. 5b and 5d respectively at the same time, or substantially the same time (e.g., 9 minutes and 21 seconds).

Figure 5G:
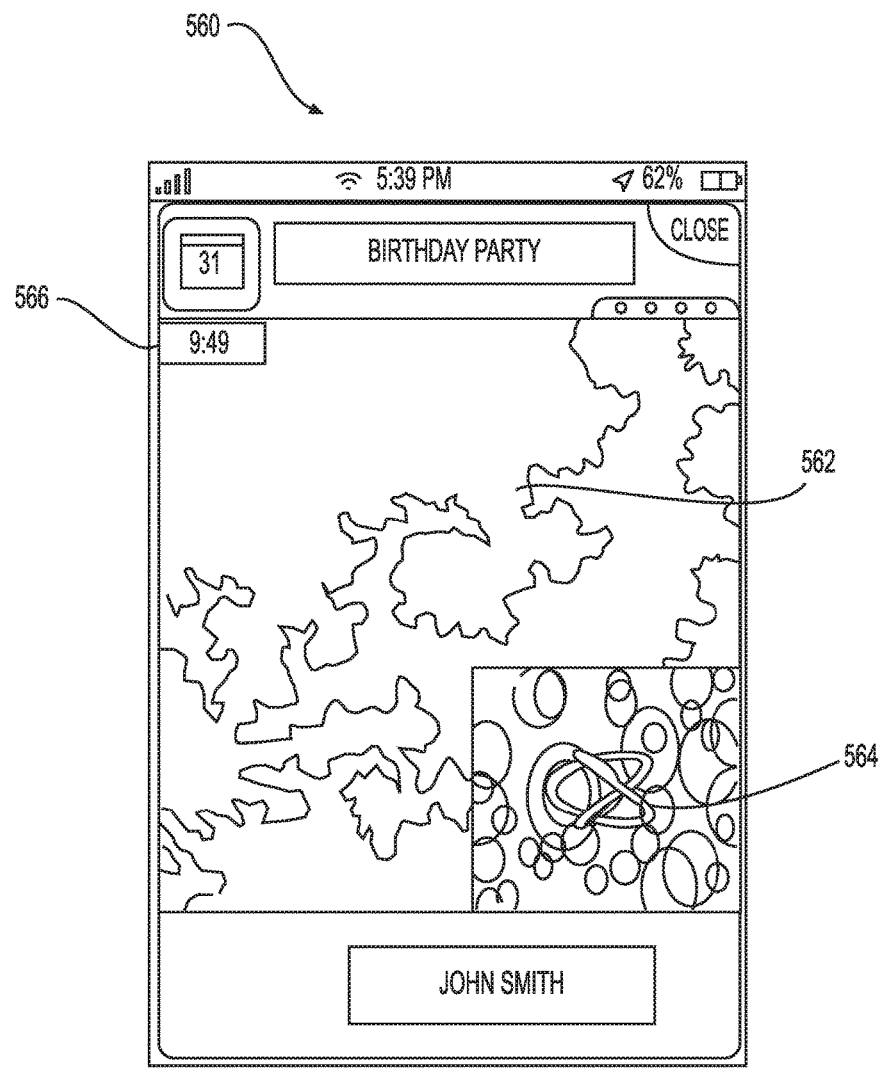

FIG. 5g shows a display 560 of a client device that includes an image of a fractal 562. Referring back to the example of Mr. John Smith who possesses two credentials, i.e., a first credential identifying Mr. Smith as an employee who is authorized to enter company headquarters, and a second credential authorizing Mr. Smith to access the $12^{th}$ floor of the company headquarters building, the image of a fractal 562 may represent the first credential, for example that Mr. John Smith is an employee of Company X who is authorized to enter Company X's headquarters. Also, superimposed on the representation for the first credential is a representation for a second credential, i.e., a torus knot 564. The second credential may indicate that Mr. Smith is not only authorized to enter Company X's headquarters, but is also authorized to enter the $12^{th}$ floor of Company X's headquarters. The image of the fractal 562 and the torus knot 564 representing the two credentials may be generated according to the techniques described above. The display 560 also includes a timer 566 indicating the time remaining until the representations for the first and second credentials will be updated (i.e., 9 minutes and 49 seconds). The credential authority can validate the client device by visually inspecting the torus knot 564 and the image of a fractal 562 as described above.

Animated Graphical Representations for Credentials

Figure 6:
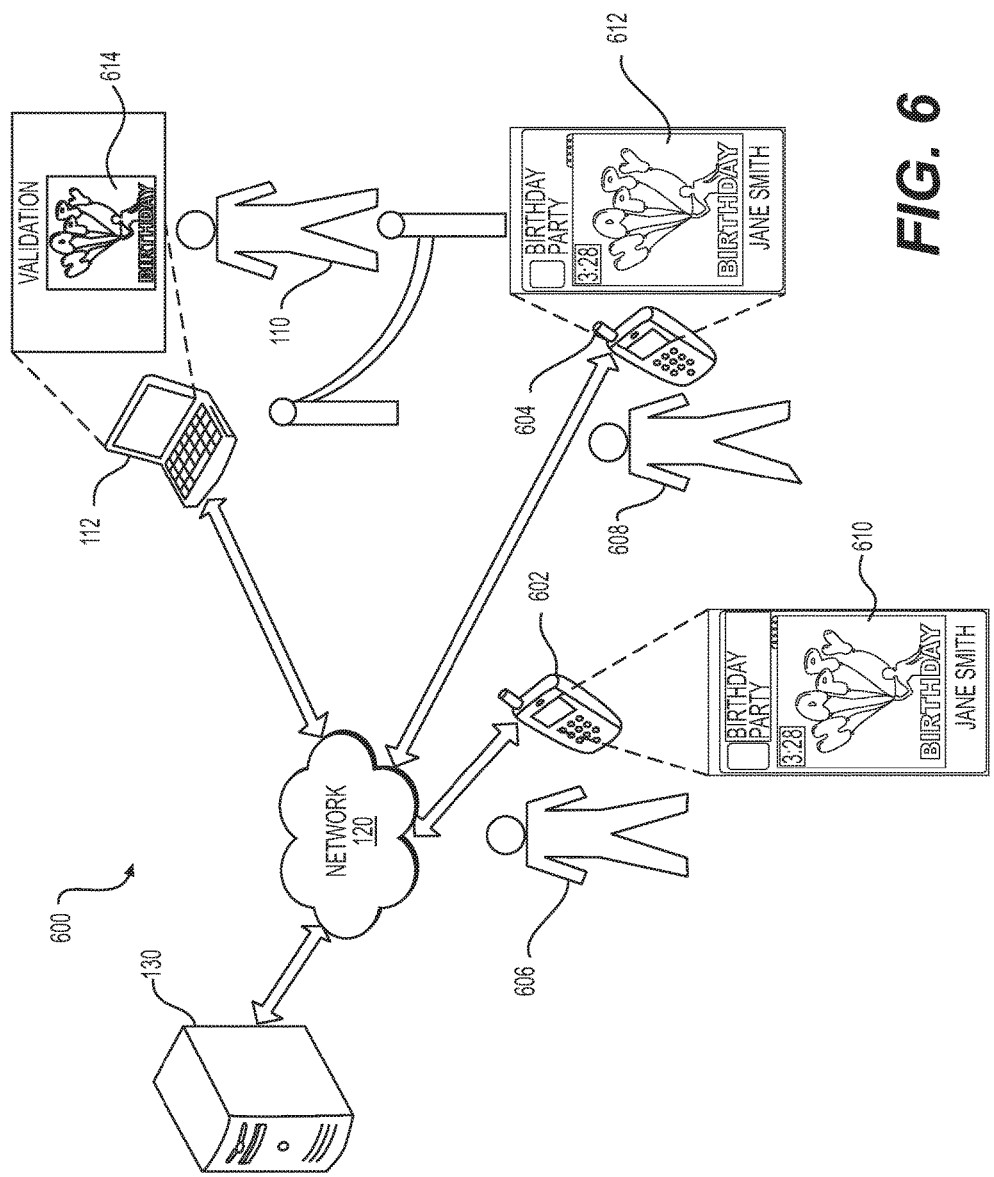
FIG. 6 is a diagram of an example system that manages animated graphical representations for credentials associated with users and groups of users, and permits a credential authority to validate the credentials for each user by visual inspection of the representations.

FIG. 6 illustrates an example system 600 that manages animated graphical representations for credentials associated with users and groups of users, and permits a credential authority to validate the credentials for each user by visual inspection of the representations. As an overview, in FIG. 6, applications for credential validation are executing on client devices 602, 604 and the processing system 112. These applications can access a common set of animated graphical representations, so that when the applications reference the same credential identifier, at substantially the same time, they can select the same animated graphical representation. Thus, the processing system 112 displays the same animated graphical representation as the client devices 602, 604, which enables the credential authority 110 to validate the representations on the client devices 602, 604 by visual inspection.

As an initial matter, the server 130 creates credentials (e.g., identified by credential identifiers) and user accounts (e.g., identified by user identifiers) based on input from credential grantors and/or users, and then associates credential identifiers with user identifiers as described above. For example, a party host may create a credential and then associate user identifiers for all of the invitees (e.g., users 606, 608) with the credential identifier to enable the invitees to gain admittance to the party. As another example, users' client devices 602, 604 may send a request to the server 130 to be associated with a given credential. This may occur, for instance, if party invitees RSVP for a party by interacting with the server 130, or if tickets for an event are available to the general public. The server 130 also may notify the users 606, 608 that they have been associated with the credential, for example by pushing notifications to the respective users' client devices 602, 604. Such notifications may include the credential identifier for the credential and/or the user identifier.

In more detail, a server 130 communicates via a network 120 with client devices 602, 604 operated by users 606, 608. The server 130 also communicates via network 120 with a processing system 112 associated with (e.g., operated by) a credential authority 110. The client device 602 of user 606 is executing an application that displays an animated graphical representation 610 for a credential (a "Birthday" animation that may involve the girl with the balloons dancing and then releasing the balloons into the air). The client device 604 of user 608 is executing an application that also is displaying an animated graphical representation 612 for the same credential (also the "Birthday" animation). In FIG. 6, the credential authority 110 operates the processing system 112 to validate the representation 612 by visually inspecting the representation, and then comparing it with a valid representation (e.g., animated graphical representation 614) for the credential obtained from the server 130 or the processing system 112. In the example, the animated graphical representation 614 visually matches the animated graphical representation 612 displayed on the client device 604, and therefore the user's representation of the credential 612 is validated. Also, it should be noted that the animated graphical representation 614 visually matches the animated graphical representation 610 displayed on the client device 602.

Multiple animated graphical representations are typically stored in a memory structure accessible to the client device 602, 604. The client devices 602, 604 may download the animated graphical representations, for example, from the server 130, or from any other suitable server. The memory structure may be any suitable persistent data store that can provide an application executing on the client device 602, 604 with access to the animated graphical representations, such as a file structure (e.g., ext4, Hierarchical File System Plus (HFS+), New Technology File System (NTFS)), or a database (e.g., SQLite). The animated graphical representations may be, for example, hypertext markup language (HTML) animations, animated graphical interchange formation (GIF) files, Motion Pictures Expert Group (MPEG) files, Adobe Flash® animations, or any combination thereof. An animation may be, for example, a sequence of images defined by one of these files.

Applications executing on the client device 602, 604 may access the stored graphical representations by way of index values, where an index value may correspond to a single representation. For example, in implementations where the representations are stored in a file system, an index value may correspond to a file name, for example, a uniform resource identifier (URI) to the file. In implementations where the representations are stored in a database, the index value may correspond to a particular database entry. However, in some implementations, multiple index values could identify one particular representation. For example, one index value could identify a file directory, and another could identify a particular file within that directory. Likewise, in some implementations, one index value could identify multiple representations, for example where the index value identifies a file directory including multiple representations. It should be appreciated that index values may identify graphical representations stored at any location. In other words, the graphical representations may be stored on the client devices 602, 604, at the server 130, or at any other location accessible via the network 120.

In operation, an application executing on the client device 602, 604 can use seed values (e.g., a credential identifier and a time) to generate an index value identifying a current graphical representation for a credential. The credential identifier can be obtained from a server 130 via the network 120 as described in more detail below. The time can be a current timestamp (e.g., seconds or milliseconds from epoch) obtained from a timing device such as a hardware or software clock located at the client device. In some implementations, the timing device can be synchronized with the server 130, and/or with one or more additional servers that provide a master clock reference as described below. Additional seed values may be used, such as a user identifier, a group identifier, and/or randomly generated numbers. When a user identifier is used as a seed value, the graphical representation for the credential may be specific to a particular user. Likewise, when a group identifier is used, the graphical representation for the credential may be specific to a particular group. When a randomly generated number is used, it may be stored by the server 130 and associated with the credential identifier and a user or group identifier for additional security.

The client device may map the seed values to index values using any suitable technique. The technique may allow applications executing on different client devices to generate the same index values given the same input values (e.g., the same credential identifier and time). For example, the credential identifier could be used to seed a pseudo-random number generator function, and then the resulting value could be added to a value representing the time. In such cases, the pseudo-random number generator function may be configured so that different computers can generate the same value when they are called at substantially the same time and receive the same credential identifier as a seed value. The seed values can be concatenated, manipulated using mathematical functions, hashed using a hash function such as MD5, SHA-1 or SHA-2, subsampled to select a predetermined subset or subsets, or any combination of these techniques to generate a suitable number of parameters.

The animated graphical representations may be stored in collections. In some versions, these collections may be characterized by different themes. For example, collections of representations may have themes directed to, among other things: birthdays, general parties, abstract graphics, night life, animals, famous works of art, geographical locations, etc. In some implementations, the theme may be selected by the credential grantor. For example, a collection with an animal theme may include animations showing a dog, a cat, and a horse. In some implementations, the client device 602, 604 may select at least two index values based on the seed values, a first index value identifying a collection, and a second index value identifying a graphical representation within that collection.

As an example of selecting a graphical representation based on a credential identifier and a time, assume that an application executing on the client device 602 obtains a credential identifier with a value of 1000 and a time since epoch value of 1341523271. Assume further that the client device 602 includes a memory having collections of graphical representations, one of which is the animal themed collection described above having three animated graphical representations (e.g., a dog animation, a cat animation, and a horse animation). The credential identifier and the time could then be added to produce a resulting value (1000+1341523271=1341533271), and the resulting value normalized to generate an index value that identifies one of the three animated graphical representations. A simple implementation could use a modulo operation to derive a value from '0' to '2', where '0' identifies the dog animation, '1' identifies the cat animation, and '2' identifies the horse animation. In this example, 1341533271% 3='0', which corresponds to the index value for the dog. Consequently, the dog animation may be selected as the graphical representation for the credential at that time. While only three animations are described above for exemplary purposes, in implementations there may be many thousands or more animations from which the animation could be selected.

Moreover, assume that an application executing on client device 604 had access to the same animal themed collection. This application could then generate the same index value, and therefore select the same dog animation as selected by client device 602, if it used the same credential identifier at the same time. Furthermore, timing devices on the client devices 602, 604 may be synchronized as described elsewhere herein so that they indicate substantially the same time. And in some implementations, the times at which new index values may be generated are limited, for example to predetermined multiples of 1 minute, 5 minutes, or 10 minutes, so that applications on separate client devices may produce matching index values.

In some implementations, the animated graphical representation may be periodically changed. For example, when the client device 602, 604 begins to display an animated graphical representation, it also may initialize a timer that counts down during a predetermined time interval (e.g., between about 1 minute and about 10 minutes). The client device 602, 604 can then monitor the timer while displaying the current animated graphical representation. When the timer expires, the client device 602, 604 can reset the timer and select a new animated graphical representation. The client device 602, 604 also may output the timer to the display of the client device 602, 604 to indicate the amount of time remaining until the current graphical representation will be changed.

When the client device 602, 604 selects a new animated graphical representation, it may make the selection based on a predetermined progression through the animated graphical representations in a collection. For example, using the animal themed collection described above, the predetermined progression could establish that: 1) an application displaying the dog animation would retrieve the cat animation next; 2) an application displaying the cat animation would access the horse animation next; and 3) an application displaying the horse animation would access the dog animation next. Advantageously, such a progression may enable applications executing on different client devices to continually rotate through matching animated graphical representations for a credential over a period of time. Thus, in this example, if the dog animation were initially selected as described above, the next animation to be displayed would be the cat animation. The server 130 may separately provision the predetermined progression on the client devices 602, 604, and in some implementations, may change the predetermined progression periodically. Additionally, the progression may be different for different credentials, for example, for a different credential the progression may be the horse animation first, then the cat animation, and then the dog animation. In some implementations, the client device 602, 604 may display the previous and/or next animation in the progression concurrently with displaying the current animation, which may provide an additional layer of verification.

In other implementations, the client device 602, 604 may select a new animated graphical representation by generating a new index value or values based on a current time from the timing device. To continue the example above ('0' identifies the dog animation, '1' identifies the cat animation, and '2' identifies the horse animation), upon expiration of the timer, the client device 602, 604 could use the credential identifier (e.g., 1000) and a current time (e.g., 1341523381) to select a new index value. In this example, 1000+1341523381=1341533381, 1341533381% 3=2, and therefore the horse animation would be selected.

Animated graphical representations for multiple credentials may be displayed concurrently. This may be implemented, for example, when credentials represent a hierarchy of access. As an example, if Mr. John Smith is an employee of Company X, and also authorized to access the 12th floor of Company X's headquarters, he may have two credentials, i.e., a first credential identifying Mr. Smith as an employee who is authorized to enter the headquarters, and a second authorizing Mr. Smith to access the 12th floor. In such implementations, graphical representations for the first credential and the second credential may both be displayed at the same time so that a credential authority can permit Mr. Smith access to the 12th floor.

Advantageously, using animated graphical representations for the credential makes replication difficult (i.e., individuals cannot readily forge the representation by taking photographs), but visual inspection for validation is straightforward. For example, when user 608 presents the animated graphical representation 612 that matches the animated graphical representation 614 on the display of the processing system 112, the credential authority 110 can readily validate the user's representation by visual inspection.

The credential authority 110 performs validation using the processing system 112. Specifically, the processing system 112 obtains a credential identifier and a time from a timing device, and selects an animated graphical representation for the credential in the same manner described above for the client devices 602, 604. When the timing device at the processing system 112 is synchronized with the timing devices at client devices 602, 604 as described below, the index values generated at the processing system 112 should be substantially identical to those of the client devices 602, 604 when the credential identifiers are the same. The graphical representation selected by processing system 112 should therefore match (or nearly match) the graphical representations on the client devices 602, 604.

In some versions, the client device 602, 604 also may obtain an image of the user 606, 608 for additional security. The client device 602, 604 may display this image before, after, and/or during display of the graphical representation for the credential. The image of the user also may be presented to the credential authority 110 for authentication of the user 606, 608. The user image may be obtained from, for example, a memory of the client device 602, 604, or a server such as a social networking web-server. Obtaining a user image from a social networking web-server may be advantageous in some implementations because a user is unlikely to store an image of someone else in their social networking profile because this might confuse their "friends" in the context of the social network. The user image also may be obtained from a database of photographs maintained by the credential grantor (e.g., an employee directory in the case where the credential represents an employee badge). In some instances, the user image may be provided by the credential grantor as part of granting the credential in the first instance (e.g., the credential grantor provides the credential application access to a database of images for the potential credential holders).

Figure 7:
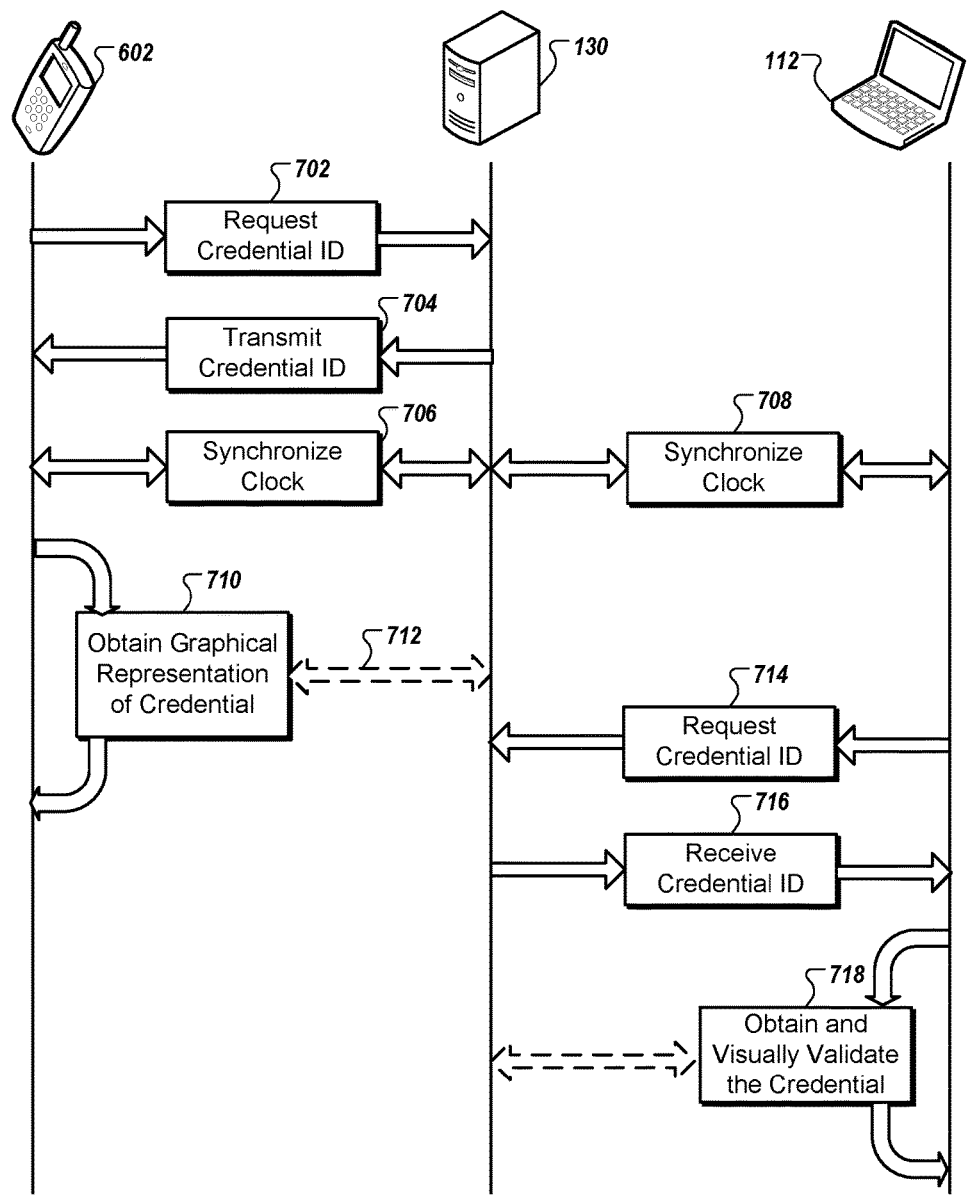
FIG. 7 is a messaging diagram that illustrates sample messages between a client device, server, and processing system in a system that manages animated graphical representations for credentials associated with users and groups of users, and permits a credential authority to validate the credentials for each user by visual inspection of the representations.

FIG. 7 illustrates sample messages between a client device, server, and processing system in a system that manages animated graphical representations for credentials associated with users and groups of users, and permits a credential authority to validate the credentials for each user by visual inspection of the representations. The messages described below may be transmitted via any suitable protocol such as, for example, HTTP or SMS. Additionally, these example messages should not be considered limiting, as any suitable mechanism for performing the functions described could be used, and the messages could be sent or received in any suitable sequence.

In FIG. 7, initially, a client device 602 transmits a request message for a credential identifier 702 to a server 130. This request may be, for example, a request for credential identifiers associated with a user logged into the client device 202. The request also may be, for example, initiated in response to the operator of the client device 202 accepting an offer of a credential from a credential grantor (e.g., accepting an invitation to a party or event in the context of a party or event management software application). In response, the server 130 transmits a response message 704 to the client device 202 that includes a credential identifier. In some implementations, however, the server 130 may push the message including the credential identifier 704 to the client device 202 without first receiving a request message 702.

Next, the client device 602 and processing system 112 associated with the credential authority 110 synchronize timing devices (e.g., local clocks) with a master clock of the server 130 by transmitting synchronization messages 706 and 708 similarly to as described above in connection with FIG. 3. In step 710, the client device 602 obtains a graphical representation for the credential as described above using index values based on the credential identifier and the synchronized time. In some implementations, the client device 602 obtains the graphical representation from a memory structure incorporated within client device 602. Additionally or alternatively, as shown with dotted arrow 712, the graphical representation may be obtained from the server 130 in some implementations.

At some time, the user of the client device 602 presents the graphical representation for the credential to the credential authority 110 for validation. When this occurs, or any time before, the processing system 112 sends a message 714 requesting the credential identifier to the server 130. In response, the server 130 transmits a response message 716 to the processing system 112 that includes a credential identifier. In some implementations, however, the server 130 may push the message including the credential identifier 716 to the processing system 112 without first receiving a request message 714.

Finally, in step 718, the processing system generates a graphical representation for the credential. Since the timing device of the client device 602 and processing system 112 have been synchronized, and the credential identifier is the same, the index values used to obtain the animated graphical representation will be the same. The animated graphical representation for the credential rendered at the client device 602 and the processing system 112 will therefore visually match.

Figure 8:
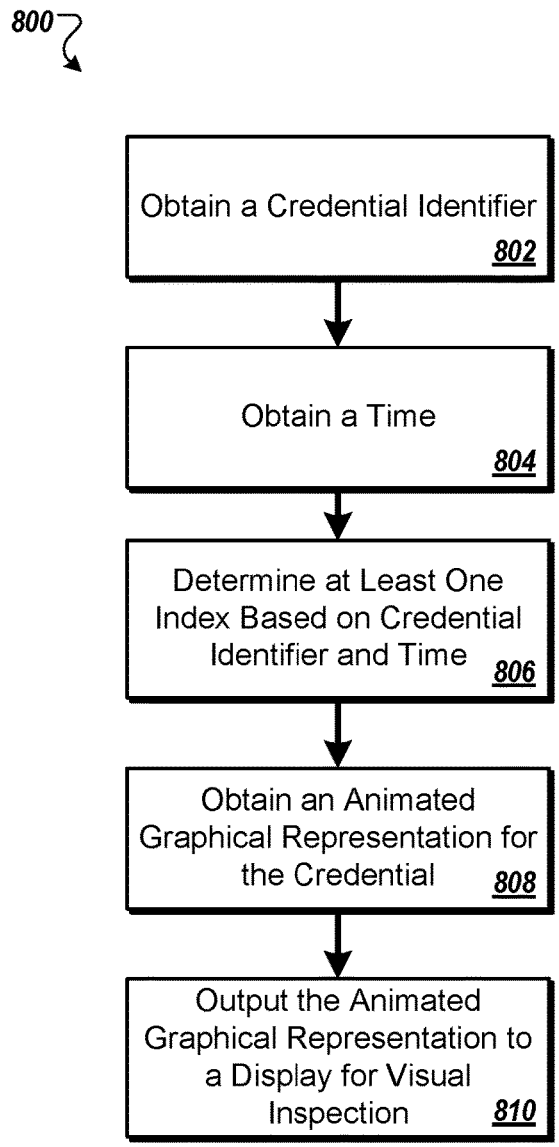
FIG. 8 is a flowchart of an example process for provisioning a client device with an animated graphical representation for a credential and presenting the representation for validation of the credential.

FIG. 8 shows an example process 800 for provisioning a client device with an animated graphical representation for a credential and presenting the representation for validation of the credential. As shown, in step 802, a client device obtains a credential identifier associated with a user. Next, in step 804, the client device obtains a time derived from a timing device of the client device. In some implementations, this time may be the client device clock time+/−an offset calculated based on having synchronized the client device's clock with one or more server(s). Based on the credential identifier and the time, in step 806 the client device determines at least one index value. Then, in step 808, based on the at least one index value, the client device obtains a current animated graphical representation of a credential associated with the user. In other words, there may be a large number of animations, which may be organized in collections, that are accessible to the client device. The index value (or index values) correspond to an identifier associated with one of the collections and/or with one of the animations, thereby enabling the selection of an animation from a collection of animations. Finally, in step 810, for presentation to a credential authority 110, the client device outputs, to a display of the client device, the current animated graphical representation in a manner that enables a credential authority to validate the credential by visual inspection of the current animated graphical representation for the credential.

In some implementations, the graphical representation may be an HTML animation, a GIF file, an MPEG file, or a Flash file. The client device may output the HTML animation, the GIF file, the MPEG file, or the Flash file to the display of the client device in a manner that enables a credential authority to validate the credential by visual inspection of the HTML animation, the GIF file, the MPEG file, or the Flash file.

Furthermore, in some implementations, there may be a single index value, and the client device may select an animated graphical representation at that index value from a set of animated graphical representations for a credential. Moreover, the client device may initialize a timer at the client device and monitor the timer during display of the current animated graphical representation for the credential. Upon expiration of the timer, the client device may obtain a next animated graphical representation for a credential from the set of animated graphical representations for the credential based on a predetermined progression. Finally, the client device may output the next animated graphical representation to the display of the client device in a manner that enables the credential authority to validate the credential by visual inspection of the next animated graphical representation for the credential. The client device also may output, to the display of the client device, a graphical representation of the timer during display of the current animated graphical representation for the credential.

Certain implementations involve the client device outputting, to the display of the client device, a previous animated graphical representation for the credential during display of the current animated graphical representation for the credential. Similarly, some implementations involve the client device outputting, to the display of the client device, a future animated graphical representation for the credential during display of the current animated graphical representation for the credential. Displaying previous and/or future animated graphical representations may be helpful in providing an extra layer of verification. For example, it is possible that a given animation may be displayed at the same time for two different credentials. However, assuming that the two different credentials have different progressions, displaying the previous and/or future animation would minimize the chance of erroneous validation. In some implementations, the previous and/or future animations could be displayed in small thumbnails overlaid on the current animated graphical representation.

The client device also may obtain an image of the user and output, to the display of the client device, the image of the user during display of the graphical representation for the credential such that the credential authority can authenticate the user. The client device can obtain the image by retrieving, from a memory of the client device, the image of the user or by querying a server via a network connection and receiving, from the server over the network connection, the image of the user.

Validation of the graphical representations displayed by client devices may involve synchronizing the timing device of a client device with a clock of at least one server. Next, a timing device at a processing system is synchronized with the clock of the at least one server. The processing system is associated with (e.g., operated by) the credential authority. The processing system then obtains the credential identifier associated with the user and obtains a time measured by the timing device of the processing system. Next, the processing system determines at least one index value based on the credential identifier and the time. Based on the at least one index value, the processing system obtains a current animated graphical representation for the credential associated with the user. The processing system then outputs the current animated graphical representation to a display operatively coupled to the processing system, such that the current animated graphical representation for the credential associated with the user on the display operatively coupled to the processing system matches the current animated graphical representation for the credential associated with the user on the display of the client device.

In some cases, multiple users may be associated with any given credential identifier. In such implementations, multiple users' client devices may synchronize their respective timing devices with the clock of the at least one server. Then, the client devices obtain a credential identifier associated with the respective users and obtain a time derived from the timing device of their client devices. Next, the multiple client devices determine at least one index value based on the credential identifier associated with each respective user and the time. Based on the at least one index value, the client devices obtain a current animated graphical representation for the credential associated with the respective users. Finally, the client devices output the current animated graphical representation to respective displays of the client devices, such that the current animated graphical representation for the credential associated with the respective users on the displays of the their client devices match the current animated graphical representation for the credential on the display operatively coupled to the processing system.

In some versions, the client device may obtain the credential identifier by establishing a secure connection with a server (e.g., via HTTP Secure), sending, to the server, an identifier associated with the user, and then receiving, from the server, the credential identifier. The client device may retrieve animated graphical representations from a memory of the client device, or may query a server via a network connection and receive, from the server over the network connection, animated graphical representations for the credential associated with the user.

A given user may be associated with multiple credential identifiers. For example, a user's client device may obtain multiple credential identifiers associated with the user, and then determine index values based on the multiple credential identifiers and the time. Then, the client device can, based on the index values, obtain an animated graphical representation for each of the credentials associated with the user. The client device may output, to the display of the client device, the animated graphical representations in a manner that enables the credential authority to validate the multiple credentials by visual inspection of the animated graphical representations for the credentials. The client device may output to the display two or more of the animated graphical representations concurrently in a manner that enables a credential authority to validate multiple credentials at substantially the same time. This can allow visual inspection of the animated graphical representations for the multiple credentials in a manner that enables a credential authority to validate the multiple credentials by visual inspection of the graphical representations for the credentials.

In some implementations, the client device may initialize a timer at the client device and monitor the timer during display of the current animated graphical representation for the credential. Upon expiration of the timer, the client device may obtain an updated time measured by the timing device. Then, the client device may update the previously determined at least one index value based on the credential identifier and the updated time. Next, based on the updated at least one index value, the client device may obtain a different animated graphical representation for a credential associated with the user. Finally, the client device may output the different animated graphical representation to the display of the client device in a manner that enables the credential authority to validate the credential by visual inspection of the second animated graphical representation for the credential.

Figure 9:
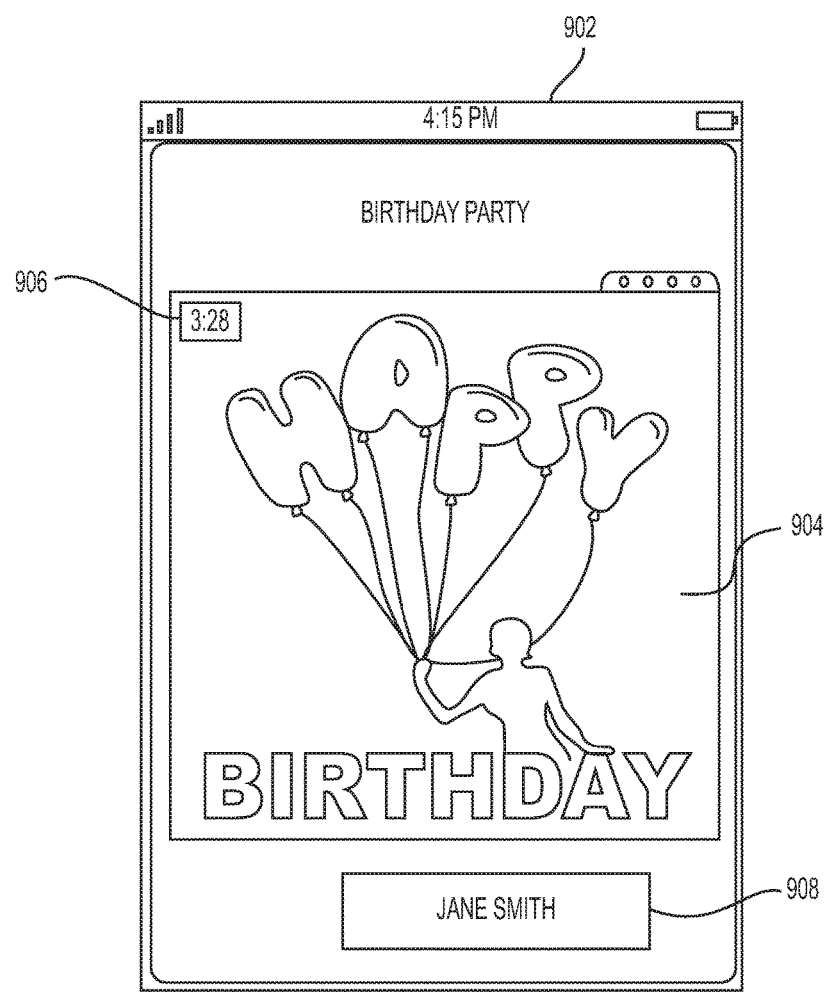
FIG. 9 is a screenshot of a sample client device for certain implementations that involve provisioning a client device with an animated graphical representation for a credential and presenting the representation for validation of the credential.

FIG. 9 shows a screenshot of a sample client device for certain implementations that involve provisioning a client device with an animated graphical representation for a credential and presenting the representation for validation of the credential. In particular, FIG. 9 shows a display of a client device 902 that includes an animated graphical "Happy Birthday" representation 904. The display 902 also includes a timer 906 indicating the time remaining until the animated graphical representation will be updated (i.e., 3 minutes, 28 seconds). The display 902 further includes a user's name 908 (i.e., "Jane Smith").

Phrases Corresponding to Credentials

Figure 10:
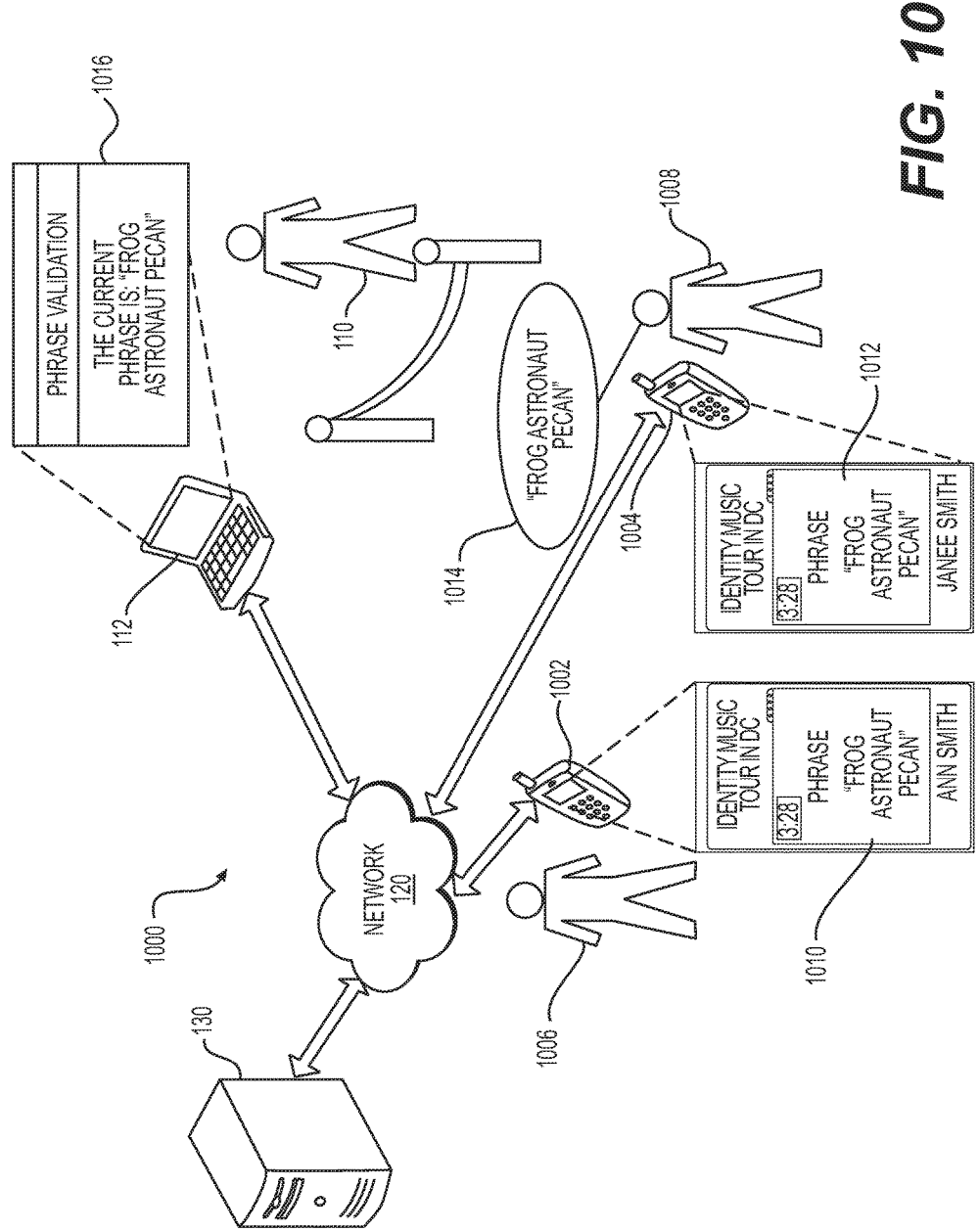
FIG. 10 is a diagram of an example system that manages phrases associated with credentials for users and groups of users, and permits a credential authority to validate the credentials for each user by comparing the phrases with phrases obtained from a server.

FIG. 10 shows an example system 1000 that manages phrases associated with credentials for users and groups of users, and permits a credential authority to validate the credentials for each user by comparing the phrases with phrases obtained from a server. As used herein, a phrase is a sequence of two or more words selected from one or more dictionaries of words that need not form a grammatical construct. A dictionary as used herein is a data structure in which index values identify words. A given dictionary may include many thousands or more different words. As an overview, in FIG. 10, applications for credential validation are executing on client devices 1002, 1004 and the processing system 112. These applications can access a common set of dictionaries for generating phrases, so that when the applications reference the same index values in the same dictionaries, at substantially the same time, they can select the same phrases. Thus, the processing system 112 displays the same phrase as the client devices 1002, 1004, which enables the credential authority 110 to validate the phrases on the client devices 1002, 1004.

As an initial matter, the server 130 creates credentials (e.g., identified by credential identifiers) and user accounts (e.g., identified by user identifiers) based on input from credential grantors and/or users, and then associates credential identifiers with user identifiers as described above. For example, a party host may create a credential and then associate user identifiers for all of the invitees (e.g., users 1006, 1008) with the credential identifier to enable the invitees to gain admittance to the party. As another example, users' client devices 1002, 1004 may send a request to the server 130 to be associated with a given credential. This may occur, for instance, if party invitees RSVP for a party by interacting with the server 130, or if tickets for an event are available to the general public. The server 130 also may notify the users 1006, 1008 that they have been associated with the credential, for example by pushing notifications to the respective users' client devices 1002, 1004. Such notifications may include the credential identifier for the credential and/or the user identifier.

In more detail, a server 130 communicates via a network 120 with client devices 1002, 1004 operated by users 1006, 1008. The server 130 also communicates via network 120 with a processing system 112 associated with (e.g., operated by) a credential authority 110. The client device 1002 of user 1006 is executing an application that displays a phrase 1010 corresponding to a credential (i.e., "frog astronaut pecan"). The client device 1004 of user 1008 is executing an application that also is displaying a phrase 1012 corresponding to the credential (i.e., "frog astronaut pecan"). As shown, the user makes an utterance 1014 (i.e., "frog astronaut pecan") that corresponds to the phrase 1012 to the credential authority 110. The credential authority 110 operates the processing system 112 to validate the utterance 1012 by recognizing the phrase, and then comparing it with a valid phrase for the credential (e.g., phrase 1016 "frog astronaut pecan"), which is obtained from the server 130 or the processing system 112. In the example, the phrase 1016 on the display operatively coupled to the processing system 112 matches the phrase 1012 from the client device 1004, and therefore the user is validated.

Words are typically stored in one or more dictionaries accessible to the client device 1002, 1004. The dictionaries may be stored in any suitable data structure (persistent or temporary) that can provide an application executing on the client device 1002, 1004 with access to the words, such as a property list, hashmap, or database (e.g., MySQL, or SQLite). The words may be stored in a wide variety of dictionaries. In some versions, these dictionaries may be characterized by different content. For example, dictionaries may have content directed to: famous quotes, Latin words, celebrities, animals, food, geographical locations, etc. In some implementations, the client device 1002, 1004 may select at least two index values based on the seed values, a first index value identifying a dictionary from among a collection of dictionaries, and a second index value identifying a word from among a collection of words within that dictionary. Moreover, each word within a phrase may be chosen separately. For example, given a single dictionary and a phrase that is to include three words, the client device may select three different index values so as to choose three different words from the dictionary. Alternatively, when there are multiple dictionaries, the client device may select dictionaries from which the words are to be selected, and then select the particular words from the selected dictionaries.

Applications executing on the client device 1002, 1004 may access dictionaries by way of index values, where an index value can identify a single word or a group of words. For example, in implementations where the words are stored in a property list, an index value may correspond to a key that stores a word as its value. In implementations where the words are stored in a database, the index value may correspond to a particular database entry. However, in some implementations, multiple index values could identify one particular word or group of words. For example, one index value could identify a specific dictionary (e.g., one hashmap in a collection of hashmaps), and another index value could identify a particular word within that dictionary (e.g., a key from the identified hashmap). Likewise, in some implementations, one index value could identify multiple words, for example where the index value identifies a group of words.

It should be appreciated that index values may identify words stored in dictionaries at any location. In other words, the dictionaries may be stored on the client devices 1002, 1004, at the server 130, or at any other location accessible via the network 120. Furthermore, multiple index values for a single phrase can refer to dictionaries stored at different locations. For example, one index value may refer to a dictionary located at a client device 1002, 1004, and a second index value may refer to a dictionary located at the server 130.

In operation, an application executing on the client device 1002, 1004 can use seed values (e.g., a credential identifier and a time) to generate one or more index values identifying a phrase for a credential. The credential identifier can be obtained from a server 130 via the network 120 as described in more detail below. The time can be a current timestamp (e.g., seconds or milliseconds from epoch) obtained from a timing device such as a hardware or software clock located at the client device. In some implementations, the timing device can be synchronized with the server 130, and/or with one or more additional servers that provide a master clock reference as described below. Additional seed values may be used, such as a user identifier, a group identifier, and/or randomly generated numbers. When a user identifier is used as a seed value, the graphical representation for the credential may be specific to a particular user. Likewise, when a group identifier is used, the graphical representation for the credential may be specific to a particular group. When a randomly generated number is used, it may be stored by the server 130 and associated with the credential identifier and a user or group identifier for additional security.

The client device may map the seed values to index values using any suitable technique. The technique may allow applications executing on different client devices to generate the same index values given the same input values (e.g., the same credential identifier and time). For example, the credential identifier could be used to seed a pseudo-random number generator function, and then the resulting value could be added to a value representing the time. In such cases, the pseudo-random number generator function may be configured so that different computers can generate the same value when they are called at substantially the same time and receive the same credential identifier as a seed value. The seed values can be concatenated, manipulated using mathematical functions, hashed using a hash function such as MD5, SHA-1 or SHA-2, subsam pled to select a predetermined subset or subsets, or any combination of these techniques to generate a suitable number of index values. The server 130 may separately provision the seed value to index value mapping schema onto the client devices 1002, 1004, and, in some implementations, may change the mapping periodically.

The phrases may be periodically changed to add security. For example, when the client device 1002, 1004 begins to display a phrase, it also may initialize a timer that counts down during a predetermined time interval (e.g., between about 1 minute and about 10 minutes). The client device

1002, 1004 can then monitor the timer while displaying the current phrase. When the timer expires, the client device 1002, 1004 can reset the timer and select a new phrase. The client device 1002, 1004 also may output the timer to the display of the client device 1002, 1004 to indicate the amount of time remaining until the current phrase expires.

As an example of selecting a phrase based on a credential identifier and a time, assume that an application executing on the client device 1002 obtains a credential identifier with a value of 1000 and a time since epoch value of 1341523271. Assume further that the client device 1002 includes a memory having a dictionary of words identified by index values. The credential identifier and the time could then be added to produce a resulting value (1000+1341523271=1341533271), and the resulting value can be manipulated to generate three different index values. A simple implementation could use various modulo operations to derive three index values from the resulting value. For example, assume that in the dictionary, '71' identifies the word "frog," '51' identifies the word "astronaut," and 7 identifies the word "frog." Sample divisors of 100 for the first index value, 60 for the second index value, and 16 for the third index value would therefore yield "frog," "astronaut," and "pecan," which could be concatenated to form the phrase "frog astronaut pecan."

Moreover, assume that an application executing on client device 1004 had access to the same dictionary. This application could then generate the same index values, and therefore select the same phrase as selected by client device 1002, if it used the same credential identifier at the same time. Furthermore, timing devices on the client devices 1002, 1004 may be synchronized as described elsewhere herein so that they indicate substantially the same time. And, in some implementations, the times at which new index values may be generated are limited, for example to predetermined multiples of 1 minute, 5 minutes, or 10 minutes, so that applications on separate client devices may produce matching index values.

The current phrase can be presented for validation in several ways. For example, the client device 1004 could output an audio signal from a speaker corresponding to the current phrase that would be received by the processing system 112. This audio signal could be a normal audible signal (e.g., 20 Hz to 20 kHz), or it could be an ultrasonic signal (e.g., >20 kHz) that is detectable by a microphone on the processing system 112. As another example, the client device 1004 may transmit the numeric value to the processing system using digital radio-frequency communications, e.g., near-field communications (NFC) or Bluetooth.

Alternatively, the user 1008 of the client device 1004 could utter the phrase to the credential authority 110. In such implementations, the processing system 112 may perform speech recognition on the utterance to determine whether it corresponds to a valid phrase. Moreover, the processing system 112 could obtain a voice recognition profile for the user 1008, and based on this voice recognition profile, authenticate the user. The processing system 112 may perform speech recognition (e.g., identification of words and phrases in spoken language to convert them to a transcription) according to any suitable technique.

The processing system 112 also may perform voice recognition (e.g., the recognition of the voice of a particular person as an identifier of the person) by, for example, comparing the features of the user's voice with those of voice recognition profiles stored in one or more voice recognition dictionaries. Because the processing system 112 knows a priori what the words in the phrase should be, it may be able to readily match the voice of the user to an authorized person in a voice recognition dictionary. Such voice recognition can advantageously provide a second level of user authentication in addition to the phrase itself. As another example, the processing system 112 may access a record of all the users who have been granted the current credential, where the record includes voice signatures of the authorized users. The processing system may then compare the voice signature of the user with the voice signatures of all the authorized users to authenticate the user. Any other suitable technique of voice recognition could be used.

In addition, the client device 1002, 1004 and/or the processing system 112 also may display an image of the user 1006, 1008 for additional security. For example, responsive to authenticating a user by voice recognition, the processing system 112 may obtain the user's image from, for example, a memory of the processing system 112, the server 130, the credential grantor, or another server such as a social networking web-server. Moreover, the client device may obtain the user's image from, for example, a memory of the client device 1002, 1004, the credential grantor, or a server such as a social networking web-server. The client device 1002, 1004 may display this image before, after, and/or during presentation of the phrase corresponding to the credential for authentication of the user 1006, 1008.

Phrases for multiple credentials may be displayed concurrently. This may be implemented, for example, when credentials represent a hierarchy of access. As an example, if Mr. John Smith is an employee of Company X, and also authorized to access the 12th floor of Company X's headquarters, he may have two credentials, i.e., a first credential identifying Mr. Smith as an employee who is authorized to enter the headquarters, and a second authorizing Mr. Smith to access the 12th floor. In such implementations, phrases corresponding to the first credential and the second credential may both be presented at the same time so that a credential authority can permit Mr. Smith access to the 12th floor.

The credential authority 110 performs validation using the processing system 112. Specifically, the processing system 112 obtains a credential identifier and a time from a timing device, and selects a phrase corresponding to the credential in the same manner described above for the client devices 1002, 1004. When the timing device at the processing system 112 is synchronized with the timing devices at client devices 1002, 1004 as described below, the index values generated at the processing system 112 should be identical to those of the client devices 1002, 1004 when the credential identifiers are the same. The phrases selected by processing system 112 should therefore match the phrases at the client devices 1002, 1004.

Alternatively or additionally, the server 130 may select phrases as described above, and then communicate the phrases to client devices 1002, 1004. The processing system 112 may then receive the correct phrase from the server 130 and compare it to phrases presented by the client devices 1002, 1004, or the processing system 112 may communicate the phrases from the client devices 1002, 1004 to the server 130 for validation.

Figure 11:
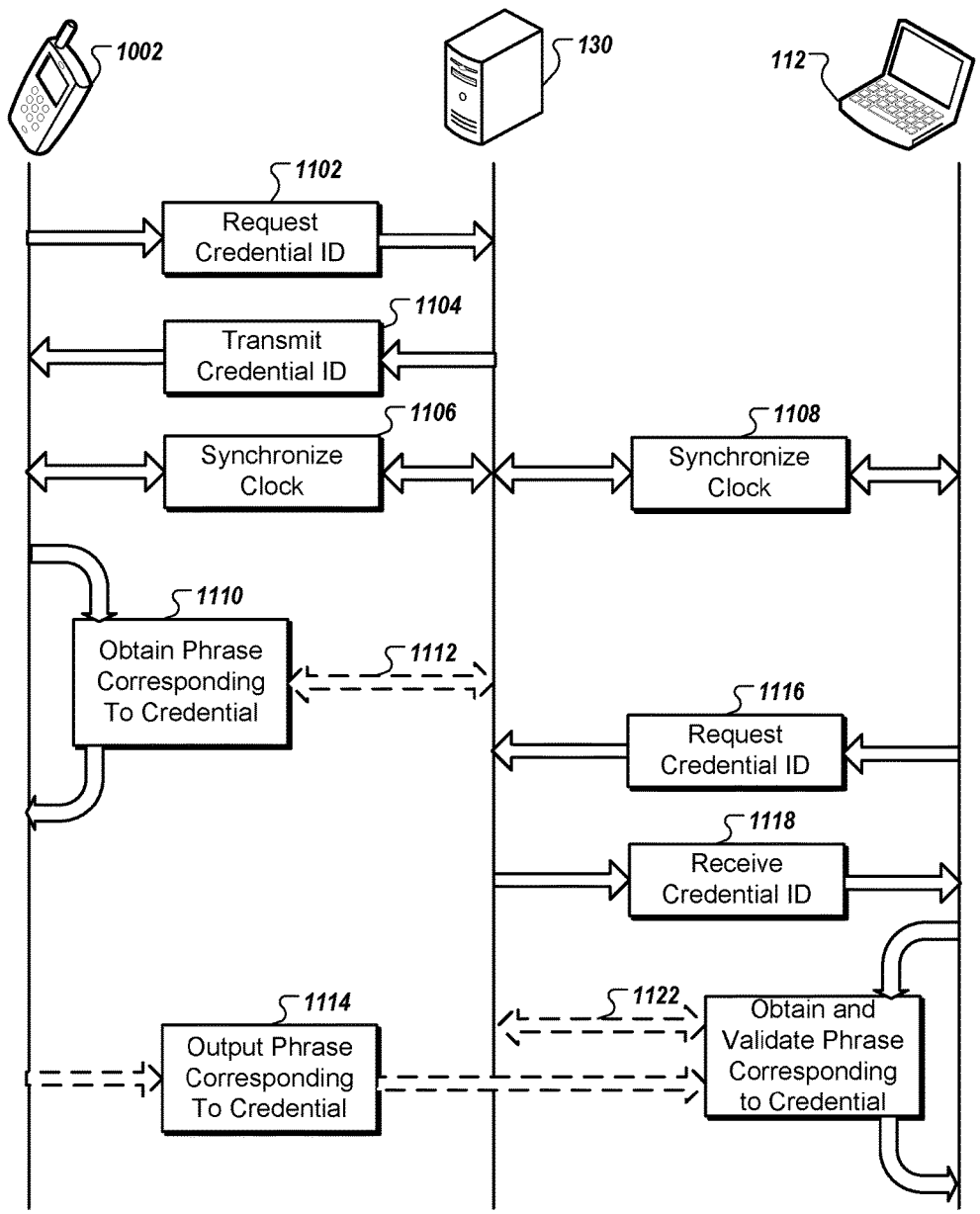
FIG. 11 is a messaging diagram that illustrates sample messages between a client device, server, and processing system in a system that manages phrases associated with credentials for users and groups of users, and permits a credential authority to validate the credentials for each user by comparing the phrases with phrases obtained from a server.

FIG. 11 illustrates sample messages between a client device, server, and processing system in a system that manages phrases associated with credentials for users and groups of users, and permits a credential authority to validate the credentials for each user by comparing the phrases with phrases obtained from a server. The messages described below may be transmitted via any suitable protocol such as, for example, HTTP or SMS. Additionally, these example messages should not be considered limiting, as any suitable mechanism for performing the functions described could be used, and the messages could be sent or received in any suitable sequence.

In FIG. 11 initially, a client device 1002 transmits a request message for a credential identifier 1102 to a server 130. This request may be, for example, a request for credential identifiers associated with a user logged into the client device 202. The request also may be, for example, initiated in response to the operator of the client device 202 accepting an offer of a credential from a credential grantor (e.g., accepting an invitation to a party or event in the context of a party or event management software application). In response, the server 130 transmits a response message 1104 to the client device 1002 that includes a credential identifier. In some implementations, however, the server 130 may push the message including the credential identifier 1104 to the client device 1002 without first receiving a request message 1102.

Next, the client device 1002 and processing system 112 associated with the credential authority 110 synchronize timing devices (e.g., local clocks) with a master clock of the server 130 by transmitting synchronization messages 1106 and 1108 as described above. In step 1110, the client device 1002 obtains a phrase corresponding to the credential as described above using index values based on the credential identifier and the synchronized time. As shown with dotted arrow 1112, the client device 1002 may obtain a portion, or the entire phrase from the server 130 in some implementations.

At some time, the user of the client device 1002 will present the phrase corresponding to the credential to the credential authority 110 for validation. In some implementations, the phrase is output directly from the client device 1002, for example as an audio signal, in step 1114. When the phrase is presented, or any time before, the processing system 112 sends a message 1116 requesting the credential identifier to the server 130. In response, the server 130 transmits a response message 1118 to the processing system 112 that includes a credential identifier. In some implementations, however, the server 130 may push the message including the credential identifier 1118 to the processing system 112 without first receiving a request message 1116.

Finally, in step 1120, the processing system 112 obtains the current phrase from the server 130 (as shown by dotted arrow 1122) or from a memory accessible to the processing system 112. Since the timing device of the client device 1002 and processing system 112 have been synchronized, and the credential identifier is the same, the index values used to obtain the phrases will be the same. The phrases for the credential presented at the client device 1002 and displayed at the processing system 112 will therefore match.

Figure 12:
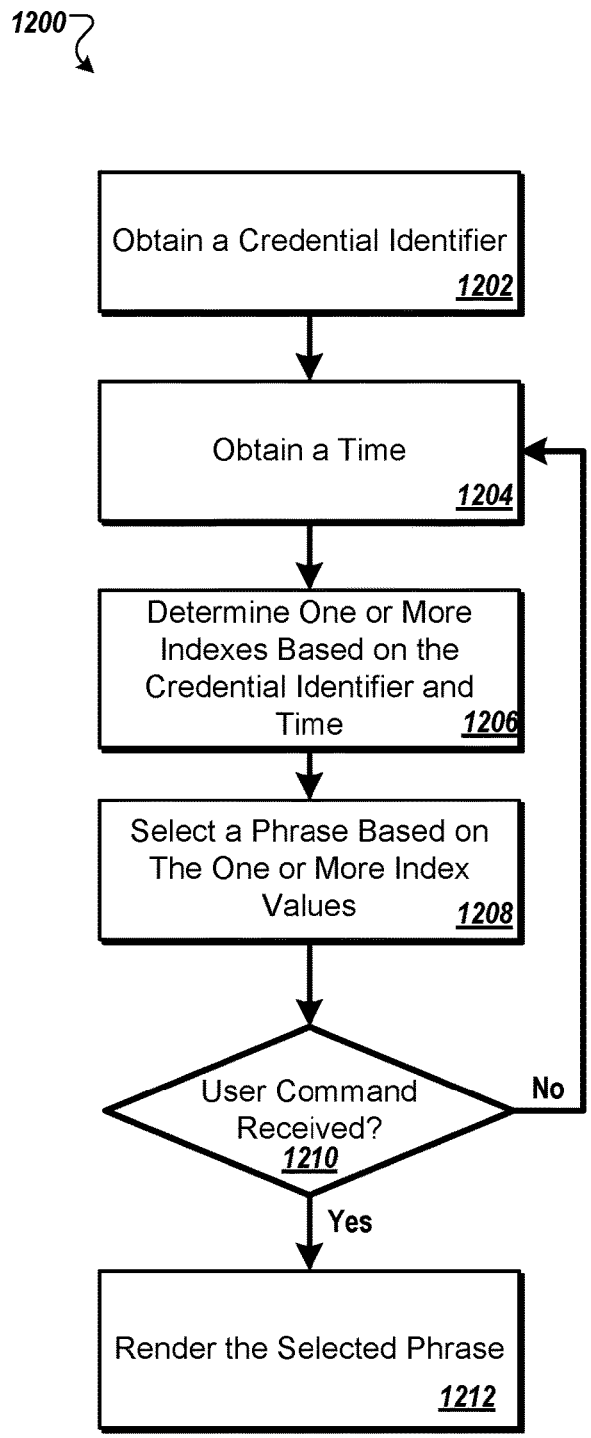
FIG. 12 is a flowchart of an example process for provisioning a client device with a phrase associated with a credential and presenting the phrase for validation of the credential.

FIG. 12 shows an example process 1200 for provisioning a client device with a phrase associated with a credential and presenting the phrase for validation of the credential. As shown, in step 1202, a client device obtains a credential identifier associated with a user In step 1204, the client device obtains a time derived from a timing device of the client device. Then, based on the credential identifier and the time, in step 1206 the client device determines at least one index value. And then, in step 1208, based on the at least one index value, the client device selects a phrase corresponding to a credential, where the credential is associated with the user. The preceding three steps may be performed periodically, at a predetermined time period, e.g. to ensure that the phrases are synchronized across different devices, although they need not be performed in the specified order. Then, at some time in step 1210, the client device receives a user command to output the selected phrase. Responsive to the user command, the client device renders the selected phrase corresponding to the credential in step 1212. Alternatively, the client device may not determine a phrase until it receives a request from a user for the phrase. In such cases, the time may be rounded to a predetermined increment so as to permit synchronization with phrases on other client devices.

In some implementations, the client device outputs an audio signal corresponding to the selected phrase to a speaker at the client device. Furthermore, the speaker at the client device may output the audio signal at a frequency greater than 20 kHz. Such frequencies may be ultrasonic, and therefore not perceptible to the human ear.

Alternatively, the user may utter the selected phrase corresponding to the credential in a manner that enables the credential authority to validate the credential by performing speech recognition on the selected phrase uttered by the user. In such implementations, the processing system may obtain a voice recognition profile of the user and perform voice recognition on the selected phrase uttered by the user to authenticate the user.

Some versions also involve outputting, to a display of the client device, a graphical representation of a timer associated with each selected phrase, where the timer displays an amount of time remaining until a new phrase will be selected.

The client device also may obtain an image of the user and output, to the display of the client device, the image of the user during display of the graphical representation for the credential such that the credential authority can authenticate the user. The client device can obtain the image by retrieving, from a memory of the client device, the image of the user or by querying a server via a network connection and receiving, from the server over the network connection, the image of the user.

Validation of the phrases presented at the client devices may involve synchronizing the timing device of a client device with a clock of at least one server. Next, at timing device at a processing system is synchronized with the clock of the at least one server. The processing system is associated with (e.g., operated by) the credential authority. The processing system then obtains the credential identifier associated with the user and obtains a time derived from the timing device of the processing system. Next, the processing system determines at least one index value based on the credential identifier and the time. Based on the at least one index value, the processing system selects a phrase corresponding to the credential associated with the user. The processing system then outputs a visual representation of the selected phrase corresponding to the credential associated with the user, such that the visual representation of the selected phrase corresponding to the credential associated with the user matches the selected phrase rendered at the client device.

Multiple users may be associated with any given credential identifier. In such implementations, multiple users' client devices synchronize their respective timing devices with the clock of the at least one server. Next, periodically, at a predetermined time period, the client devices perform the following three steps, although not necessarily in the following order. First, the client devices obtain a credential identifier associated with the respective users and obtain a time derived from the timing device of their client devices. Next, the multiple client devices determine at least one index value based on the credential identifier associated with each respective user and the time. Based on the at least one index value, the client devices then select a phrase corresponding to the credential. At some point, the client devices receive a command from their respective users to output the selected phrase corresponding to the credential. Then, responsive to the respective users' commands, the client devices render the selected phrases corresponding to the credential for the respective users.

In some versions, the client device may obtain the credential identifier by establishing a secure connection with a server (e.g., via HTTP Secure), sending, to the server, an identifier associated with the user, and then receiving, from the server, the credential identifier. The client device may retrieve a phrase from a memory of the client device, or may query a server via a network connection and receive, from the server over the network connection, a phrase corresponding to the credential.

Furthermore, the client device may determine a first index value and a second index value based on the credential identifier and the time. The client device may then obtain a first portion of the phrase corresponding to the credential based on the first index value, and obtain a second portion of the phrase based on the second index value. In certain aspects, the client device may then retrieve, from a memory of the client device, the first portion of the phrase corresponding to the credential based on the first index value, communicate the second index value to a server, and receive the second portion of the phrase from the server. Alternatively, both portions of the phrase could be retrieved from the client device.

Figure 13A:
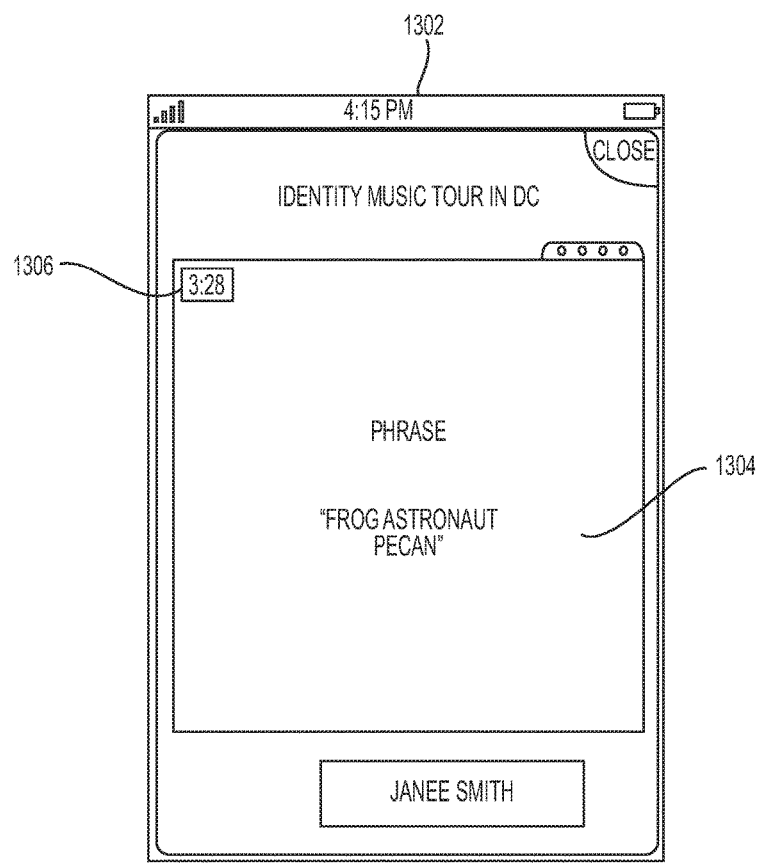
FIGS. 13a-b are screenshots of a sample client device for certain implementations that involve provisioning a client device with a phrase associated with a credential and presenting the phrase for validation of the credential.
Figure 13B:
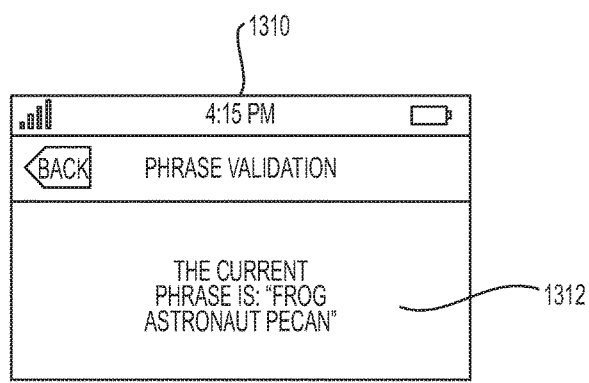

FIGS. 13a and 13b show a screenshot of a sample client device and a sample processing system respectively for certain implementations that involve provisioning a client device with a phrase associated with a credential and presenting the phrase for validation of the credential. In particular, FIG. 13a shows a display of a client device 1302 that includes a phrase 1304 ("frog astronaut pecan"). The display 1302 also includes a timer 1306 indicating the time remaining until the phrase will be updated (i.e., 3 minutes and 28 seconds).

FIG. 13b shows a display 1310 operatively coupled to a processing system, where the processing system is associated with a credential authority. In particular, a phrase 1312 ("frog astronaut pecan") is shown that matches the phrase 1304 from FIG. 13a. The credential authority can validate the client device by matching the phrase 1312 with the phrase 1304 from FIG. 13a.

Numeric Representations for Credentials

Figure 14:
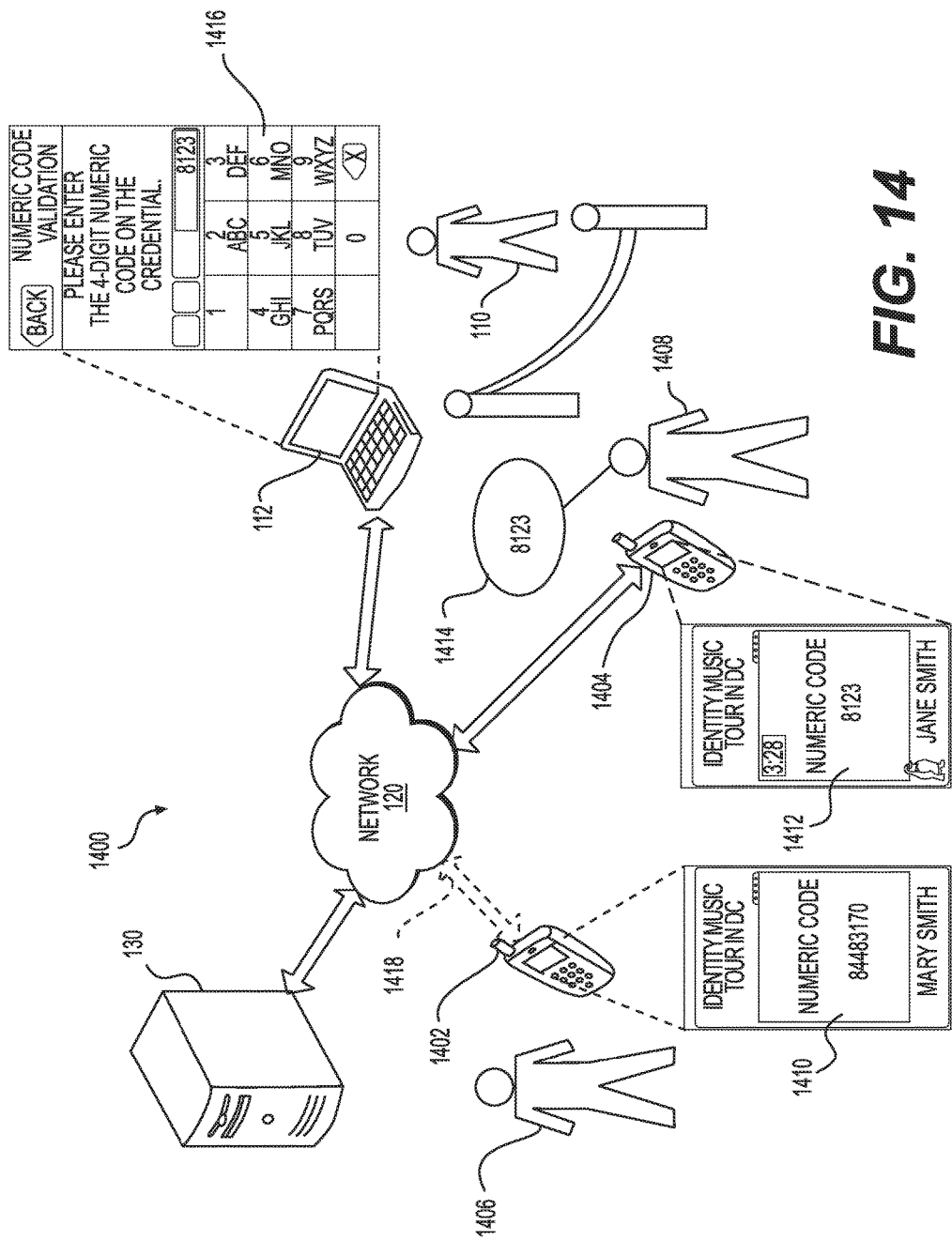
FIG. 14 is a diagram of an example system that manages numeric representations for credentials associated with users and groups of users, and permits a credential authority to validate the credentials for each user by inspection of the representations.

FIG. 14 shows an example system 1400 that manages numeric representations for credentials associated with users and groups of users, and permits a credential authority to validate the credentials for each user by inspection of the representations. As used herein, a numeric representation is a sequence of numbers (e.g., 4 to 24-digit integers) that is associated with a credential and a user. In some instances, a given numeric representation will only be valid for a certain time period. As an overview, in FIG. 14, applications for credential validation are executing on client devices 1402, 1404 and the processing system 112. The server 130 has associated a numeric representation 1410 with a user 1406 and a credential, and distributed the numeric representation 1410 to the user's client device 1402. Similarly, the server 130 has associated a numeric representation 1412 with a user 1408 and the credential, and distributed the numeric representation 1412 to the user's client device 1404. When the user 1408 presents a numeric value (e.g., a stored numeric representation from the server 130) to the credential authority 110, for example by making an utterance 1414 including the numeric value or displaying the numeric value rendered on the user's client device 1412, the processing system 112 can validate the numeric value by communicating the numeric value to the server 130, and receiving a response indicating whether the numeric value matches a valid numeric representation for a credential (e.g., a numeric representation for the credential that currently is associated with a user to whom the credential has been granted at the point in time the processing system 112 communicates the numeric value to the server 130).

In more detail, a server 130 communicates via a network 120 with client devices 1402, 1404 operated by users 1406, 1408. The server 130 also communicates via network 120 with a processing system 112 associated with (e.g., operated by) a credential authority 110. The client device 1402 of user 1406 ("Mary Smith") is executing an application that displays a numeric value 1410 (i.e., "84483170"), which may correspond to a numeric representation that the server 130 has associated with the credential and the user 1406. Client device 1402 may lack network connectivity, as illustrated by dotted arrow 1418. In such cases, the application executing on the client device 1402 may show a longer numeric value than a client device that does have network connectivity. This longer numeric value may not have a predetermined expiration time. The client device 1404 of user 1408 ("Jane Smith") is executing an application that is displaying another numeric value 1412 (i.e., "8123"), which may correspond to a numeric representation that the server 130 has associated with the credential and the user 1408. It should be noted that this numeric value 1412 is shorter than the numeric value 1410, indicating that client device 1404 has network connectivity. However, this shorter numeric value 1412 may correspond to a numeric representation having a predetermined expiration time. As shown, the user 1408 makes an utterance 1414 (i.e., "8123") corresponding to the numeric value 1412 to the credential authority 110.

Furthermore, the client devices 1402, 1404 may operate in on-line and off-line modes. In on-line mode, the client devices 1402, 1404 have network connectivity, and, in off-line mode, the client devices 1402, 1404 lack network connectivity. In some implementations, as part of receiving a credential issued by the server 130, the client devices 1402, 1404 also receive an off-line numeric representation that is longer than the numeric representations received when the client device is on-line. Applications executing on the client devices 1402, 1404 may periodically monitor network connectivity and detect when the client devices 1402, 1404 have lost connectivity. If the client device 1402, 1404 is currently off-line and the user 1406, 1408 inputs a command to present a numeric value for validation, the client device 1402, 1404 accesses and outputs the previously received off-line (longer) numeric representation. But, if the client device 1402, 1404 is on-line and receives such a command, the client device 1402, 1404 requests a shorter numeric representation from the server 130.

The credential authority 110 operates the processing system 112 to validate the numeric value 1412 by recognizing the utterance 1414, and then entering the numeric value into the processing system 112 via a man-machine interface 1416 (e.g., an onscreen numeric keypad). The processing system 112 then sends a validation request to the server 130 that includes the numeric value 1412. The server 130 accesses a memory to determine whether the numeric value 1412 matches a valid numeric representation that is currently associated with the user 1408 and the credential, and then responds to the processing system 112. If a matching numeric representation is currently associated with the user

1408, the server's response indicates that the numeric value 1412 is valid, i.e., the user 1408 is validated. Otherwise, the server's response indicates that the numeric value 1412 is invalid.

In operation, the server 130 creates credentials (e.g., identified by credential identifiers) and user accounts (e.g., identified by user identifiers) based on input from credential grantors and/or users, and then associates credential identifiers with user identifiers as described above. For example, a party host may create a credential and then associate user identifiers for all of the invitees (e.g., users 1406, 1408) with the credential identifier to enable invitees to gain admittance to the party. As another example, users' client devices 1402, 1404 may send a request to the server 130 to be associated with a given credential. This may occur, for instance, if party invitees RSVP for a party by interacting with the server 130, or if tickets for an event are available to the general public. The server 130 also may notify the users 1406, 1408 that they have been associated with the credential, for example by pushing notifications to the respective users' client devices 1402, 1404.

After a user has been associated with a credential, the user's client device 1402, 1404 may send a request to the server 130 for a numeric representation for the credential. The client devices 1402, 1404 may send the request, for example, responsive to user interaction with the client device (e.g., a user command to display the credential). The request may include a credential identifier for the desired credential (e.g., an event or location), and a user identifier for the requesting user 1406, 1408. The server 130 may then take several actions responsive to the request. Initially, the server 130 may confirm that the requesting user 1406, 1408 is actually associated with the credential. The server 130 may, for example, access a database to determine whether an entry for the credential identifier has been linked to an entry for the user 1406, 1408.

After the server 130 has confirmed that the user 1406, 1408 has been associated with the credential, the server 130 may generate a numeric representation for the credential using any suitable technique. For example, the server 130 may use a random number generator or pseudo-random number generator provided by a function or library routines that are accessible to the server 130. A pseudo-random number generator may use a clock at the server 130 as a seed, which may provide suitable randomness for some applications. Alternatively, random number generators such as /dev/random, available for Mac OS X and Linux distributions, or CryptGenRandom for Windows servers may provide higher quality random number generation.

In some implementations, the numeric representations that the server 130 associates with the user identities may be temporary, meaning that they expire at a predetermined time (e.g., after a predetermined time period). The server may choose a time period for the numeric representations, such as, for example, 1 minute, 5 minutes, or 10 minutes. The expiration time for the corresponding numeric representation can then be associated with the numeric representation. For example, the expiration time may be an entry in a database that is included with the entry for the numeric representation. In some implementations, the time period may vary depending on a length of the numeric representation. For example, a 4-digit numeric representation may expire after a short time, such as 5 minutes or 10 minutes, whereas a longer 8-digit numeric representation may expire after a longer time, such as 1 hour or one day. In some implementations, a longer numeric representation may be valid for an indefinite (e.g., unlimited) time period. This may be advantageous, for example, in cases where a user's client device does not have access to the server 130 via the network 120.

Some implementations may include techniques to minimize collisions and/or reuse of numeric representations, e.g., to prevent instances where the same numeric representation is associated with two different users and/or two different credentials. For example, the server 130 may maintain a memory structure (e.g., a list, a database table, a set, or a collection) that includes previously generated numeric representations. When the server 130 generates a new candidate for a numeric representation (e.g., a random number), it searches the memory structure for the candidate. If the server 130 finds the candidate in the memory structure, then the server 130 generates a different candidate and searches the memory structure again. The server 130 may repeat this process until a candidate is found that is not stored in the memory structure. In some aspects, numeric representations stored in the memory structure may be flushed periodically based on, for example, the age of the respective numeric representations. This can minimize the potential for overflow of the memory structure. Similar mechanisms may be used to penalize numeric representations with respect to individual users so that, when a particular numeric representation has been associated with a user, that representation may not be used again for the same user for a period of time.

After a numeric representation is generated, the server 130 may then associate the numeric representation with the requesting user 1406, 1408 and the credential. For example, the server 130 may create a database entry for the numeric representation, and then link this entry to the entry for the credential and the entry for the user 1406, 1408. Then, the server 130 may transmit a message to the client device 1402, 1404 of the requesting user, where the message includes the generated numeric representation. The users' client devices 1402, 1404 can then store the numeric representation as a numeric value in a suitable memory.

When numeric representations include an expiration time, the client devices 1402, 1404 may monitor the expiration time. For example, when the client device 1002, 1004 begins to display a numeric representation, it also may initialize a timer that counts down to the expiration time of the numeric representation. When the timer expires (or at some defined period of time before or after the timer expires), the client device 1402, 1404 may request a new numeric representation. Alternatively, the server 130 may automatically push a new numeric representation to the client device 1402, 1404 upon expiration of the current numeric representation, without requiring a request from the client device 1402, 1404. Upon receiving the new numeric representation, the client device 1402, 1404 can reset the timer to the expiration time for the new numeric representation. The client device 1402, 1404 also may output the timer to the display of the client device 1402, 1404 to indicate the amount of time remaining until the current numeric representation expires.

When the user 1406, 1408 decides to present a numeric value (e.g., a stored numeric representation) to the credential authority 110 for validation, it can be presented in several ways. For example, the credential authority could visually inspect the numeric value displayed on a display of the client device 1402, 1404. As another example, the client device 1404 may output an audio signal from a speaker corresponding to the numeric value that would be received by the processing system 112. This audio signal could be a normal audible signal (e.g., 20 Hz to 20 kHz), or it could be an ultrasonic signal (e.g., >20 kHz) that is detectable by a microphone on the processing system 112. As another example, the client device 1404 may transmit the numeric value to the processing system using digital radio-frequency communications, e.g., near-field communications (NFC) or Bluetooth.

Alternatively, the user 1408 of the client device 1404 could utter the numeric value to the credential authority 110. The credential authority 110 may then enter the numeric value into the processing system 112 via a man-machine interface operatively coupled to the processing system 112. Alternatively, the processing system 112 may perform speech recognition on the utterance 1414 to determine a corresponding numeric value. The processing system 112 may perform speech recognition according to any suitable technique.

Moreover, the processing system 112 could obtain a voice recognition profile for the user 1408, and based on this voice recognition profile, authenticate the user 1408. The processing system 112 may perform voice recognition by, for example, comparing the features of the user's voice with those of voice recognition profiles stored in one or more voice recognition dictionaries. Because the processing system 112 knows a priori to expect a numeric value, it may be able to readily match the voice of the user to an authorized person in a voice recognition dictionary. Such voice recognition can advantageously provide a second level of user authentication in addition to the numeric representation itself. As another example, the processing system 112 may access a record of all the users who have been granted the current credential, where the record includes voice signatures of the authorized users. The processing system may then compare the voice signature of the user with the voice signatures of all the authorized users to authenticate the user. Any other suitable technique of voice recognition could be used.

Once the processing system 112 has obtained a numeric value for validation, the processing system 112 then sends a validation request message including the numeric value to the server 130. In some aspects, the processing system 112 may also access a credential identifier for the relevant event or location, and include the credential identifier with the validation request message. The server 130 receives this validation request message from the processing system 112, and then attempts to retrieve data corresponding to the numeric value from a suitable memory. For example, the server 130 may query a database using the numeric value, and optionally the credential identifier. If the numeric value matches a stored numeric representation, then the server 130 accesses (e.g., receives from the database) the matching numeric representation. In instances where a numeric representation includes an expiration time, the server 130 may determine whether the accessed numeric representation has expired based on comparing the expiration time with a current time at the server 130. In implementations where the processing system 112 transmits a credential identifier to the server 130, the server 130 also attempts to match the numeric value with a numeric representation associated with the transmitted credential identifier. Upon successful retrieval of a valid numeric representation that matches the presented numeric value, the server 130 may send a validation response to the processing system 112 indicating that the numeric value corresponds to a valid numeric representation. If the server 130 finds no matching numeric representations for the numeric value, then it may send an error message to the processing system indicating that the numeric value is invalid.

In some implementations, a validation response from the server 130 to the processing system 112 may include information relating to the user associated with the valid numeric representation. For example, the validation response may include a user identifier, a user name, a voice recognition profile, and/or an image of the user. If a voice recognition profile is included, then the processing system may perform voice recognition to authenticate the user as described elsewhere herein. In particular, the server 130 may obtain the user information from, among other locations, a social networking web-server or from information provided by (or made accessible by) the credential grantor as part of granting the credential in the first instance (e.g., the credential grantor provides the server 130 access to a database of images for the potential credential holders).

In addition, the client device 1402, 1404 and/or the processing system 112 also may display an image of the user 1406, 1408 for additional security. For example, responsive to receiving a validation response from the server 130, the processing system 112 may obtain the user's image from, for example, a memory of the processing system 112, the server 130, or another server such as a social networking web-server or a server made accessible by the credential grantor. The processing system 112 may then output the user's image to a display operatively coupled to the processing system for authentication by the credential authority. Moreover, the client device 1402, 1404 may obtain the user's image from, for example, a memory of the client device 1402, 1404, or a server such as a social networking web-server. The client device 1402, 1404 may display this image before, after, and/or during presentation of the numeric representation for authentication of the user 1406, 1408.

Numeric values corresponding to multiple numeric representations for credentials may be displayed and/or presented concurrently. This may be implemented, for example, when credentials represent a hierarchy of access. As an example, if Mr. John Smith is an employee of Company X, and also authorized to access the 12th floor of Company X's headquarters, he may have two credentials, i.e., a first credential identifying Mr. Smith as an employee who is authorized to enter the headquarters, and a second authorizing Mr. Smith to access the 12th floor. In such implementations, numeric values for the first credential and the second credential may both be presented at the same time so that a credential authority can permit Mr. Smith access to the 12th floor.

Figure 15:
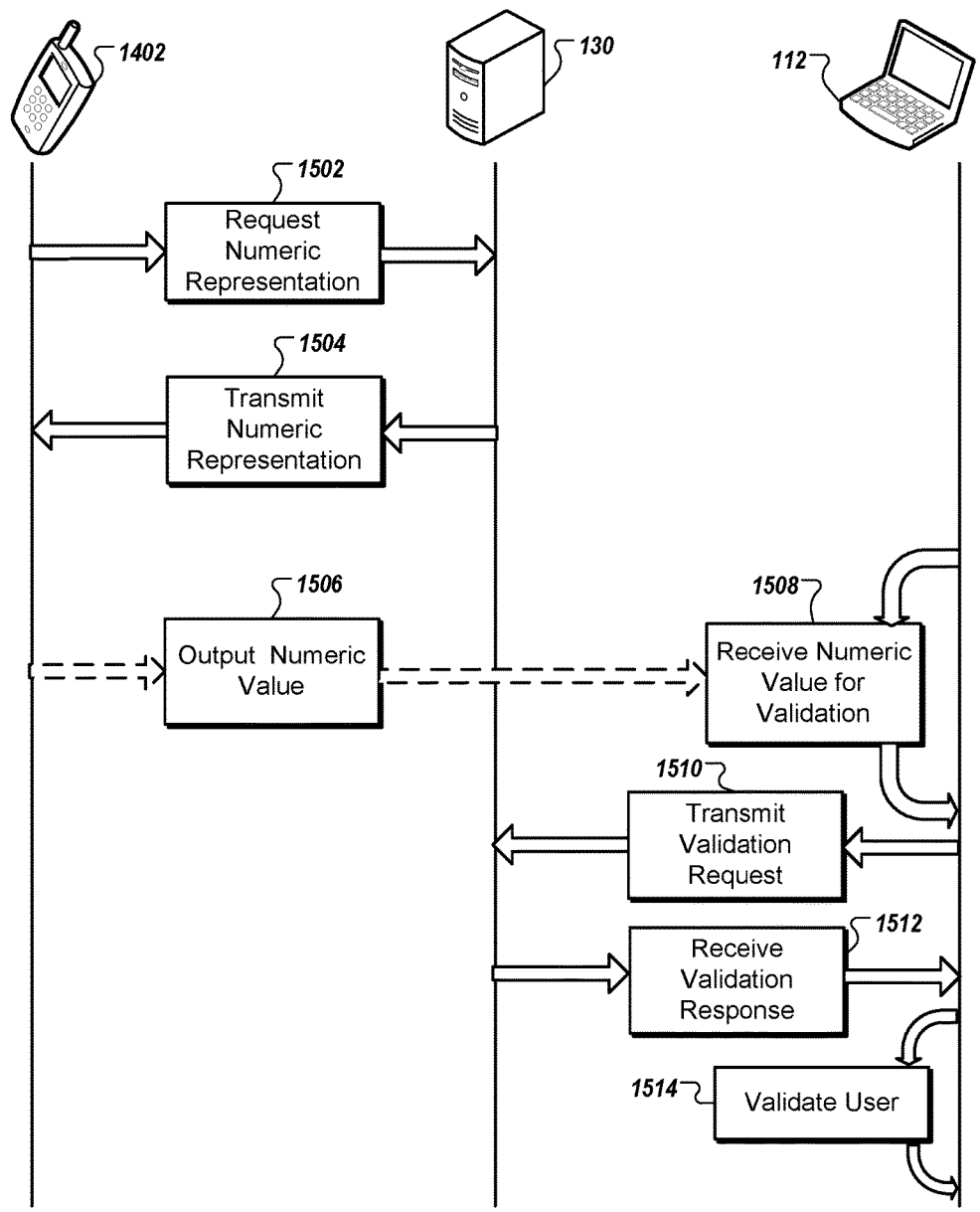
FIG. 15 is a messaging diagram that illustrates sample messages between a client device, server, and processing system in a system that manages numeric representations for credentials associated with users and groups of users, and permits a credential authority to validate the credentials for each user by inspection of the representations.

FIG. 15 illustrates sample messages between a client device 1402, server 130, and processing system 112 in a system that manages numeric representations for credentials associated with users and groups of users, and permits a credential authority to validate the credentials for each user by inspection of the representations. The messages described below may be transmitted via any suitable protocol such as, for example, HTTP or SMS. Additionally, these example messages should not be considered limiting, as any suitable mechanism for performing the functions described could be used, and the messages could be sent or received in any suitable sequence.

In FIG. 15, initially, a client device 1402 transmits a request message 1502 for a numeric representation to a server 130. This request may be, for example, triggered by the user requesting to display the credential. In response, the server 130 transmits a response message 1504 to the client device 1402 that includes a numeric representation. The client device 1402 may then store this numeric representation as a numeric value. In some implementations, however, the server 130 may push the message 1504 including the numeric representation to the client device 1402 without first receiving a request message 1402.

At some time, the client device 1402 may output the stored numeric value to the credential authority 110 for validation. In some implementations, the client device 1402 outputs the numeric value directly to the processing system 112 as a message 1506, for example as an audio signal or a digital radio-frequency transmission. When the processing system 112 receives the numeric value in step 1508, the processing system 112 sends a validation request message 1510 including the numeric representation to the server 130. The server 130 then transmits a validation response message 1512 to the processing system 112 that indicates whether the numeric value corresponds to a valid numeric representation for the credential. If so, then the processing system 112 validates the user in step 1514.

Figure 16A:
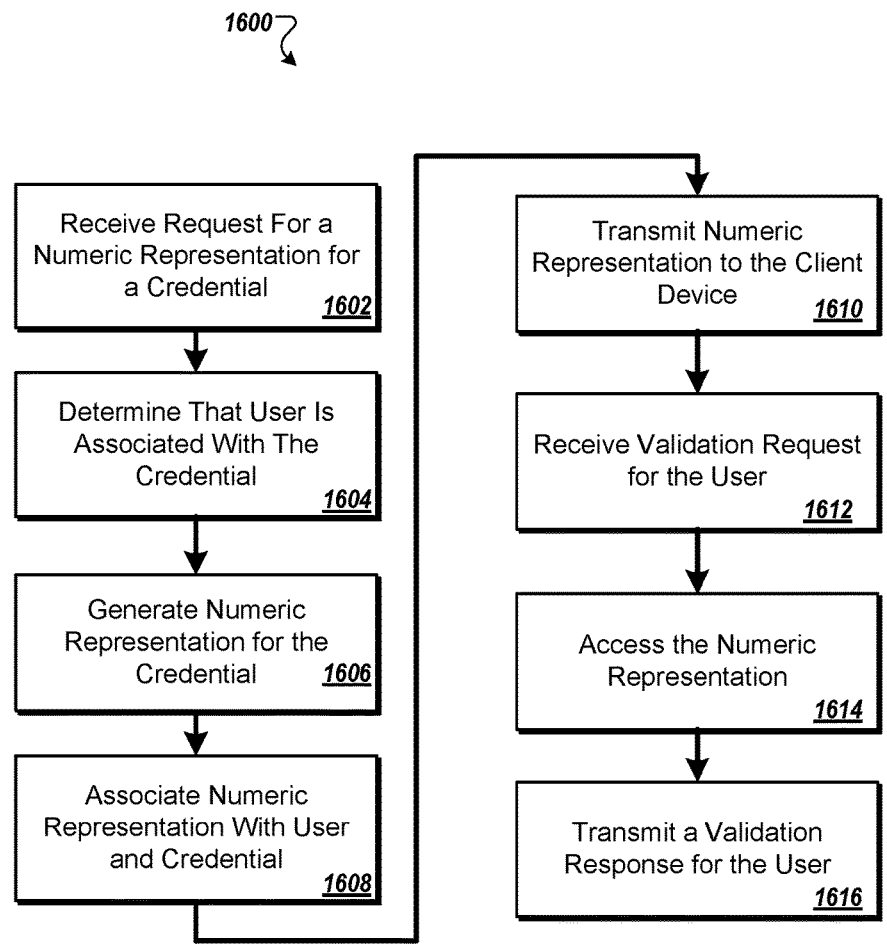
FIG. 16a is a flowchart of an example process of a server configured to associate a user with a credential, and then provision the user's client device with a numeric representation for the credential.

FIG. 16*a* shows an example process 1600 of a server configured to associate a user with a credential, and then provision the user's client device with a numeric representation for the credential. As shown, in step 1602, a server receives a request from a client device for a numeric representation for a credential. This request may be, for example, triggered by the user requesting to display the credential. The request may include a credential identifier identifying the credential and a user identifier identifying a user. In some implementations, the server 130 may receive the request via HTTP. In other implementations, the server 130 may receive the request via SMS.

Responsive to the request from the client device, the server performs the following four steps, although not necessarily in the following order. In step 1604, the server determines that the user identifier from the request is associated with the credential identifier from the request. In step 1606, the server generates a numeric representation for the credential. In some implementations, the numeric representation for the credential expires at a predetermined time. In some implementations, the server generates a numeric representation by generating a random number based on a seed value obtained from a clock at the server. In step 1608, the server associates the numeric representation for the credential with the credential identifier from the request and the user identifier from the request. In some aspects, the server may associate the numeric representation with the credential identifier and the user identifier by mapping the numeric representation for the credential to the credential identifier and the user identifier in a table or one or more related tables. Finally, in step 1610, the server transmits a message including the numeric representation for the credential to the client device, which may store the numeric representation in a memory of the client device. In some implementations, the server may transmit the message via SMS. In some implementations, the server may transmit the message via HTTP.

At some point later in time, in step 1612, the server receives a validation request from a processing system associated with (e.g., operated by) a credential authority, where the validation request includes a numeric value. In some implementations, the server may receive the validation request via SMS. In other implementations, the server may receive the validation request via HTTP. Before the predetermined expiration time for the numeric representation, in step 1614 the server accesses the numeric representation for the credential using (e.g., based on) the numeric value from the validation request. For example, the server may query a database using the numeric value as a query term. In step 1616, the server then determines that the numeric value from the validation request matches the numeric representation for the credential, and transmits to the processing system a validation response indicating that the credential is associated with the user. In some implementations, the server accesses the numeric representation for the credential and determines whether the numeric representation has expired. In some implementations, the server may transmit the validation response via SMS. In other implementations, the server may transmit the validation response via HTTP.

Multiple users may be associated with any given credential identifier. In such implementations, the server may receive requests from multiple client devices for numeric representations for the credential, where the requests include the credential identifier identifying the credential and respective user identifiers identifying the multiple users. Responsive to each of the requests, the server performs the following four steps, although not necessarily in the following order. First, the server determines that the respective user identifier from the request is associated with the credential identifier from the request. Second, the server generates a numeric representation for the credential. In some implementations, the numeric representation for the credential expires at a predetermined time. Third, the server associates the numeric representation for the credential with the credential identifier from the respective request and the user identifier from the respective request. And fourth, the server transmits a message including the numeric representation for the credential to the respective client device, which may store the numeric representation in a memory of the client device.

At some point later in time, the server may receive multiple validation requests from a processing system associated with (e.g., operated by) a credential authority, where the validation requests each include a numeric value. Before the predetermined expiration time for the respective stored numeric representations, the server accesses the respective numeric representation for the credential using (e.g., based on) the numeric value from the respective validation request. The server then determines that the respective numeric value from each validation request matches the respective numeric representation for the credential, and transmits to the processing system a validation response indicating that the credential is associated with the respective user.

In some implementations, the server may store the numeric representations for the credential in a memory. To generate a new numeric representation, the server may first generate a candidate numeric representation for the credential, and then determine that the candidate numeric representation matches a numeric representation for the credential stored in the memory. In this case, the server may generate another numeric representation for the credential. To minimize memory overflow, the server may periodically remove one or more numeric representations from the memory based on an age of the one or more numeric representations.

The server may, responsive to determining that the numeric value from a validation request matches a numeric representation for the credential, obtain an image of the user associated with the numeric representation for the credential. The server may then transmit the image of the user to the processing system such that the credential authority can authenticate the user. The server can obtain the image by retrieving, from a memory of the server, the image of the user or by querying another server via a network connection and receiving, from the other server over the network connection, the image of the user. The server may obtain the image of the user from, for example, a social networking web-server and/or the credential grantor.

Figure 16B:
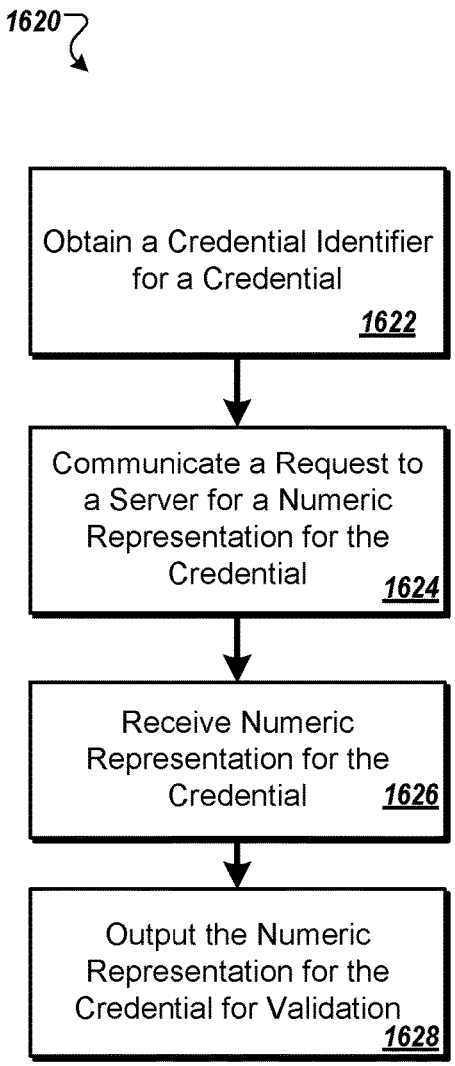
FIG. 16b is a flowchart of an example process of a client device configured to receive numeric representations for a credential and output the numeric representations for validation of the credential.

FIG. 16*b* shows an example process 1620 of a client device configured to receive numeric representations for a credential and output the numeric representations for validation of the credential. As shown, the client device obtains a credential identifier identifying a credential in step 1622. In some implementations, the client device may receive the credential identifier responsive to communicating a user identifier to the server, and the server subsequently determining that the user identifier is associated with the credential. Next, in step 1624, the client device communicates, to a server, a request for a numeric representation for the credential. The request may be sent in response to the user requesting to display the credential on their client device. In some implementations, the user identifier may correspond to a user logged-in to an application executing on the client device. The request may include the credential identifier and a user identifier identifying a user. Then, in step 1626, the client device receives a numeric representation for the credential from the server, where the server sends the numeric representation responsive to the client device's request. In some aspects, the numeric representation for the credential expires at a predetermined time. In some aspects, the numeric representation is received via HTTP. In other aspects, the numeric representation is received via SMS. Before the predetermined expiration time, in step 1628, the client device outputs a numeric value corresponding to the numeric representation for the credential for validation by a credential authority.

The client device may output the numeric value by rendering an audio signal corresponding to the numeric value from a speaker at the client device in a manner that enables the credential authority to validate the credential by acoustically detecting the numeric value for the credential. In some implementations, the client device may render the audio signal at a frequency greater than 20 kHz.

Alternatively, the user may utter the numeric value in a manner that enables the credential authority to validate the credential by performing speech recognition on the numeric value uttered by the user as described above. In such implementations, the processing system may obtain a voice recognition profile of the user and perform voice recognition on the numeric value uttered by the user to authenticate the user as described above.

The client device also may output, to a display of the client device, a timer associated with the numeric representation for the credential. For example, the timer may display an amount of time remaining until the predetermined time when the numeric representation will expire.

The client device also may obtain an image of the user and output, to the display of the client device, the image of the user such that the credential authority can authenticate the user. The client device can obtain the image by retrieving, from a memory of the client device, the image of the user or by querying a server via a network connection and receiving, from the server over the network connection, the image of the user. In some implementations, the client device may display the image of the user concurrently with displaying the numeric representation on the display of the client device.

Figure 17A:
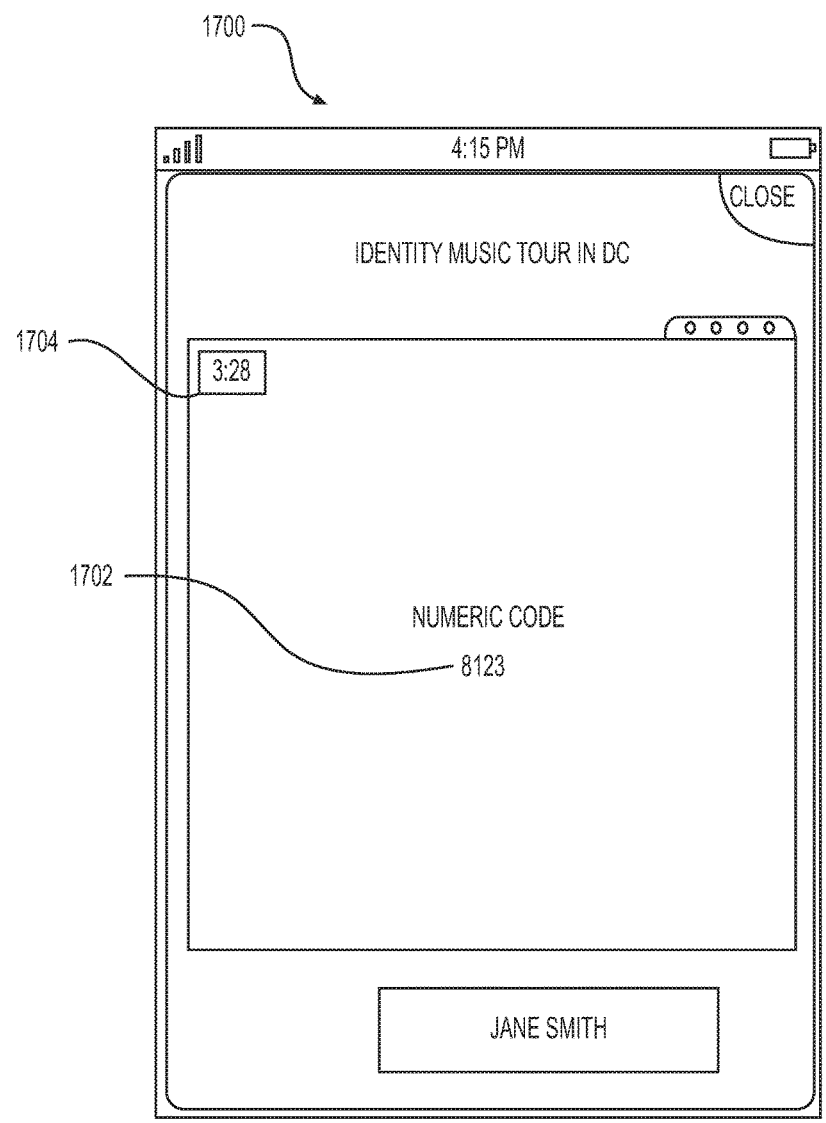
FIGS. 17a-e are screenshots of sample client devices and sample credential authority devices for certain implementations that involve provisioning a client device with a numeric representation for a credential and presenting the representation for validation of the credential.

FIGS. 17*a-e* show screenshots of sample client devices and sample credential authority devices for certain implementations that involve provisioning a client device with a numeric representation for a credential and presenting the representation for validation of the credential. In particular, FIG. 17*a* shows a display 1700 of a client device that includes a numeric value 1702 that may correspond to a numeric representation for a credential. The display 1700 also includes a timer 1704 indicating the time remaining until the numeric representation for the credential expires (i.e., 3 minutes, 28 seconds).

Figure 17B:
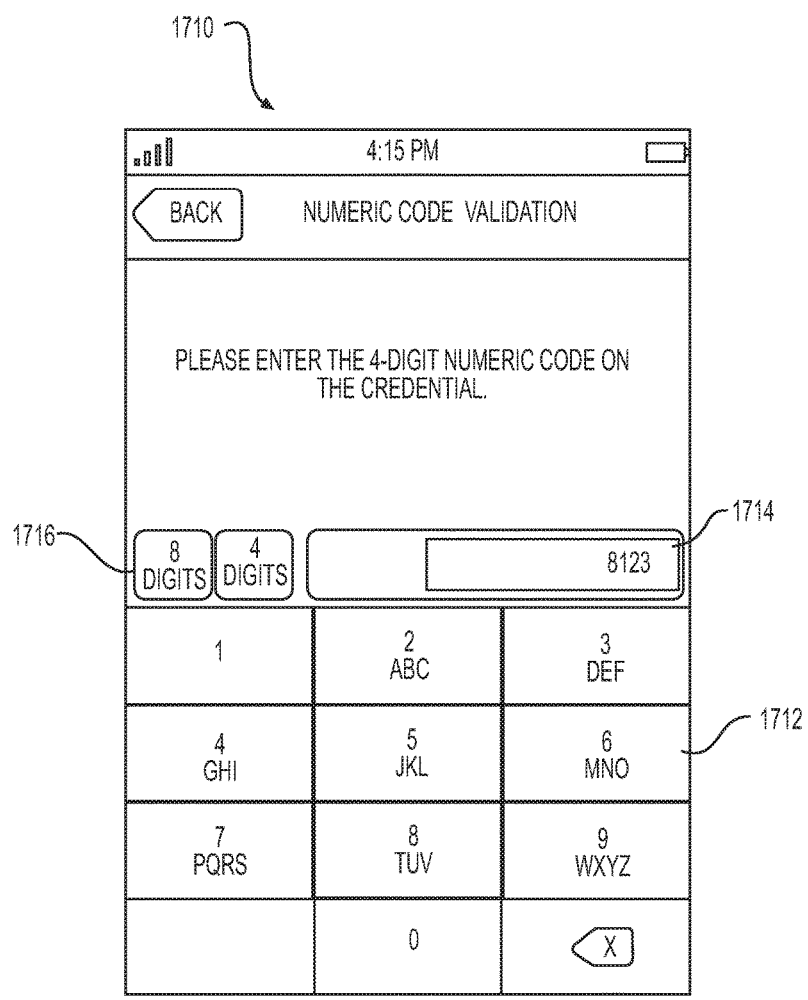

FIG. 17*b* shows a display 1710 operatively coupled to a processing system, where the processing system is associated with a credential authority. The display 1710 includes a man-machine interface 1712 (e.g., an onscreen keypad) that a credential authority can use to enter numeric values presented by users. An output field 1714 indicates a currently entered numeric value ("8123"). Also, the display 1710 includes a control 1716 for selecting between short (e.g., 4-digit) and long (e.g., 8-digit) numeric values.

Figure 17C:
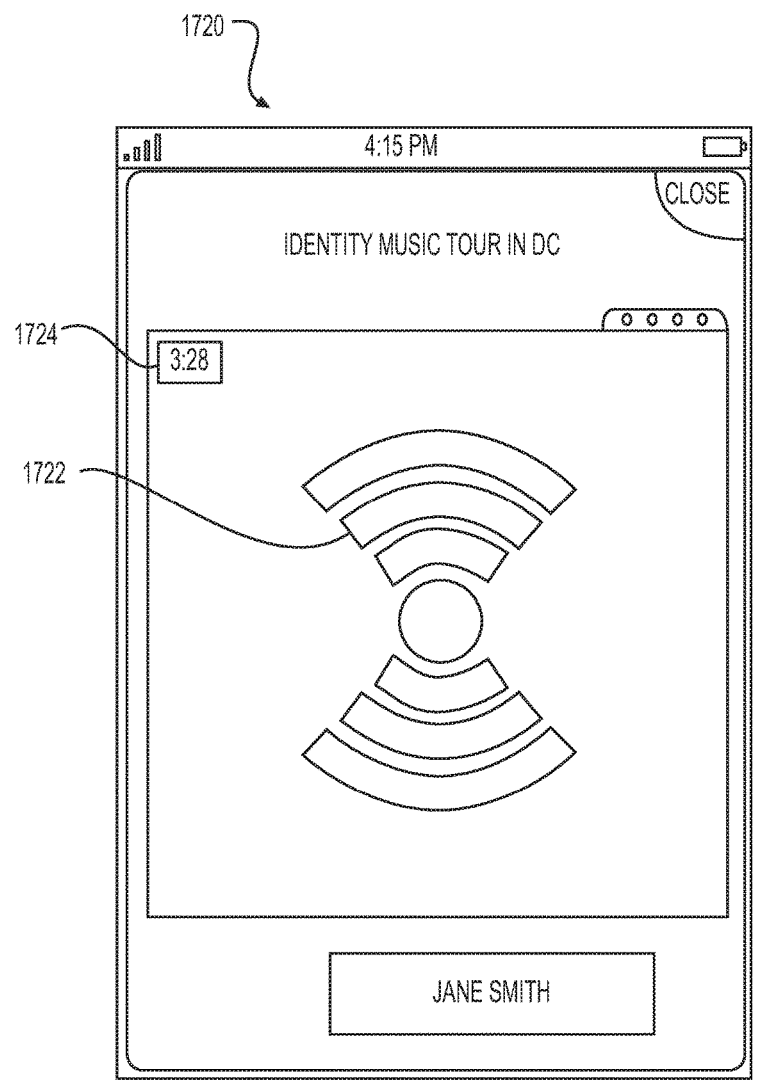

FIG. 17*c* shows a display 1720 of a client device that includes an indicator 1722 that the client device is outputting a numeric value, which may correspond to a numeric representation for a credential, as an audio signal from a speaker of the client device. The display 1720 also includes a timer 1724 indicating the time remaining until the numeric representation for the credential expires (i.e., 3 minutes, 28 seconds).

Figure 17D:
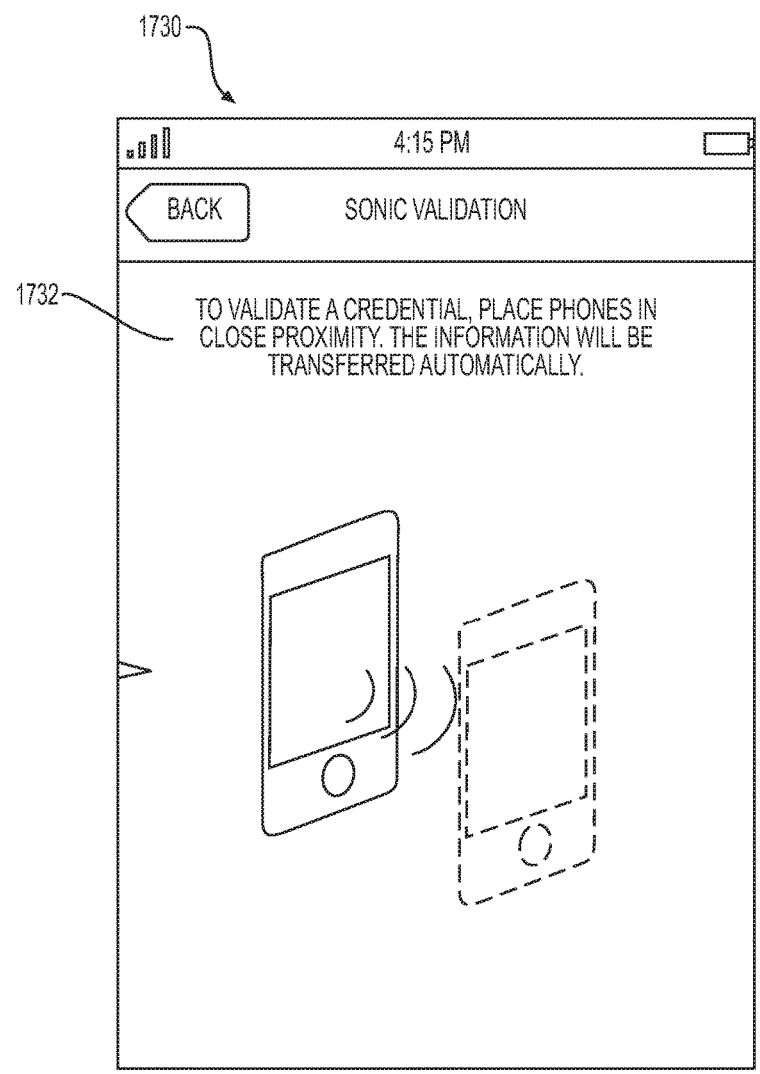

FIG. 17*d* shows a display 1730 operatively coupled to a processing system, where the processing system is associated with a credential authority. The display 1710 includes an indicator that 1732 that the processing system is ready to detect an audio signal corresponding to a numeric value (e.g., "To validate a credential, place phones in close proximity. The information will be transferred automatically.") As described above, the numeric representation for the credential may be communicated from a client device to a processing system via ultrasonic audio signals (e.g., greater than 20 kHz).

Figure 17E:
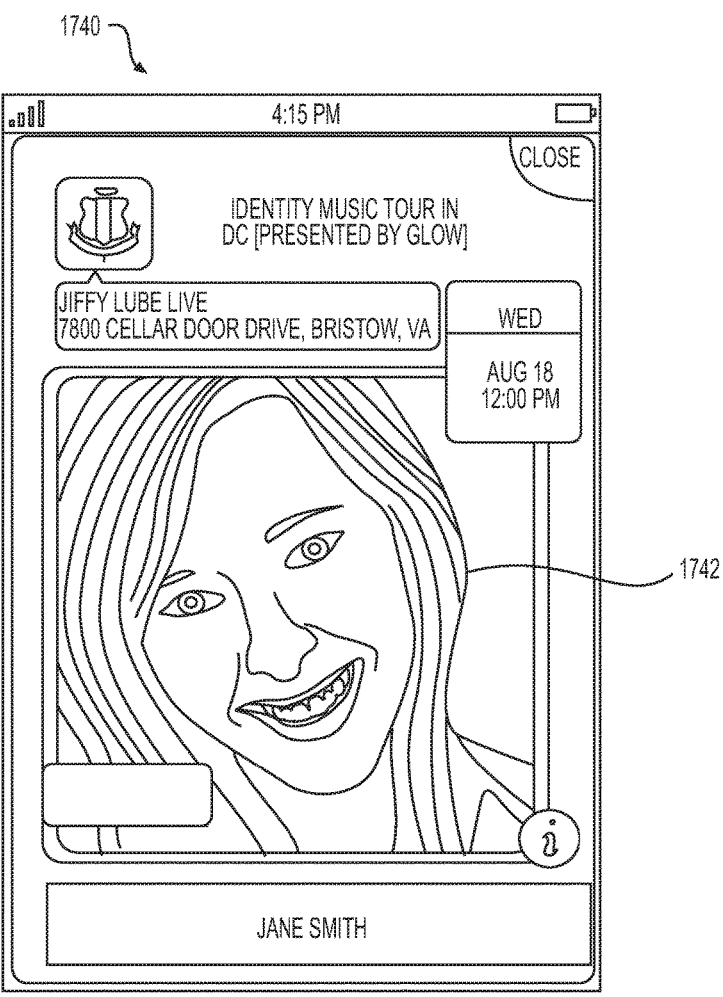

FIG. 17*e* shows a display 1740 operatively coupled to a processing system, where the processing system is associated with a credential authority. The display 1740 illustrates a sample screen shot for successful validation of a numeric value by the processing system. The display 1740 includes an image of the validated user 1742 ("Jane Smith") that may permit a credential authority to confirm the user's identity. As discussed above, the server may obtain an image of a user, for example from a social networking web-server and/or from the credential grantor, upon successful validation of the user and return that image to the processing system so that the credential authority can authenticate the user.

Optical Machine-Readable Representations for Credentials

Figure 18:
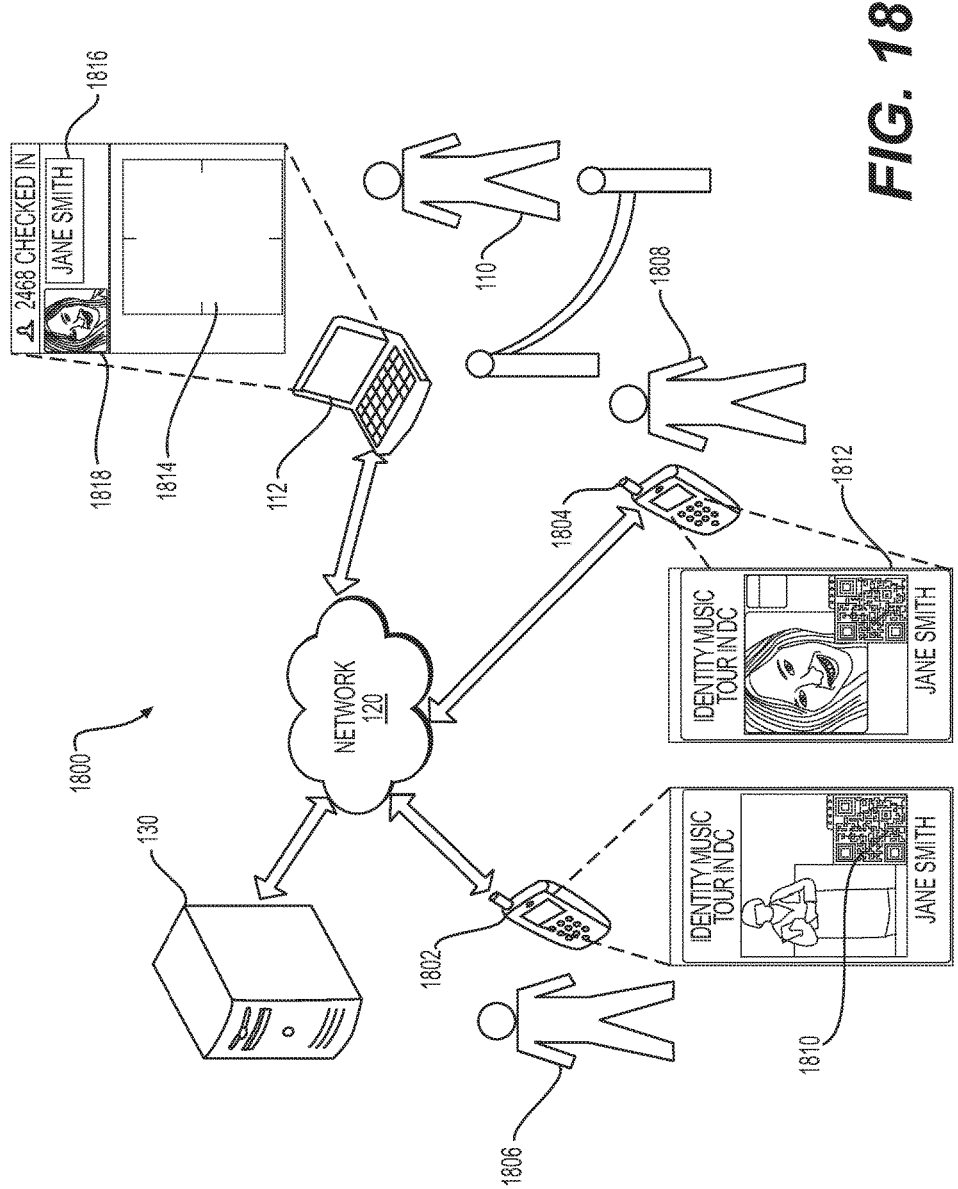
FIG. 18 is a diagram of an example system that manages optical machine-readable representations for credentials associated with users and groups of users, and permits a credential authority to validate the credentials for each user by scanning the representations.

FIG. 18 shows an example system 1800 that manages optical machine-readable representations for credentials associated with users and groups of users, and permits a credential authority to validate the credentials for each user by scanning the representations. An optical machine-readable representation may be an arrangement of graphical elements that encode alphanumeric data, where the elements are arranged so that the data can be read by an optical scanner. For example, an optical machine-readable representation may be a bar code or a quick response code (QR code). In some implementations, the optical machine-readable representations may encode credential identifiers and user identifiers. In other implementations, the optical machine-readable representations may encode other identifiers that are linked to or otherwise associated with credential identifiers and/or user identifiers.

As an overview, in FIG. 18, applications for credential validation are executing on client devices 1802, 1804 and the processing system 112. The client devices 1802, 1804 may receive optical machine-readable representations for credentials from the server 130, and/or may generate optical machine-readable representations for credentials given credential identifiers and user identifiers. The applications on the client devices 1802, 1804 can then output optical machine-readable representations for credentials to the respective displays of the client devices 1802, 1804. The credential authority 110 can operate the processing system 112 to scan the optical machine-readable representations from the displays of the client devices 1802, 1804. The processing system 112 can validate the user by communicating information decoded from the representations (e.g. a credential identifier and a user identifier) to the server 130, and receiving a response indicating whether the user is associated with the credential.

In some implementations, the population of credentialed users may change over time. For example, employees of a company may leave the company, party guests may decline invitations, or party hosts may rescind invitations. It may therefore be advantageous to have the server 130 confirm that the user is still associated with a credential each time the optical machine-readable representation is presented to a credential authority 110 for validation.

In more detail, a server 130 communicates via a network 120 with client devices 1802, 1804 operated by users 1806, 1808. The server 130 also communicates via network 120 with a processing system 112 associated with (e.g., operated by) a credential authority 110. The client device 1802 of user 1806 ("Mary Smith") is executing an application that displays an optical machine-readable representation on a portion of the client device's display 1810. The client device 1804 of user 1808 ("Jane Smith") is executing an application that also is displaying a different optical machine-readable representation on a portion of the client device's display 1812. As an example, the user identifiers for the users 1806, 1808 and the credential identifier, or some values derived from the user identifiers and the credential identifier, may be encoded using QR codes.

The credential authority 110 then operates the processing system 112 to scan the portion of the client device's display 1812 showing the optical machine-readable representation. In particular, the processing system 112 outputs a reticle 1814 defining a field of view from a camera operatively coupled to the processing system 112. This reticle 1814 can be used by the credential authority 110 to scan the optical machine-readable representation from the relevant portion of the client device's display 1812. The processing system 112 can then decode the optical machine-readable representation to obtain a set of alphanumeric characters, which, as described below, may include (or encode) a user identifier and a credential identifier. The processing system 112 then sends a validation request to the server 130 that may include the set of alphanumeric characters, the decoded user identifier and credential identifier, the optical machine-readable representation, or any suitable combination thereof.

The server 130 accesses a memory to determine whether the user identifier from the validation request is currently associated with the credential identifier from the validation request, and then transmits a response to the processing system 112. If the credential identifier is currently associated with the user 1808, the server's response indicates that the user 1808 is validated. If the user is validated, the server's response may include an image, a name, and/or other data relating to the validated user. The server 130 may obtain information relating to the user (e.g., an image of the user) from a social networking web-server and/or from the credential grantor as described above. For example, the processing system 112 may display the user's name 1816 and the user's image 1818 as shown in FIG. 18. Otherwise, the server's response indicates that the user 1808 is not validated.

In operation, the server 130 creates credentials (e.g., identified by credential identifiers) and user accounts (e.g., identified by user identifiers) based on input from credential grantors and/or users, and then associates credential identifiers with user identifiers as described above. For example, a party host may create a credential and then associate user identifiers for all of the invitees (e.g., users 1806, 1808) with the credential identifier to enable the invitees to gain admittance to the party. As another example, users' client devices 1802, 1804 may send a request to the server 130 to be associated with a given credential. This may occur, for instance, if party invitees RSVP for a party by interacting with the server 130, or if tickets for an event are available to the general public. The server 130 also may notify the users 1806, 1808 that they have been associated with the credential, for example by pushing notifications to the respective users' client devices 1802, 1804. Such notifications may include the credential identifier for the credential and/or the user identifier.

In addition to receiving a push notification from the server 130, the client devices 1802, 1804 may obtain the credential identifier and user identifier in various other ways. For example, the client devices 1802, 1804 may request the user identifier and/or credential identifier from the server 130. In some implementations, an application executing on the client device 1802, 1804 may have the user identifier pre-installed, or may request a user identifier when a user first runs the application and creates a user account associated with the application.

After a user has been associated with a credential, and the user's client device obtains the corresponding credential identifier and the user identifier, the user's client device 1802, 1804 may generate a set of alphanumeric characters from the user identifier and the credential identifier. The mapping of the user identifier and credential identifier to the set of characters can use any suitable technique. For example, the credential identifier and user identifier could be concatenated, manipulated using mathematical functions, encrypted using a cryptographic algorithm such as AES, hashed using a hash function such as MD5, SHA-1 or SHA-2, subsam pled to select a predetermined subset or subsets, or any combination of these techniques to generate a suitable set of characters. Alternatively, the server 130 may generate a set of alphanumeric characters from the credential identifier and the user identifier using any suitable method, and transmit the set of characters to the client devices 1802, 1804.

Once the set of alphanumeric characters has been generated, the client devices 1802, 1804 may encode the set of characters to generate an optical-machine readable representation for the credential. The client device may use any suitable technique for encoding the optical machine-readable representation. For example, the client device may call a function or library routine that encodes QR codes in accordance with the QR code International Organization for Standardization (ISO) standard, ISO/IEC 18004:2006 RSS, Information technology—Automatic identification and data capture techniques—QR Code 2005 bar code symbology specification. Alternatively, the server 130 may generate the optical machine-readable representation and transmit it to the users' client devices 1802, 1804. The users' client devices 1802, 1804 can then store the optical machine-readable representation in a suitable memory.

When a user 1806, 1808 decides to present an optical machine-readable representation to the credential authority 110 for validation, the user 1806, 1808 may input a command into their client device 1802, 1804 via a man-machine interface (e.g., a user interface on a presence-sensitive display). An application executing on the client device 1802, 1804 then outputs the stored optical machine-readable representation to a display of the client device 1802, 1804. In particular, the application may render the optical machine-readable representation on a portion 1810, 1812 of the display of the user's client device 1802, 1804.

The credential authority 110 then operates the processing system 112 to scan the portion of the client device's display 1812 showing the optical machine-readable representation. The processing system may use any suitable mechanism to scan the optical machine-readable representation. For example, the processing system 112 may access a function or library routine that captures and decodes QR codes and/or barcodes using a camera operatively coupled to the processing system 112. Suitable libraries may include, for example, RedLaser or Zxing. A credential identifier and a user identifier can then be derived from the optical machine-readable representation in several ways. In some aspects, the processing system 112 decodes the optical machine-readable representation to obtain a set of alphanumeric characters, and then uses the inverse of the encoding techniques discussed above to decode the set of alphanumeric characters so as to obtain the credential identifier and the user identifier. For example, the set of characters can be parsed, manipulated using mathematical functions, decrypted using a cryptographic algorithm such as AES, subsam pled to select a predetermined subset or subsets, or any combination of these techniques to generate a credential identifier and user identifier. The processing system 112 then transmits a validation request message to the server 130 that includes the credential identifier and the user identifier.

Alternatively, the processing system 112 may decode the optical machine-readable representation to obtain a set of alphanumeric characters, but then transmit the set of characters to the server 130. In particular, the processing system 112 may transmit a validation request message to the server 130 that includes the set of alphanumeric characters. The server 130 may then decode the set of alphanumeric characters to obtain the credential identifier and the user identifier.

In other implementations, the processing system 112 may capture and store a copy of the optical machine-readable representation. The processing system may then transmit the copy of the optical machine-readable representation to the server 130, rather than decoding the representation on the processing system 112. In such implementations, the server 130 can decode the reproduction of the optical machine-readable representation to produce a set of alphanumeric characters, and then decode the set of alphanumeric characters to obtain the credential identifier and the user identifier.

The server 130 receives the validation request message from the processing system 112, and then attempts to confirm that the user identifier derived from the optical machine-readable representation is associated with the credential identifier derived from the optical machine-readable representation. For example, the server 130 may query a database using the user identifier and/or the credential identifier to determine whether they are linked. If the server 130 determines that the user identifier is associated with the credential identifier, the server 130 may send a validation response to the processing system 112 indicating that the user 1806, 1808 is validated. If the server 130 determines that the user identifier is not associated with the credential identifier, then it may send an error message to the processing system 112 indicating that the user 1806, 1808 is not validated.

In some implementations, a validation response from the server 130 to the processing system 112 may include information relating to the user associated with the credential identifier. For example, the validation response may include a user name, a voice recognition profile, and/or an image of the user. The server 130 may obtain this information, for example, from a social networking web-server and/or from the credential grantor as described above. If a voice recognition profile is included, then the processing system may perform voice recognition to authenticate the user as described elsewhere herein.

In addition, the client device 1802, 1804 and/or the processing system 112 also may display an image of the user 1806, 1808 for additional security. For example, responsive to receiving a validation response from the server 130, the processing system 112 may obtain the user's image from, for example, a memory of the processing system 112, the server 130, a server made accessible by the credential grantor, or another server such as a social networking web-server. The processing system 112 may then output the user's image to a display operatively coupled to the processing system. Moreover, the client device 1802, 1804 may obtain the user's image from, for example, a memory of the client device 1802, 1804, or a server such as a social networking web-server. The client device 1802, 1804 may display this image before, after, and/or during presentation of the optical machine-readable representation for authentication of the user 1806, 1808.

Optical machine-readable representations for multiple credentials may be displayed and/or presented concurrently. This may be implemented, for example, when credentials represent a hierarchy of access. As an example, if Mr. John Smith is an employee of Company X, and also authorized to access the 12th floor of Company X's headquarters, he may have two credentials, i.e., a first credential identifying Mr. Smith as an employee who is authorized to enter the headquarters, and a second authorizing Mr. Smith to access the 12th floor. In such implementations, optical machine-readable representations for the first credential and the second credential may both be presented at the same time so that a credential authority can permit Mr. Smith access to the 12th floor.

Figure 19A:
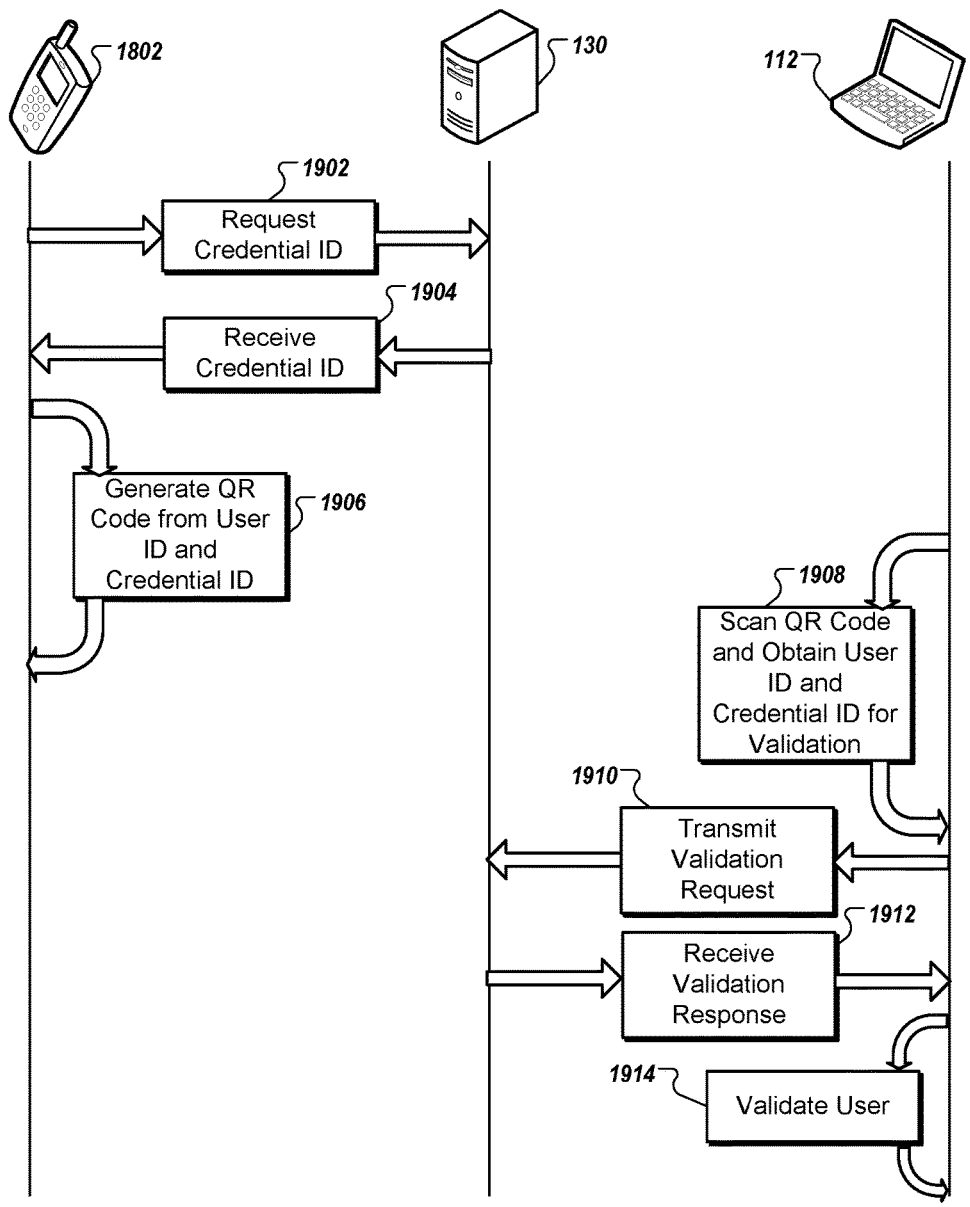
FIG. 19a is a messaging diagram that illustrates sample messages between a client device, server, and processing system in a system that manages optical machine-readable representations for credentials associated with users and groups of users, and permits a credential authority to validate the credentials for each user by scanning the representations, where the representations are generated at the client device.

FIG. 19a illustrates sample messages between a client device 1802, server 130, and processing system 112 in a system that manages optical machine-readable representations for credentials associated with users and groups of users, and permits a credential authority to validate the credentials for each user by scanning the representations, where the representations are generated at the client device. The messages described below may be transmitted via any suitable protocol such as, for example, HTTP or SMS. Additionally, these example messages should not be considered limiting, as any suitable mechanism for performing the functions described could be used, and the messages could be sent or received in any suitable sequence.

In FIG. 19a initially, a client device 1802 transmits a request message 1902 for a credential identifier to a server 130. This request may be, for example, a request for credential identifiers associated with a user logged into the client device 1802. The request also may be, for example, initiated in response to the operator of the client device 1802 accepting an offer of a credential from a credential grantor (e.g., accepting an invitation to a party or event in the context of a party or event management software application). In response, the server 130 transmits a response message 1904 to the client device 1802 that includes a credential identifier. In some implementations, the server 130 may push the message 1904 including the credential identifier to the client device 1802 without first receiving a request message 1902. The client device 1802 may similarly obtain the user identifier, or may already have the user identifier stored in a memory of the client device 1802. In step 1906, the client device 1802 then generates an optical machine-readable representation for the credential using the credential identifier and the user identifier as described above.

At some time, the client device 1802 may present the optical machine-readable representation to the credential authority 110 for validation. The processing system 112 scans the optical machine-readable representation in step 1908, and decodes the representation to obtain the user identifier and the credential identifier, for example, as described above. The processing system 112 then sends a validation request message 1910 including the credential identifier and user identifier to the server 130. The server 130 then transmits a validation response message 1912 back to the processing system 112 that indicates whether the user identifier is currently associated with the credential identifier. If so, then the processing system 112 validates the user in step 1914.

Figure 19B:
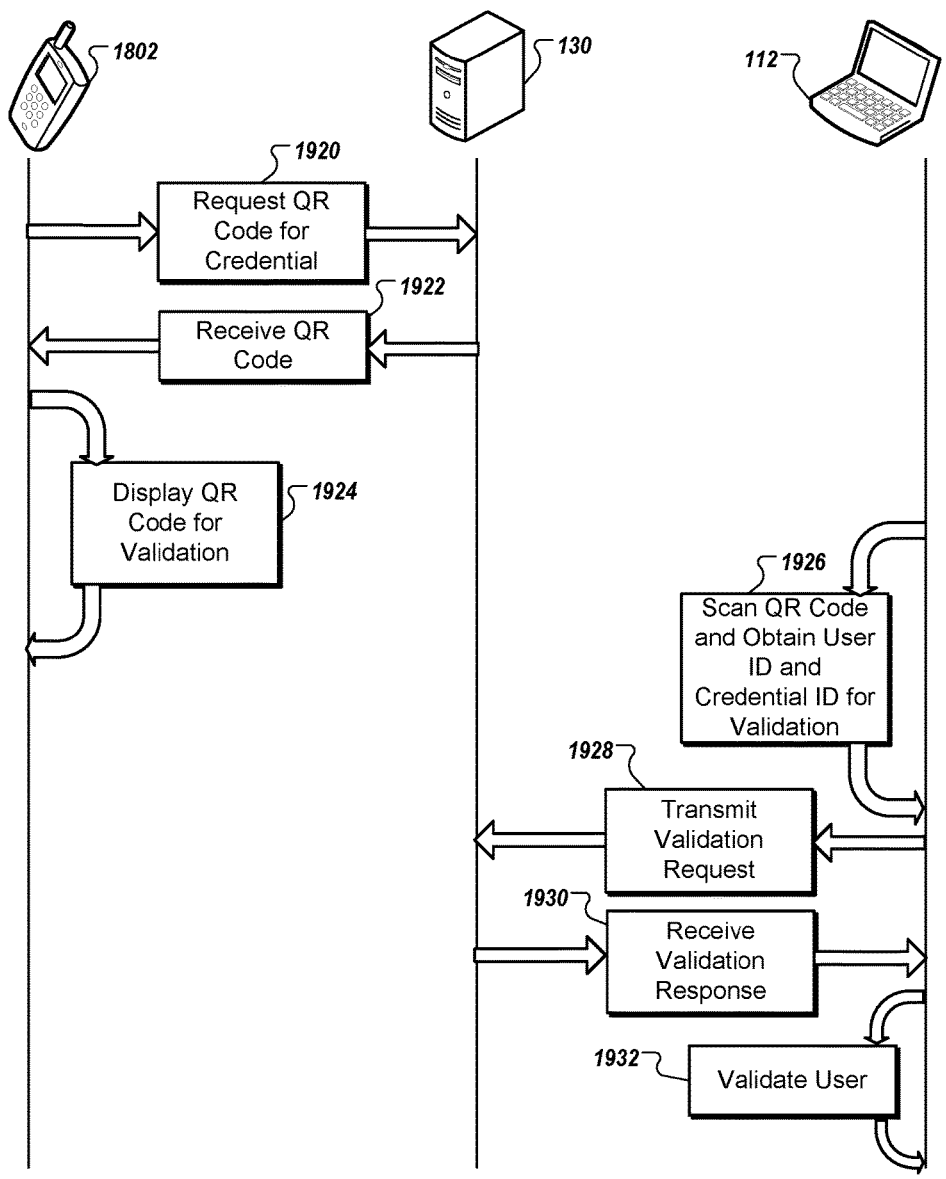
FIG. 19b is a messaging diagram that illustrates sample messages between a client device, server, and processing system in a system that manages optical machine-readable representations for credentials associated with users and groups of users, and permits a credential authority to validate the credentials for each user by scanning the representations, where the representations are generated at the server.

FIG. 19b is a messaging diagram that illustrates sample messages between a client device, server, and processing system in a system that manages optical machine-readable representations for credentials associated with users and groups of users, and permits a credential authority to validate the credentials for each user by scanning the representations, where the representations are generated at the server. The messages described below may be transmitted via any suitable protocol such as, for example, HTTP or SMS. Additionally, these example messages should not be considered limiting, as any suitable mechanism for performing the functions described could be used, and the messages could be sent or received in any suitable sequence.

In FIG. 19b initially, a client device 1802 transmits a request message 1920 for an optical machine-readable representation (e.g., a QR code) to a server 130. This request may be, for example, a request for credential identifiers associated with a user logged into the client device 1802. The request also may be, for example, initiated in response to the operator of the client device 1802 accepting an offer of a credential from a credential grantor (e.g., accepting an invitation to a party or event in the context of a party or event management software application). In response, the server 130 transmits a response message 1922 to the client device 1802 that includes an optical machine-readable representation that encodes a credential identifier and the user identifier. In some implementations, the server 130 may push the message 1922 to the client device 1802 without first receiving a request message 1920.

In step 1924, the client device 1802 displays the optical machine-readable representation for the credential. The processing system 112 scans the optical machine-readable representation in step 1926, and decodes the representation to obtain the user identifier and the credential identifier. The processing system 112 then sends a validation request message 1928 including the credential identifier and user identifier to the server 130. The server 130 then transmits a validation response message 1930 back to the processing system 112 that indicates whether the user identifier is currently associated with the credential identifier. If so, then the processing system 112 validates the user in step 1932.

Figure 20A:
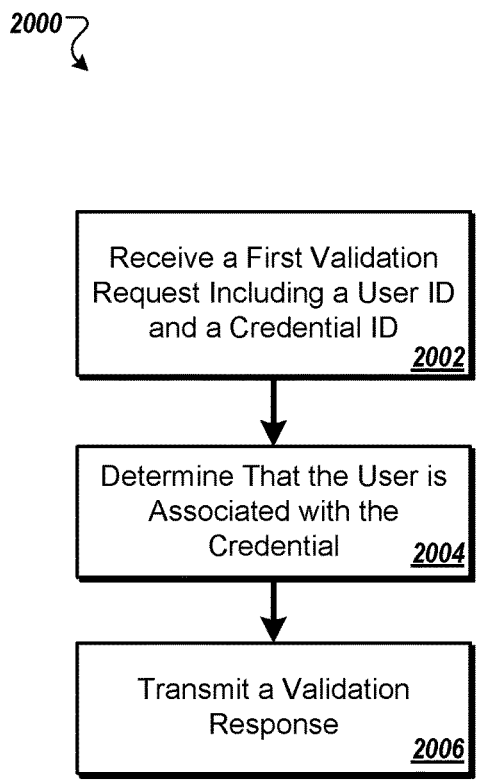
FIG. 20a is a flowchart of an example process of a server configured to validate a user who presents an optical machine-readable representation for a credential to a credential authority.

FIG. 20a shows an example process of a server configured to validate a user who presents an optical machine-readable representation for a credential to a credential authority. As shown, in step 2002, the server receives a validation request from a processing system associated with a credential authority, where the validation request includes a user identifier and a credential identifier. The user identifier identifies a user, and the credential identifier identifies a credential. Moreover, the user identifier and the credential identifier were derived from an optical-machine readable representation for a credential obtained by the processing system. In some implementations, the server receives the validation request via HTTP from the processing system. In other implementations, the server receives the validation request via SMS from the processing system.

Then, in step 2004, the server determines that the user identifier is associated with the credential identifier. For example, the server may query a database using the user identifier to obtain a record corresponding to the user identifier, and then determine that the record includes the credential identifier. Responsive to determining that the user identifier is associated with the credential identifier, in step 2006, the server transmits to the processing system a validation response indicating that the credential is associated with the user.

Responsive to determining that the user identifier is associated with the credential identifier, the server may obtain an image of the user. The server may then transmit the image of the user to the processing system such that the credential authority can authenticate the user. The server can obtain the image by retrieving, from a memory of the server, the image of the user or by querying another server (e.g., a social networking web-server or a server made accessible by the credential grantor) via a network connection and receiving, from the other server over the network connection, the image of the user.

Multiple users may be associated with any given credential identifier. Accordingly, the server may receive multiple validation requests from a processing system that correspond to multiple users. Each validation request may include a user identifier and credential identifier, where each user identifier and credential identifier were derived from an optical-machine readable representation for a credential obtained by the processing system. Each user identifier identifies a respective user. The server may then determine, for each validation request, whether the respective user identifier is associated with the credential identifier. Then, responsive to determining that the respective user identifier is associated with the credential identifier, the server transmits to the processing system a validation response indicating that the credential is associated with the respective user.

Figure 20B:
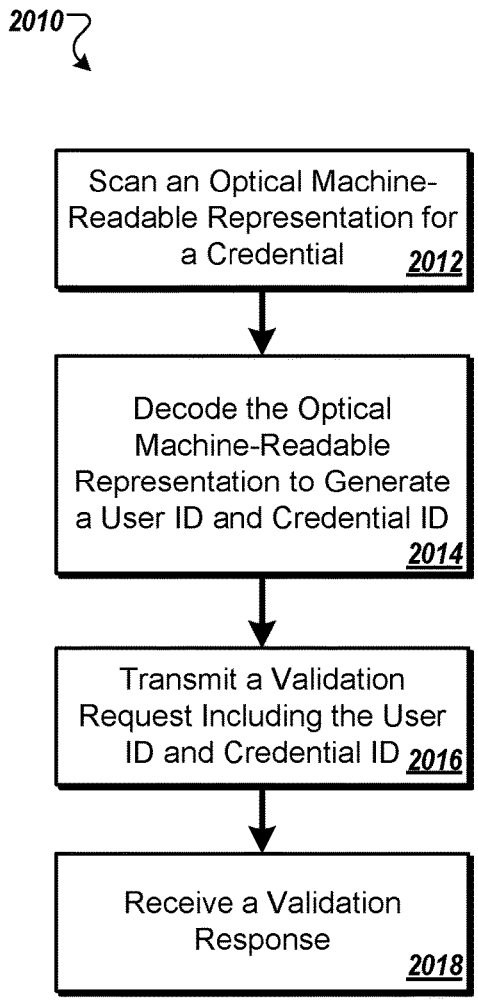
FIG. 20b is a flowchart of an example process of a credential authority device configured to scan an optical machine-readable representation for a credential and then validate the credential with a server.

FIG. 20b shows an example process 2010 of a credential authority device configured to scan an optical machine-readable representation for a credential and then validate the credential with a server. As shown, in step 2012, the processing system (which is associated with a credential authority) scans an optical machine-readable representation for a credential from a display of a client device of a user. Next, in step 2014, the processing system decodes the optical machine-readable representation to generate a user identifier and a credential identifier. The user identifier identifies the user, and the credential identifier identifies the credential. In step 2016, the processing system transmits a validation request to a server, which includes the user identifier and the credential identifier. Finally, in step 2018, the processing system receives a validation response from the server, where the validation response indicates that the user is associated with the credential.

Responsive to receiving a validation response indicating that the user is associated with the credential, the server may obtain an image of the user, and output the image of the user to a display operatively coupled to the processing system. The credential authority may then authenticate the user using the image of the user. The processing system can obtain the image by retrieving, from a memory of the processing system, the image of the user or by querying a server via a network connection and receiving, from the server over the network connection, the image of the user.

Figure 20C:
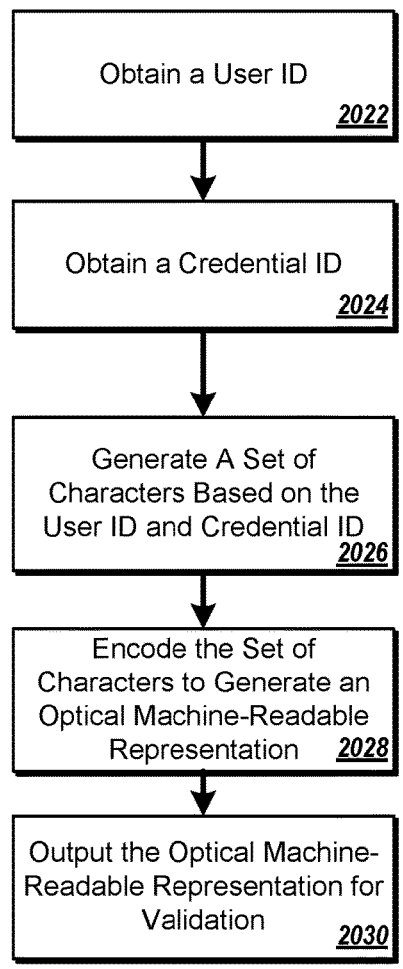
FIG. 20c is a flowchart of an example process of a user's client device configured to obtain a credential identifier and user identifier, generate optical machine-readable representation for the credential, and then output the representation for validation.

FIG. 20c shows an example process 2020 of a user's client device configured to obtain a credential identifier and user identifier, generate an optical machine-readable representation for the credential, and then output the representation for validation. As shown, in step 2022, the client device obtains a user identifier associated with a user of the client device, and in step 2024, the client device obtains a credential identifier associated with a credential. In some implementations, the credential identifier and/or the user identifier may be received from the server via HTTP. In some implementations, the credential identifier and/or the user identifier may be received from the server via SMS. Next, the client device generates a set of characters based on the credential identifier and the user identifier in step 2026. Then, in step 2028, the client device encodes the set of characters to generate an optical machine-readable representation for the credential. In some implementations, the client device may hash the user identifier and the credential identifier to generate the set of characters. For example, the user identifier and credential identifier could be concatenated and then hashed using SHA-1 or SHA-2 hash function to generate the set of characters. Finally, in step 2030, the client device outputs, to a display of the client device, the optical machine-readable representation for the credential in a manner that enables a credential authority to validate the credential by scanning the optical machine-readable representation for the credential.

Figure 20D:
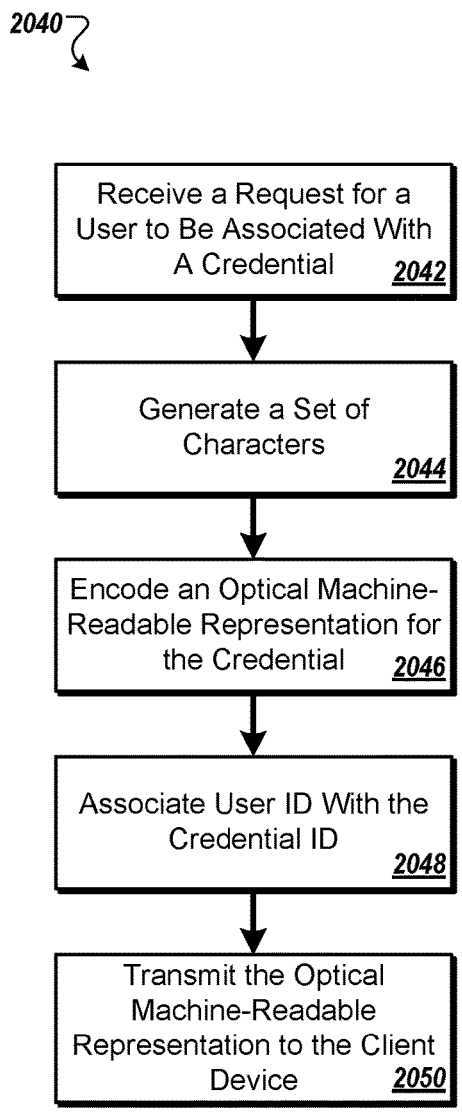
FIG. 20d is a flowchart of an example process of a server configured to associate a user with a credential, and then provision the user's client device with an optical machine-readable representation for the credential.

FIG. 20d shows an example process 2040 of a server configured to associate a user with a credential, and then provision the user's client device with an optical machine-readable representation for the credential. As shown, in step 2042, the server receives a request for a user to be associated with a credential. The request may originate from, for example, a client device associated with a user, or a processing system associated with a credential grantor. The credential is identified by a credential identifier, and the user is identified by a user identifier. In some implementations, the request may be received via HTTP. In some implementations, the request may be received via SMS.

In step 2044, the server then generates a set of characters based on the credential identifier and the user identifier and, in step 2046, encodes the set of characters to generate an optical machine-readable representation (e.g., a QR code) for the credential. In some implementations, the client device may hash the user identifier and the credential identifier to generate the set of characters. For example, the user identifier and credential identifier could be concatenated and then hashed using SHA-1 or SHA-2 hash function to generate the set of characters.

Next, in step 2048, the server associates the user identifier with the credential identifier. For example, the server may create an entry in a database linking the user identifier and the credential identifier. Finally, the server transmits a message (e.g. sends a push notification) including the optical machine-readable representation for the credential to the client device associated with the user in step 2050. This can enable a credential authority to obtain the set of characters, and in some implementations the credential identifier and user identifier, by scanning the optical machine-readable representation for the credential at the client device.

Multiple users may be associated with any given credential identifier. Accordingly, the server may receive multiple requests for a user to be associated with a credential. Responsive to each request, the server may then generate a set of characters based on the credential identifier and the user identifier and encode the set of characters to generate an optical machine-readable representation (e.g., a QR code) for the credential. Furthermore, for each request the server may associate the respective user identifier with the credential identifier. This can enable a credential authority to obtain the set of characters, and in some implementations the credential identifier and user identifier, by scanning the optical machine-readable representation for the credential at the respective client device.

Figure 21A:
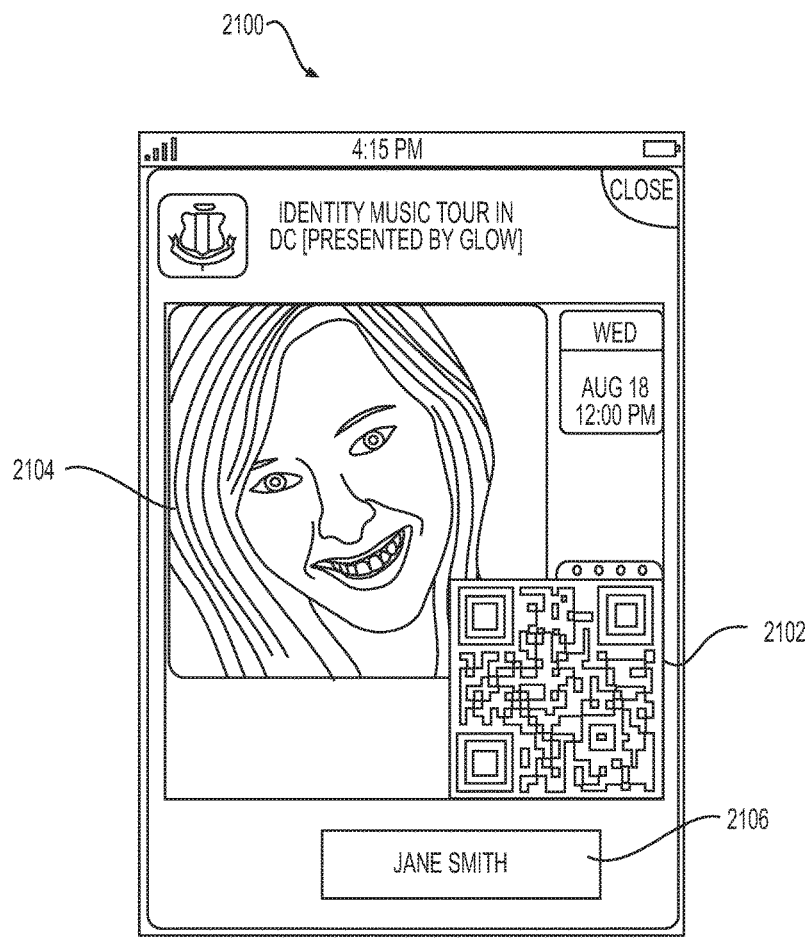
FIGS. 21a-b are screenshots of sample client devices and sample credential authority devices for certain implementations that involve provisioning a client device with an optical machine-readable representation for a credential and presenting the representation for validation of the credential.
Figure 21B:
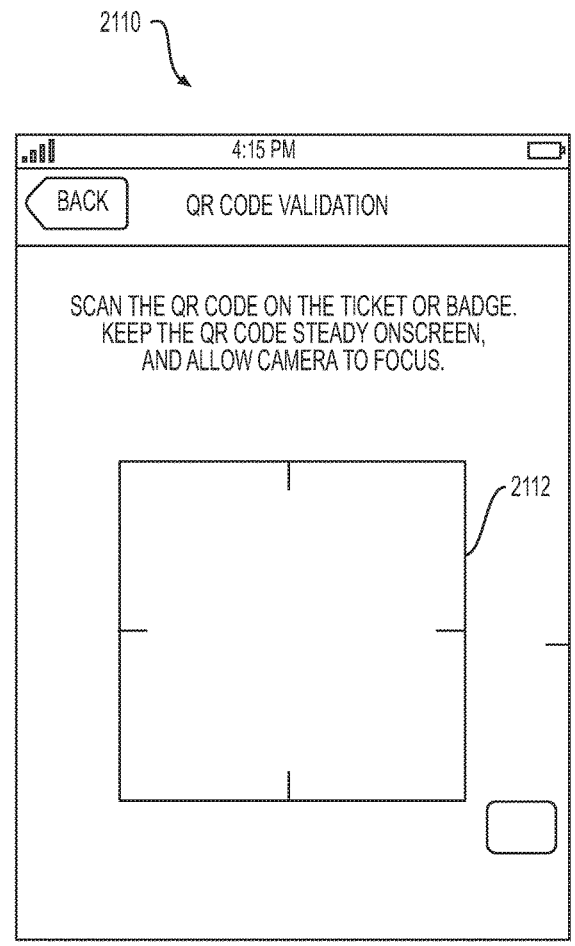

FIGS. 21a-b show screenshots of sample client devices and sample credential authority devices for certain implementations that involve provisioning a client device with an optical machine-readable representation for a credential and presenting the representation for validation of the credential. In particular, FIG. 21a shows a display 2100 of a client device that includes an optical machine-readable representation 2102 (e.g., a QR code) for a credential. The display 2100 also includes an image of a user 2104 and a user name 2106.

FIG. 21b shows a display 2110 operatively coupled to a processing system, where the processing system is associated with a credential authority. The display 2110 includes a reticle 2112 defining a field of view from a camera operatively coupled to the processing system 112. This reticle 1814 can be used by the credential authority 110 to assist in scanning the optical machine-readable representation 2102 from the client device's display 2100 of FIG. 21a.

Multiple Representations for Credentials

Figure 22:
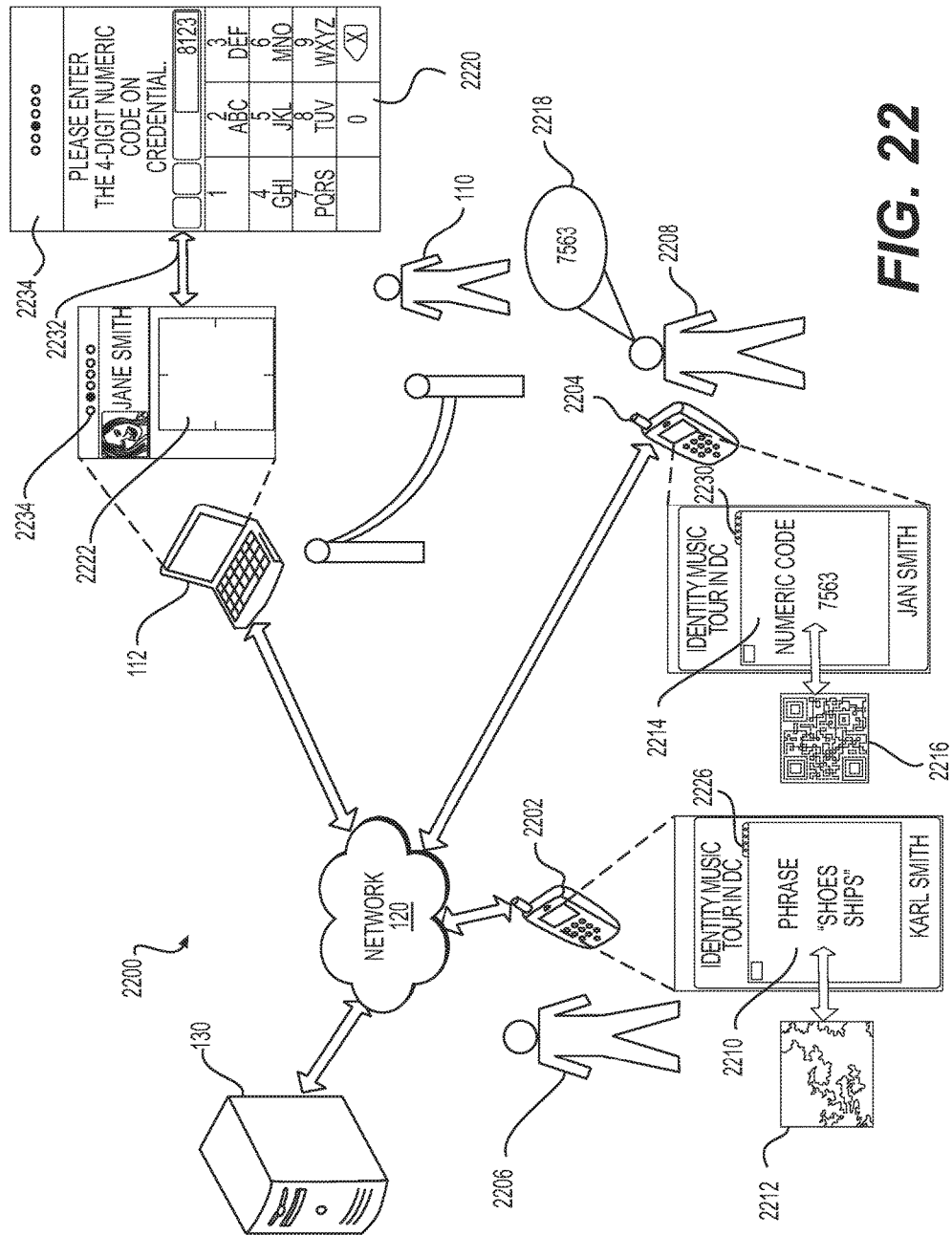
FIG. 22 is a diagram of an example system that manages multiple representations for credentials associated with users and groups of users, and permits a credential authority to validate the credentials for each user by inspection of the representations.

FIG. 22 shows an example system 2200 that manages multiple representations for credentials associated with users and groups of users, and permits a credential authority to validate the credentials for each user by inspection of the representations. As an overview, in FIG. 22 applications for credential validation are executing on client devices 2202, 2204 and the processing system 112. The server 130 has associated user 2206 with a credential, and the user's client device 2202 has obtained multiple representations for this credential according to one or more of the mechanisms described above. Similarly, the server 130 has associated the same credential with user 2208, and the user's client device 2204 has obtained multiple representations for this credential. When the user 2208 decides to present a representation for validation, the user 2208 may select which representation or representations to present. The credential authority 110 then operates the processing system 112 to validate the representations using the appropriate mechanisms as described above.

In more detail, a server 130 communicates via a network 120 with client devices 2202, 2204 operated by users 2206, 2208. The server 130 also communicates via network 120 with a processing system 112 associated with (e.g., operated by) a credential authority 110. The client device 2202 of user 2206 is executing an application that can display at least two representations corresponding to a credential: (1) a phrase 2210 (i.e., "Shoes ships"); and (2) a parametrically-generated graphical representation 2212. In particular, the client device 2202 is currently displaying the phrase 2210. However, the user 2206 can switch between the two representations by inputting a command into the client device 2202, e.g., swiping the touchscreen display in the region of the display of phrase 2210 and/or slider 2226. The client device 2204 of user 2208 is executing an application that can display at least two different representations corresponding to the credential: (1) a numeric value 2214 (i.e., "7563"); and (2) an optical machine-readable representation 2216. In particular, the client device 2204 is currently displaying the numeric value 2214. However, the user 2208 can switch between the two representations by inputting a command into the client device 2204, e.g., swiping the touchscreens display in the region of the display of numeric value 2214 and/or slider 2230. As shown, the user 2208 presents the numeric value 2214 for validation by making an utterance 2218 corresponding to the numeric value (i.e., "7563").

The credential authority 110 then operates the processing system 112 to validate one or more of the user's 2208 presented representations. The credential authority 110 may switch between various validation modes by inputting a command into the processing system 112, e.g., swiping slider 2234. For example, in a first mode, e.g., selectable using slider 2234, the credential authority 110 operates the processing system 112 to validate the numeric value 2214 by recognizing the utterance 2218, and then entering the numeric value into the processing system 112 via a man-machine interface 2220 (e.g., an onscreen numeric keypad). The processing system 112 then sends a validation request to the server 130, which responds with an indication of whether the numeric value 2214 is valid. In a second mode, e.g., selectable using slider 2234, the processing system 112 may scan the portion of the client device's display 2216 showing the optical machine-readable representation. In particular, the processing system 112 outputs a reticle 2222 defining a field of view from a camera operatively coupled to the processing system 112, which can be used by the credential authority 110 to scan the optical machine-readable representation. The processing system 112 can then derive a user identifier and a credential identifier from the optical machine-readable representation and request validation of the user from the server 130.

Maintaining multiple representations for a credential on a client device 2202, 2204 may provide a user 2206, 2208 and/or a credential authority 110 a choice of which representation to validate. For example, the client device 2202, 2204 may display a command on a user interface of the client device that allows the user 2206, 2208 to select the desired representation for presentation. Likewise, the processing system 112 may display a command on a user interface operatively coupled to the processing system that allows the credential authority 110 to select the appropriate representation to validate.

In some instances, the credential authority 110 may only request that the user 2206, 2208 present one type of representation for the credential, even though the user's client device 2202, 2204 may have multiple representations available. This may be advantageous, for example, if one or more of the representations for the credential have been compromised (e.g., from a security breach or forgery).

In other cases, the credential authority 110 may request that the user 2206, 2208 present two or more representations for the credential to provide additional verification. Any suitable combination of representations could be requested. Such combinations of credentials could be useful for a variety of applications. For example, a first representation such as a parametrically-generated graphical representation or an animated graphical representation could represent general membership in a group (e.g., Mr. Smith is an employee of Company X who is authorized to enter the building). More specific privileges could then be granted based on a numeric representation or an optical machine-readable representation for a credential (e.g., Mr. Smith is authorized to access the 12th floor of the building). In some implementations, for example, the first representation could be displayed on a screen of the client device, and the second representation could be concurrently rendered as an audio signal by a speaker of the client device.

Figure 23:
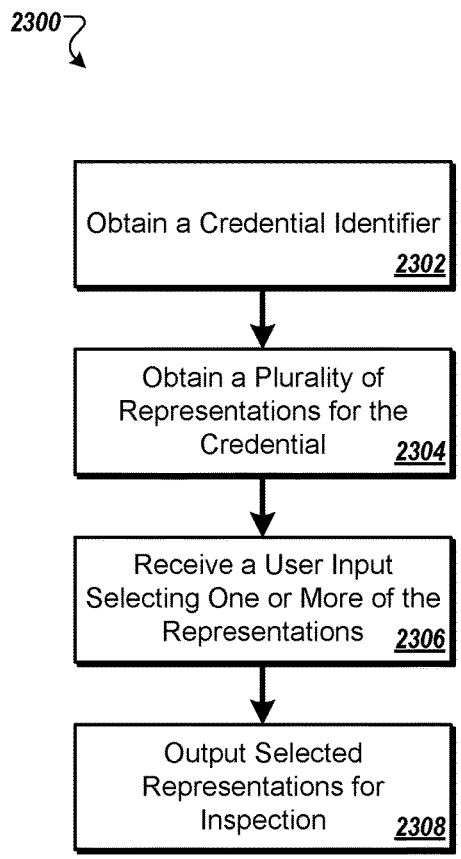
FIG. 23 is a flowchart of an example process for provisioning a client device with multiple representations for a credential and presenting the representations for validation of the credential.

FIG. 23 shows an example process 2300 for provisioning a client device with multiple representations for a credential and presenting the representations for validation. As shown, in step 2302, the client device obtains a credential identifier, which identifies a credential. Next, in step 2304, the client device obtains multiple representations for the credential. The multiple representations include at least two of: an animated graphical representation, a three-dimensional rendering of an object, an image of a fractal, a phrase, a numeric representation, and an optical machine-readable representation. Then, in step 2306, the client device receives an input from a user selecting one or more of multiple representations for the credential. Finally, in step 2308, the client device outputs selected representations for the credential in a manner that enables a credential authority to validate the selected representations.

In some implementations, the client device may concurrently output, to a display of the client device, at least two of the selected one or more representations for the credential in a manner that enables the credential authority to validate the representations. In other implementations, the client device may concurrently output: (i) at least one of the selected one or more representations to a display of the client device in a manner that enables the credential authority to validate the representation by visual inspection; and (ii) at least one other of the selected one or more representations as an audio signal to a speaker at the client device in a manner that enables the credential authority to validate the representation by acoustically detecting the at least one other of the selected one or more representations.

In some implementations, the client device may obtain an image of the user and output, to a display of the client device, the image of the user such that the credential authority can authenticate the user. The image of the user can be obtained, for example, from a memory of the client device, or by querying a server via a network connection and receiving the image of the user from the server over the network connection.

As described above, in some implementations involving an animated graphical representation, the client device may obtain a time derived from a timing device of the client device; determine at least one index value based on the credential identifier and the time, and, based on the at least one index value, obtain a current animated graphical representation, for example, from among a collection of multiple animated graphical representations.

As also described above, in some implementations involving a three-dimensional rendering of an object, the client device may obtain a time derived from a timing device of the client device, determine one or more parameters based on the credential identifier and the time, and, based on the one or more parameters, generate a three-dimensional rendering of an object.

As further described above, in some implementations involving an image of a fractal, the client device may obtain a time derived from a timing device of the client device, determine one or more parameters based on the credential identifier and the time, and, based on the one or more parameters, generate an image of a fractal.

As still further described above, in some implementations involving a phrase, the client device may periodically, at a predetermined time period, (i) obtain a time derived from a timing device of the client device, (ii) determine at least one index value based on the credential identifier and the time, and (iii) select, based on the at least one index value, a phrase corresponding to the credential from among a collection of multiple different words and/or phrases.

As also described above, in some implementations involving a numeric representation, the client device may receive a numeric representation for the credential from a server.

As further described above, in some implementations involving an optical machine-readable representation, the client device may obtain a credential identifier and a user identifier, where the user identifier identifies the user, generate a set of characters based on the credential identifier and the user identifier (e.g., by encrypting the credential identifier and the user identifier), and then encode the set of characters to generate an optical machine-readable representation for the credential.

Figure 24A:
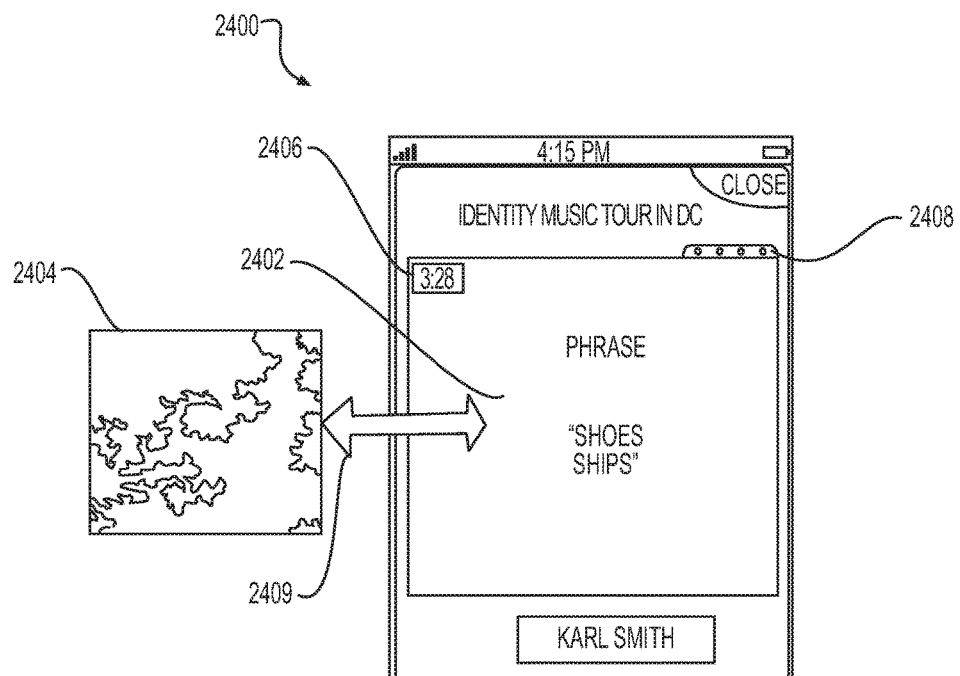
FIGS. 24a-e are screenshots of sample client devices and sample credential authority devices for certain implementations that involve provisioning a client device with multiple representations for a credential and presenting the representations for validation of the credential.

FIGS. 24*a-e* are screenshots of sample client devices and sample credential authority devices for certain implementations that involve provisioning a client device with multiple representations for a credential and presenting the representations for validation of the credential. In particular, FIG. 24*a* shows a display 2400 of a client device that can display at least two representations for a credential: (i) a phrase 2402 (i.e., "Shoes ships"), and (ii) an image of a fractal 2404. A user of the device can select between the representations by inputting a gesture, e.g., swiping slider 2408. The display 2400 also includes a timer 2406 indicating the time remaining until the representations expire (i.e., 3 minutes, 28 seconds).

Figure 24B:
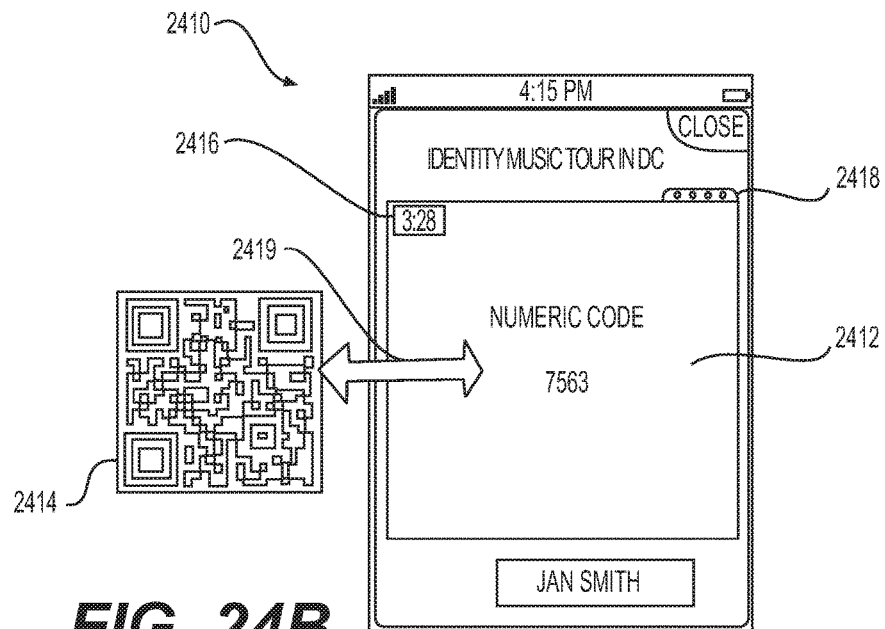

FIG. 24*b* shows a display 2410 of a client device that can display at least two representations for a credential: (i) a numeric value 2412 that may correspond to a numeric representation for the credential, and (ii) an optical machine-readable representation 2414 of a credential (e.g., a QR code). A user of the device can select between the representations by inputting a gesture, e.g., swiping slider 2418. The display 2400 also includes a timer 2416 indicating the time remaining until the representations expire (i.e., 3 minutes, 28 seconds).

Figure 24C:
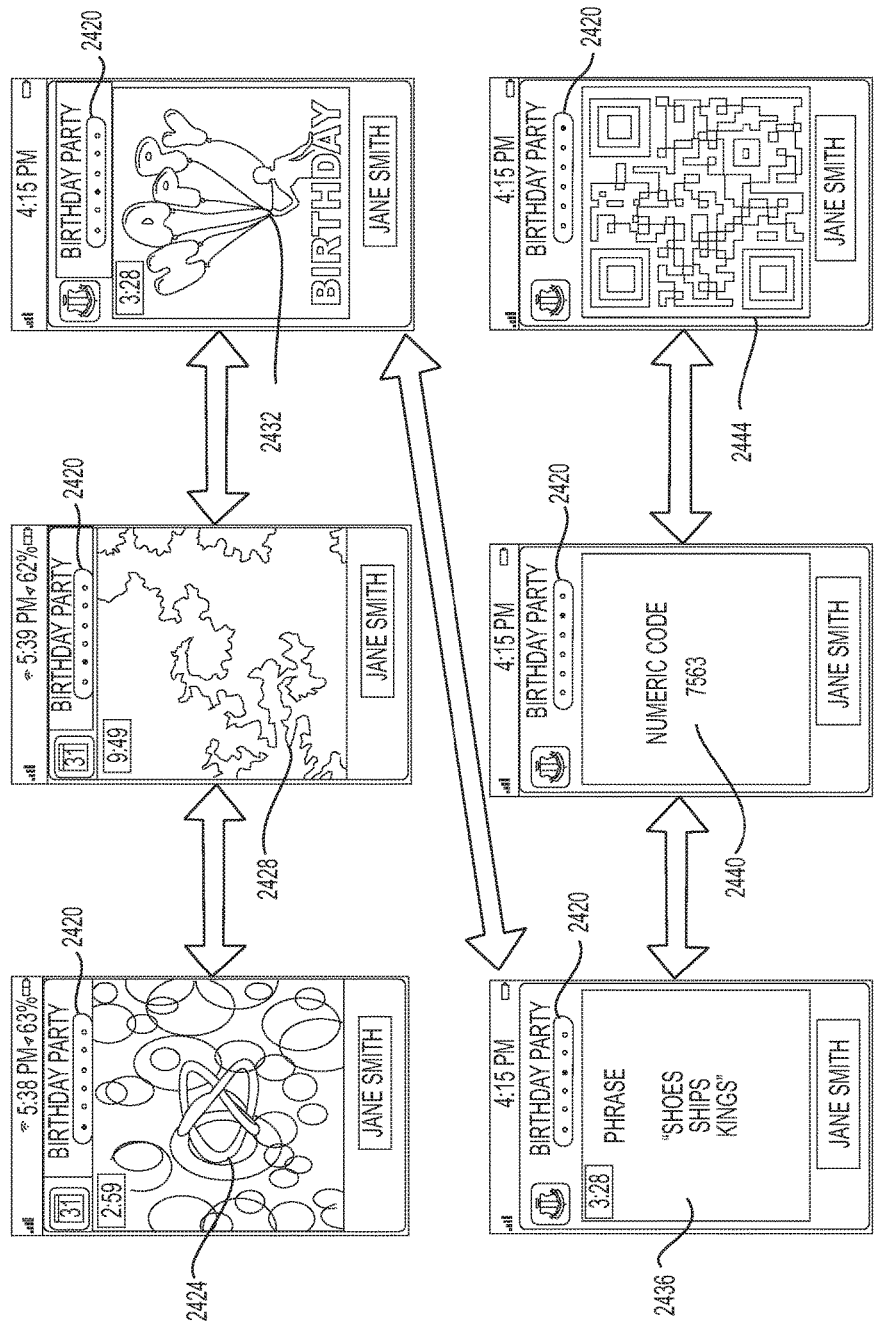

FIG. 24*c* shows a display of a client device executing an application that allows a user to select between six representations for a credential by inputting a gesture, e.g., swiping slider 2420. The first position of the slider 2420 causes the client device to display a three-dimensional rendering of an object 2424 (e.g., the torus knot as described above) corresponding to the credential. This three-dimensional rendering of an object 2424 may be animated. The second position of the slider 2420 causes the client device to display an image of a fractal 2428 corresponding to the credential as described above. The image of the fractal 2428 also may be animated. The third position of the slider 2420 causes the client device to display an animated graphical representation 2432 (e.g., the "Birthday" animation) corresponding to the credential. The fourth position of the slider 2420 causes the client device to display a phrase 2436 corresponding to the credential as described above. The fifth position of the slider 2420 causes the client device to display a numeric value 2440, which may correspond to a numeric representation for the credential as described above. The sixth position of the slider 2420 causes the client device to display an optical machine-readable representation for the credential 2444 as described above.

Figure 24D:
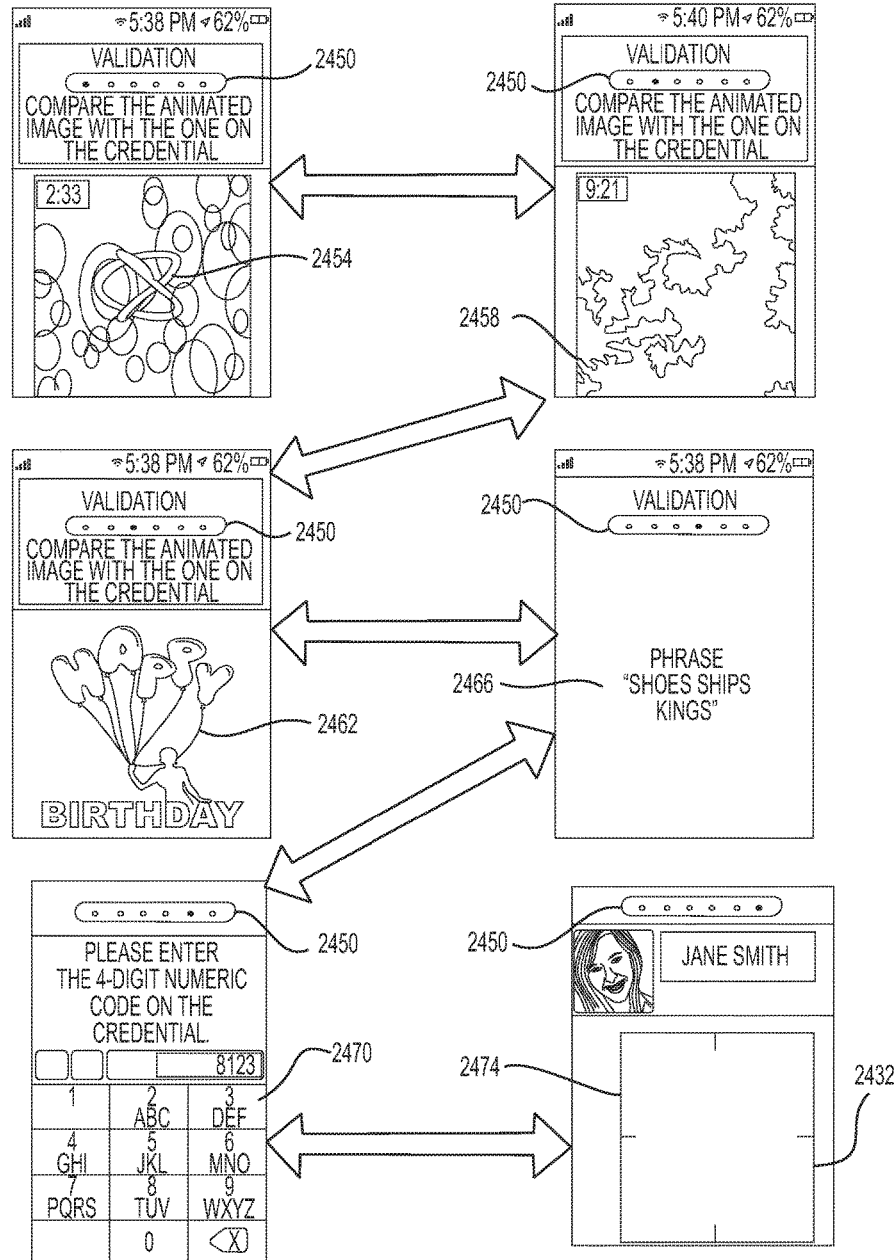

FIG. 24*d* shows a display operatively coupled to a processing system, where the processing system is associated with a credential authority. The processing system is configured to enable the credential authority to select between six validation modes for a credential by inputting a gesture, e.g., swiping slider 2450. The first position of the slider 2450 causes the processing system to display a three-dimensional rendering of an object 2454 (e.g., the torus knot as described above) that the credential authority can use to validate a three dimensional object corresponding to the credential as described above. The second position of the slider 2450 causes the processing system to display an image of a fractal 2458 that the credential authority can use to validate an image of a fractal corresponding to the credential as described above. The third position of the slider 2450 causes the processing system to display an animated graphical representation 2462 (e.g., the "Birthday" animation) that the credential authority can use to validate an animated graphical representation of the credential as described above. The fourth position of the slider 2450 causes the processing system to display a phrase 2466 that the credential authority can use to validate a phrase corresponding to the credential as described above. The fifth position of the slider 2450 corresponds to the client device displaying a man-machine interface 2470 (e.g., an onscreen keypad) that a credential authority can use to enter numeric values corresponding to the credential presented by users. The sixth position of the slider 2450 causes the processing system to display a reticle 2474 defining a field of view from a camera operatively coupled to the processing system. This reticle 2474 can be used by the credential authority to assist in scanning the optical machine-readable representation of the credential from a client device's display as described above.

Figure 24E:
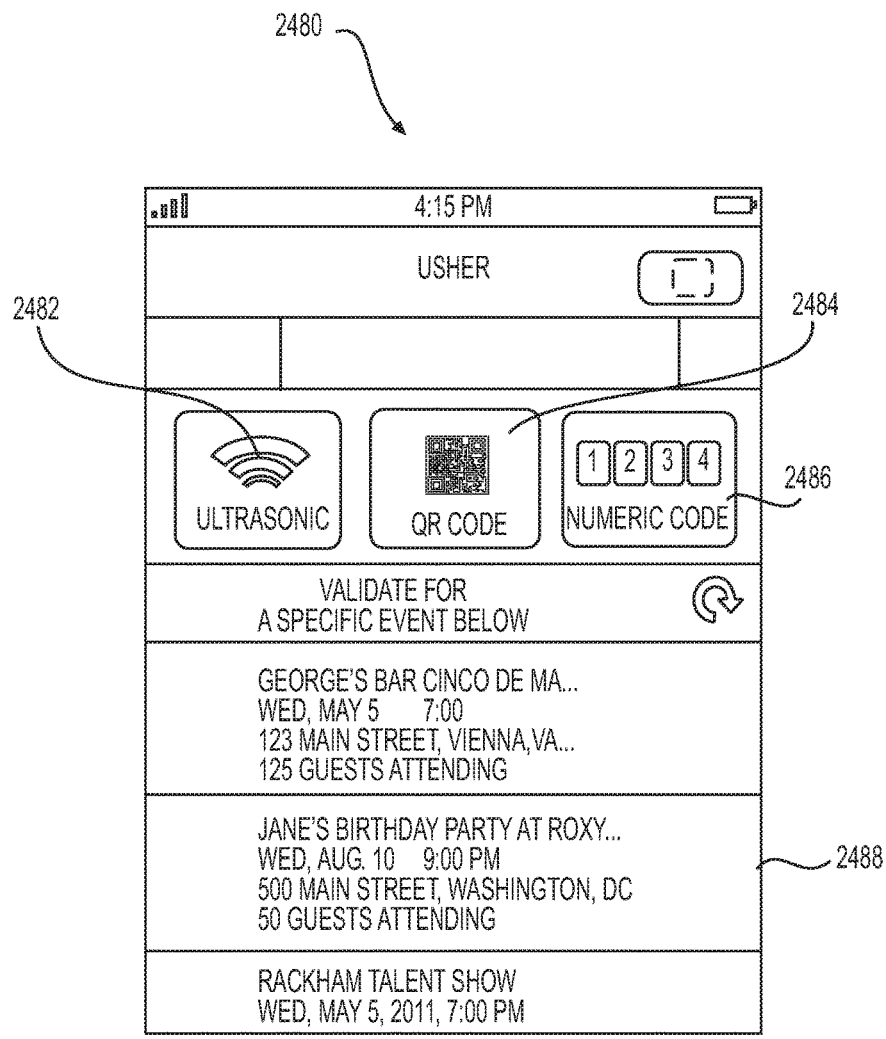

FIG. 24*e* shows a display 2480 operatively coupled to a processing system, where the processing system is associated with a credential authority. The display 2480 includes buttons 2482, 2484, and 2486 that allow a credential authority to select among validating: (i) a numeric representation or phrase rendered ultrasonically from a speaker of a client device, (ii) an optical machine-readable representation (e.g., a QR code), and (iii) a numeric value, respectively. The display 2480 also includes a scrolling list 2488 that allows a credential authority to select among various events associated with different credentials. As shown, the credential authority may select from three events for which to validate users, e.g., "George's Bar Cinco De Mayo," "Jane's Birthday Party at Roxy," and "Rackham Talent Show." Each of these events may correspond to a different credential. The credential authority may input a command via a man-machine interface for the display 2480 (e.g., a touchscreen or presence-sensitive display) to choose one of the events to validate using the scrolling list 2488 and/or a mode of validation using buttons 2482, 2484, and 2486.

A wide variety of applications are possible based on the subject matter described above. For example, credentials could be used to permit access to facilities. Representations for a credential could be provided to employees of a company, or other individuals authorized to access company property. In some cases, the validation of the representations could be automated. For example the credential authority could be a software agent that operates the processing system and controls an electro-mechanical lock or gate to permit validated users to enter a physical space. Additionally or alternatively, the credential authority could be a software agent that operates the processing system and controls an alarm system such that the credential authority can disable the alarm system responsive to presentation of a valid credential. Similarly, representations could be distributed to employees or other individuals authorized to permit them access a company's electronic data or website. Additionally, employees of a utility or other service company (e.g., a cable company representative) could present representations for a credential to identify themselves to customers.

Also, representations for credentials could be distributed to identify certifications such as a first aid certification, a medical license, or a driver's license. Likewise, representations for credentials could be used to identify graduates of a specific university or members of a specific group.

In one specific example in which a credential provides access to IT resources (e.g., a computing device, a network, an electronic file, a directory, and/or another computing resource or storage device), the credential may be represented as a phrase as described above. In this example, the phrase may be spoken into a microphone and/or typed into an input device (e.g., a keyboard, keypad, or a touchscreen input mechanism) in order to gain access to the IT resource(s). Additionally or alternatively, the credential may be represented as a numeric string as described above, and the numeric string may be spoken into a microphone and/or typed into an input device (e.g., a keyboard, a keypad, or a touchscreen input mechanism) in order to gain access to the IT resource(s); or the credential may be represented by an optical machine readable code (e.g., a QR code), and the optical machine readable code may be scanned by an appropriate sensor in order to gain access to the IT resource(s).

In another specific example in which a credential provides access to a physical space (e.g., by unlocking a physical lock or gate and/or disabling an alarm system), the credential may be represented as a phrase as described above. In this example, the phrase may be spoken into a microphone and/or typed into an input device (e.g., a keyboard, keypad, or a touchscreen input mechanism) in order to gain access to the physical space. Additionally or alternatively, the credential may be represented as a numeric string as described above, and the numeric string may be spoken into a microphone and/or typed into an input device (e.g., a keyboard, a keypad, or a touchscreen input mechanism) in order to gain access to the physical space; or the credential may be represented by an optical machine readable code (e.g., a QR code), and the optical machine readable code may be scanned by an appropriate sensor in order to gain access to the physical space.

In yet another specific example in which a credential provides access to an electronic account (e.g., by enabling access to a bank account from a personal computing device and/or an ATM), the credential may be represented as a phrase as described above. In this example, the phrase may be spoken into a microphone and/or typed into an input device (e.g., a keyboard, keypad, or a touchscreen input mechanism) in order to gain access to the electronic account. Additionally or alternatively, the credential may be represented as a numeric string as described above, and the numeric string may be spoken into a microphone and/or typed into an input device (e.g., a keyboard, a keypad, or a touchscreen input mechanism) in order to gain access to the electronic account; or the credential may be represented by an optical machine readable code (e.g., a QR code), and the optical machine readable code may be scanned by an appropriate sensor in order to gain access to the electronic account.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touch-screen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:

1. One or more non-transitory computer-readable storage media storing instructions executable by one or more computers which, upon such execution, cause the one or more computers to perform operations comprising:
 obtaining, by a client device, a credential identifier that identifies a credential of a user from among of a set of multiple credentials issued to the user by one or more credential authorities;
 identifying, by the client device, multiple representations for the credential, each of the multiple representations configured to provide access to the same credential identified by the credential identifier and being a different type of representation selected from the group consisting of an animated graphical representation, a three-dimensional rendering of an object, an image of a fractal, a phrase, a numeric representation, and an optical machine-readable representation;
 receiving, by the client device, a request to output a particular number of representations for the credential;
 receiving, by the client device, a user input indicating a selection of at least one of the multiple representations for the credential, the at least one of the multiple representations for the credential including a number of representations that is the same as the requested particular number of representations; and
 responsive to receiving the user input indicating the selection of at least one of the multiple representations for the credential, outputting, by the client device, the at least one selected representation for the credential to enable access to the credential.

2. The one or more non-transitory computer-readable storage media of claim 1, wherein the operations further comprise: receiving, by the client device, a request to output a particular number of representations for the credential comprises receiving, at the client device, the request from a credential authority to provide at least one representation for the credential; and
 wherein the operations further comprise transmitting, from the client device to the credential authority, one of the selected at least one of the multiple representations for the credential.

3. The one or more non-transitory computer-readable storage media of claim 1, wherein the operations further comprise:
 after identifying the multiple representations for the credential:
 displaying a first representation of the multiple representations; and
 displaying a second representation of the multiple representations, the second representation being different from the first representation.

4. The one or more non-transitory computer-readable storage media of claim 3, wherein the operations further comprise:
 receiving a second user input to switch between displaying the first representation and the second representation of the multiple representations, the second user input corresponding to a swiping input.

5. The one or more non-transitory computer-readable storage media of claim 1, further comprising wherein the operations further comprise:
 obtaining, by the client device, the multiple representations for the credential; and
 encoding, in each of the multiple representations, data derived from credential identifier that identifies the credential.

6. The one or more non-transitory computer-readable storage media of claim 1, wherein outputting, by the client device, the at least one selected representation for the credential to enable access to the credential comprises providing for display, at the client device, at least two representations to enable access to a secured resource based on the credential encoded in the at least one selected representation.

7. The one or more non-transitory computer-readable storage media of claim 1, wherein:
 the at least one selected representation for the credential comprises at least two selected representations; and
 outputting, by the client device, the at least one selected representation for the credential to enable access to the credential comprises:
 providing for display, at the client device, a first representation of the at least two selected representations to enable access to the credential for validation by a credential authority;
 rendering a second representation of the at least two selected representations as an audio signal; and
 outputting, by the client device, the audio signal corresponding to the second representation of the at least two selected representations for validation by the credential authority.

8. The one or more non-transitory computer-readable storage media of claim 1, wherein identifying, by the client device, the multiple representations for the credential comprises generating, at the client device, the multiple representations for the credential.

9. The one or more non-transitory computer-readable storage media of claim 8, wherein the animated graphical representation, the three-dimensional rendering of the object, the image of the fractal, and the phrase are generated, at least in part, using a time of the client device that is synchronized with a time at a server system connected to the client device.

10. The one or more non-transitory computer-readable storage media of claim 1, wherein identifying, by the client device, the multiple representations for the credential comprises receiving, by the client device from a server system, the multiple representations for the credential.

11. A method for validating a credential, the method comprising:
 obtaining, by a client device, a credential identifier that identifies a credential of a user from among of a set of multiple credentials issued to the user by one or more credential authorities;
 identifying, by the client device, multiple representations for the credential, each of the multiple representations configured to provide access to the same credential identified by the credential identifier and being a different type of representation selected from the group consisting of an animated graphical representation, a three-dimensional rendering of an object, an image of a fractal, a phrase, a numeric representation, and an optical machine-readable representation;
 receiving, by the client device, a request to output a particular number of representations for the credential;

receiving, by the client device, user input indicating a selection of at least one of the multiple representations for the credential, the at least one of the multiple representations for the credential including a number of representations that is the same as the requested particular number of representations; and responsive to receiving the user input indicating the selection of at least one of the multiple representations for the credential, outputting, by the client device, the at least one selected representation for the credential to enable access to the credential.

12. The method of claim 11, further comprising: wherein receiving, by the client device, a request to output a particular number of representations for the credential comprises receiving, at the client device, the request from a credential authority to provide at least one representation for the credential; and wherein the method further comprises transmitting, from the client device to the credential authority, one of the selected at least one of the multiple representations for the credential.

13. The method of claim 11, further comprising:

after identifying the multiple representations for the credential:

displaying a first representation of the multiple representations; and displaying a second representation of the multiple representations, the second representation being different from the first representation.

14. The method of claim 13, further comprising:

receiving a second user input to switch between displaying the first representation and the second representation of the multiple representations, the second user input corresponding to a swiping input.

15. The method of claim 11, further comprising:

obtaining, by the client device, the multiple representations for the credential; and encoding, in each of the multiple representations, data derived from credential identifier that identifies the credential.

16. The method of claim 11, wherein outputting, by the client device, the at least one selected representation for the credential to enable access to the credential comprises providing for display, at the client device, at least two representations to enable access to a secured resource based on the credential encoded in the at least one selected representation.

17. The method of claim 11, wherein:

the at least one selected representation for the credential comprises at least two selected representations; and outputting, by the client device, the at least one selected representation for the credential to enable access to the credential comprises:

providing for display, at the client device, a first representation of the at least two selected representations to enable access to the credential for validation by a credential authority;

rendering a second representation of the at least two selected representations as an audio signal; and outputting, by the client device, the audio signal corresponding to the second representation of the at least two selected representations for validation by the credential authority.

18. The method of claim 11, wherein the animated graphical representation, the three-dimensional rendering of the object, the image of the fractal, and the phrase are generated, at least in part, using a time of the client device that is synchronized with a time at a server system connected to the client device.

19. A system comprising:

one or more processors and one or more computer-readable storage media storing instructions that are operable and when executed by the one or more processors, cause the one or more processors to perform operations comprising:

obtaining, by a client device, a credential identifier that identifies a credential of a user from among of a set of multiple credentials issued to the user by one or more credential authorities;

identifying, by the client device, multiple representations for the credential, each of the multiple representations configured to provide access to the same credential identified by the credential identifier and being a different type of representation selected from the group consisting of an animated graphical representation, a three-dimensional rendering of an object, an image of a fractal, a phrase, a numeric representation, and an optical machine-readable representation;

receiving, by the client device, a request to output a particular number of representations for the credential;

receiving, by the client device, user input indicating a selection of at least one of the multiple representations for the credential, the at least one of the multiple representations for the credential including a number of representations that is the same as the requested particular number of representations; and responsive to receiving the user input indicating the selection of at least one of the multiple representations for the credential, outputting, by the client device, the at least one selected representation for the credential to enable access to the credential.

20. The one or more non-transitory computer-readable storage media of claim 1, wherein the operations further comprise: receiving, by the client device, a request to output a particular number of representations for the credential comprises receiving the request from a credential authority indicating a number of representations for performing validation; and wherein the received user input includes a selection of a number of representations for the credential equal to the number of representations indicated in the request received from the credential authority.

* * * * *